US012650713B2

(12) United States Patent
Morita et al.

(10) Patent No.: US 12,650,713 B2
(45) Date of Patent: Jun. 9, 2026

(54) INPUT DEVICE AND COVER OF INPUT DEVICE

(71) Applicant: Sony Interactive Entertainment Inc., Tokyo (JP)

(72) Inventors: Masaho Morita, Tokyo (JP); Takashi Onda, Saitama (JP)

(73) Assignee: Sony Interactive Entertainment Inc., Tokyo (JP)

( * ) Notice: Subject to any disclaimer, the term of this patent is extended or adjusted under 35 U.S.C. 154(b) by 164 days.

(21) Appl. No.: 18/723,876

(22) PCT Filed: Dec. 21, 2022

(86) PCT No.: PCT/JP2022/047225
§ 371 (c)(1),
(2) Date: Jun. 25, 2024

(87) PCT Pub. No.: WO2023/127656
PCT Pub. Date: Jul. 6, 2023

(65) Prior Publication Data
US 2025/0060792 A1 Feb. 20, 2025

(30) Foreign Application Priority Data

Dec. 28, 2021 (JP) ................................. 2021-215204

(51) Int. Cl.
*G06F 1/16* (2006.01)
*A63F 13/24* (2014.01)
(Continued)

(52) U.S. Cl.
CPC ............ *G06F 1/1658* (2013.01); *A63F 13/24* (2014.09); *G06F 3/02* (2013.01)

(58) Field of Classification Search
CPC .... G06F 1/1658; G06F 1/1675; G06F 1/1679; G06F 1/1684; G06F 1/169; G06F 3/02; G06F 3/0202; A63F 13/24; A63F 13/245
See application file for complete search history.

(56) References Cited

U.S. PATENT DOCUMENTS 6,163,326 A 12/2000 Klein et al.
6,205,021 B1 3/2001 Klein et al.
(Continued)

FOREIGN PATENT DOCUMENTS

CN 105999697 A 10/2016
CN 105999699 A 10/2016
(Continued)

OTHER PUBLICATIONS

International Search Report and Written Opinion mailed on Mar. 20, 2023, received for PCT Application PCT/JP2022/047225, filed on Dec. 21, 2022, 8 pages including English Translation.
(Continued)

*Primary Examiner* — Anthony M Haughton
(74) *Attorney, Agent, or Firm* — Fish & Richardson P.C.

(57) ABSTRACT

The rigidity of an input device is increased while an effect on the external appearance of the input device is suppressed. The input device has a device front portion as well as a right grip and a left grip. An upper case and a lower case of the input device form a part of each of the device front portion, the right grip, and the left grip, and house a frame. The lower case is fixed to at least one of the frame and the upper case by a plurality of screws. A lower cover is attached to the lower surface of the lower case, covers the plurality of screws, and constitutes at least a part of each of the lower surface of the device front portion, the left side surface of the right grip, and the right side surface of the left grip.

7 Claims, 40 Drawing Sheets

(51) Int. Cl.
    *G06F 3/02*         (2006.01)
    *H05K 5/00*         (2025.01)
    *H05K 7/00*         (2006.01)

(56)            References Cited

U.S. PATENT DOCUMENTS

| | | | |
|---|---|---|---|
| 6,205,022 B1 | 3/2001 | Bhatia et al. | |
| 6,424,335 B1 | 7/2002 | Kim et al. | |
| 7,063,321 B2 * | 6/2006 | Hussaini | A63F 13/92 |
| | | | 273/148 B |
| 7,283,125 B2 * | 10/2007 | Martinez | G06F 3/0202 |
| | | | 345/169 |
| 7,295,187 B2 | 11/2007 | Kaizaki et al. | |
| 7,298,359 B2 | 11/2007 | Kim et al. | |
| 7,758,424 B2 * | 7/2010 | Riggs | A63F 13/285 |
| | | | 341/20 |
| 8,313,379 B2 | 11/2012 | Ikeda et al. | |
| 8,360,882 B2 | 1/2013 | Liu | |
| 9,005,025 B2 * | 4/2015 | Joynes | A63F 13/92 |
| | | | 463/37 |
| 9,713,768 B2 * | 7/2017 | Uy | G06F 3/0362 |
| 9,868,058 B2 * | 1/2018 | Gassoway | G06F 3/033 |
| 9,908,041 B2 | 3/2018 | Kujawski et al. | |
| 9,925,457 B2 * | 3/2018 | Gassoway | A63F 9/24 |
| 10,124,249 B2 | 11/2018 | Schmitz et al. | |
| 10,130,874 B2 | 11/2018 | Schmitz et al. | |
| 10,286,307 B2 | 5/2019 | Kujawski et al. | |
| 10,427,036 B2 * | 10/2019 | Burgess | A63F 13/21 |
| 10,427,037 B2 | 10/2019 | Strahle et al. | |
| 11,794,098 B2 | 10/2023 | Schmitz et al. | |
| 11,964,198 B2 | 4/2024 | Palma Guerrero, Jr. | |
| 2002/0018049 A1 | 2/2002 | Love | |
| 2009/0054146 A1 * | 2/2009 | Epstein | A63F 13/22 |
| | | | 463/38 |
| 2010/0298053 A1 * | 11/2010 | Kotkin | A63F 13/98 |
| | | | 463/37 |
| 2011/0098116 A1 | 4/2011 | Liu | |
| 2016/0361634 A1 * | 12/2016 | Gassoway | G06F 3/0338 |
| 2016/0361636 A1 | 12/2016 | Gassoway et al. | |
| 2017/0001106 A1 | 1/2017 | Gassoway et al. | |
| 2017/0087456 A1 * | 3/2017 | Burgess | A63F 13/21 |
| 2017/0106274 A1 * | 4/2017 | Ramcheran | A63F 13/24 |
| 2017/0354867 A1 * | 12/2017 | Okamura | A63F 13/24 |
| 2018/0185750 A1 | 7/2018 | Tiffany et al. | |
| 2018/0210485 A1 | 7/2018 | Liang | |
| 2019/0388779 A1 * | 12/2019 | Morita | A63F 13/214 |
| 2020/0180713 A1 * | 6/2020 | Kosaki | G05G 1/02 |
| 2020/0206607 A1 | 7/2020 | Tseng et al. | |
| 2021/0093950 A1 * | 4/2021 | Duncan | G06F 3/0202 |
| 2021/0394047 A1 | 12/2021 | Orion et al. | |
| 2023/0133332 A1 * | 5/2023 | Samperi | A63F 13/22 |
| | | | 463/37 |
| 2025/0050203 A1 | 2/2025 | Kidoba et al. | |
| 2025/0060794 A1 | 2/2025 | Morita et al. | |
| 2025/0060837 A1 | 2/2025 | Morita et al. | |
| 2025/0065226 A1 | 2/2025 | Onda et al. | |
| 2025/0065227 A1 | 2/2025 | Morita et al. | |
| 2025/0073576 A1 | 3/2025 | Morita et al. | |

FOREIGN PATENT DOCUMENTS

| | | |
|---|---|---|
| CN | 211357702 U | 8/2020 |
| CN | 105999697 B | 7/2023 |
| EP | 2908224 A1 | 8/2015 |
| JP | S59-103335 U | 7/1984 |
| JP | H04-236930 A | 8/1992 |
| JP | H04-362722 A | 12/1992 |
| JP | H11-232968 A | 8/1999 |
| JP | 3067182 U | 3/2000 |
| JP | 2004-171162 A | 6/2004 |
| JP | 2004-329913 A | 11/2004 |
| JP | 2004-362316 A | 12/2004 |
| JP | 2005-252742 A | 9/2005 |
| JP | 2006-318872 A | 11/2006 |
| JP | 2007-279981 A | 10/2007 |
| JP | 2012-000162 A | 1/2012 |
| JP | 2012-099047 A | 5/2012 |
| JP | 2014-089578 A | 5/2014 |
| JP | 2016-106297 A | 6/2016 |
| JP | 2017-117324 A | 6/2017 |
| JP | 2017-145926 A | 8/2017 |
| JP | 2018-110831 A | 7/2018 |
| JP | 2019-032866 A | 2/2019 |
| JP | 2019-217083 A | 12/2019 |
| JP | 2021-159416 A | 10/2021 |
| JP | 2021-159417 A | 10/2021 |
| JP | 2022-511656 A | 2/2022 |
| TW | 201720496 A | 6/2017 |
| WO | WO 2013/099742 A1 | 7/2013 |
| WO | 2019/244995 A1 | 12/2019 |
| WO | WO 2022/100650 A1 | 5/2022 |
| WO | WO 2022/123737 A1 | 6/2022 |
| WO | WO 2023/127662 A1 | 7/2023 |

OTHER PUBLICATIONS

International Preliminary Report on Patentability issued Jul. 11, 2024 in corresponding International Patent Application No. PCT/JP2022/047225, 2 pages (English translation only).

Written Opinion of the International Searching Authority issued Mar. 20, 2023 in corresponding International Patent Application No. PCT/JP2022/047225, 3 pages (English translation only).

* cited by examiner

FIG. 1

F I G . 5
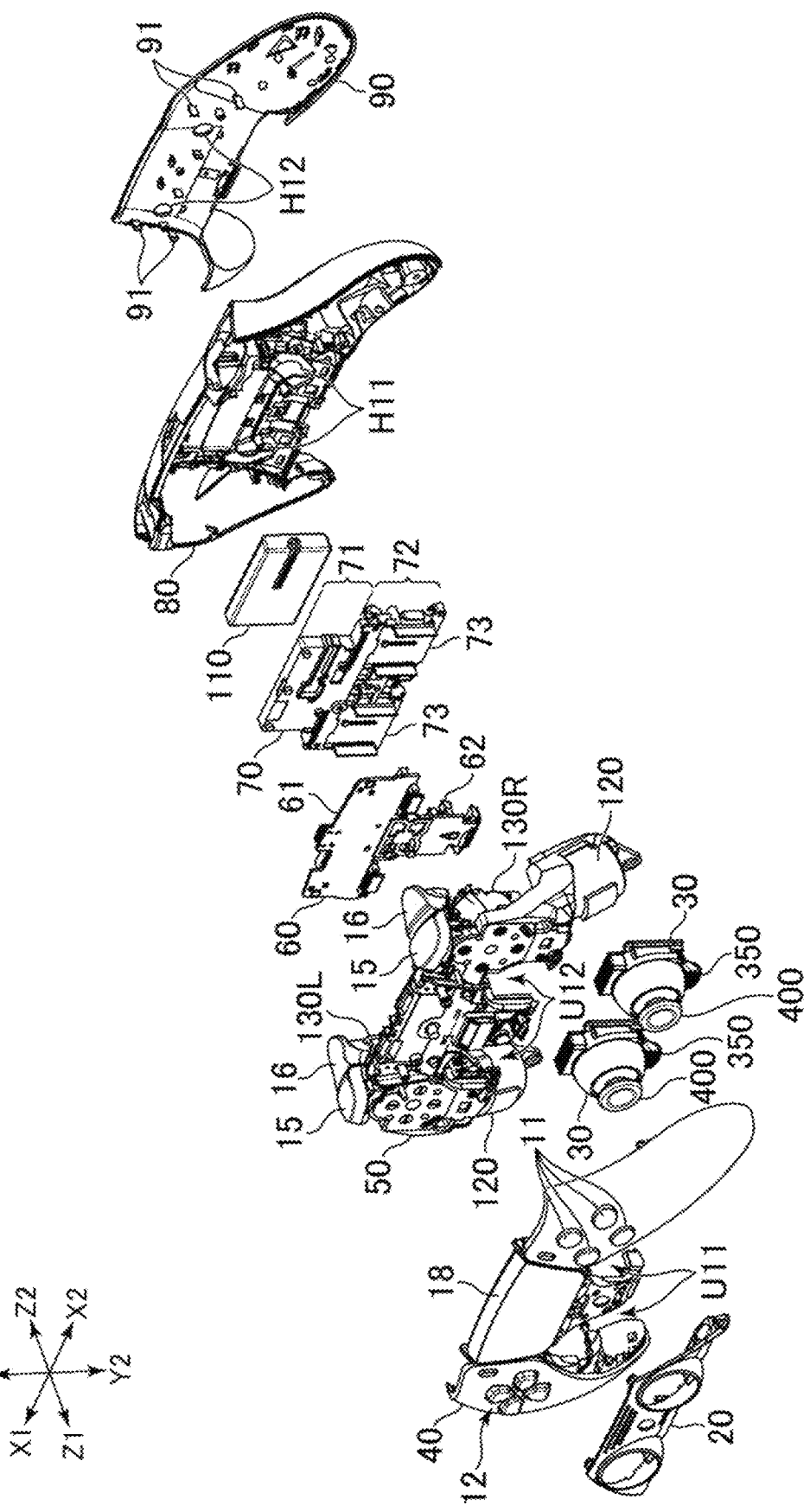

F I G . 8
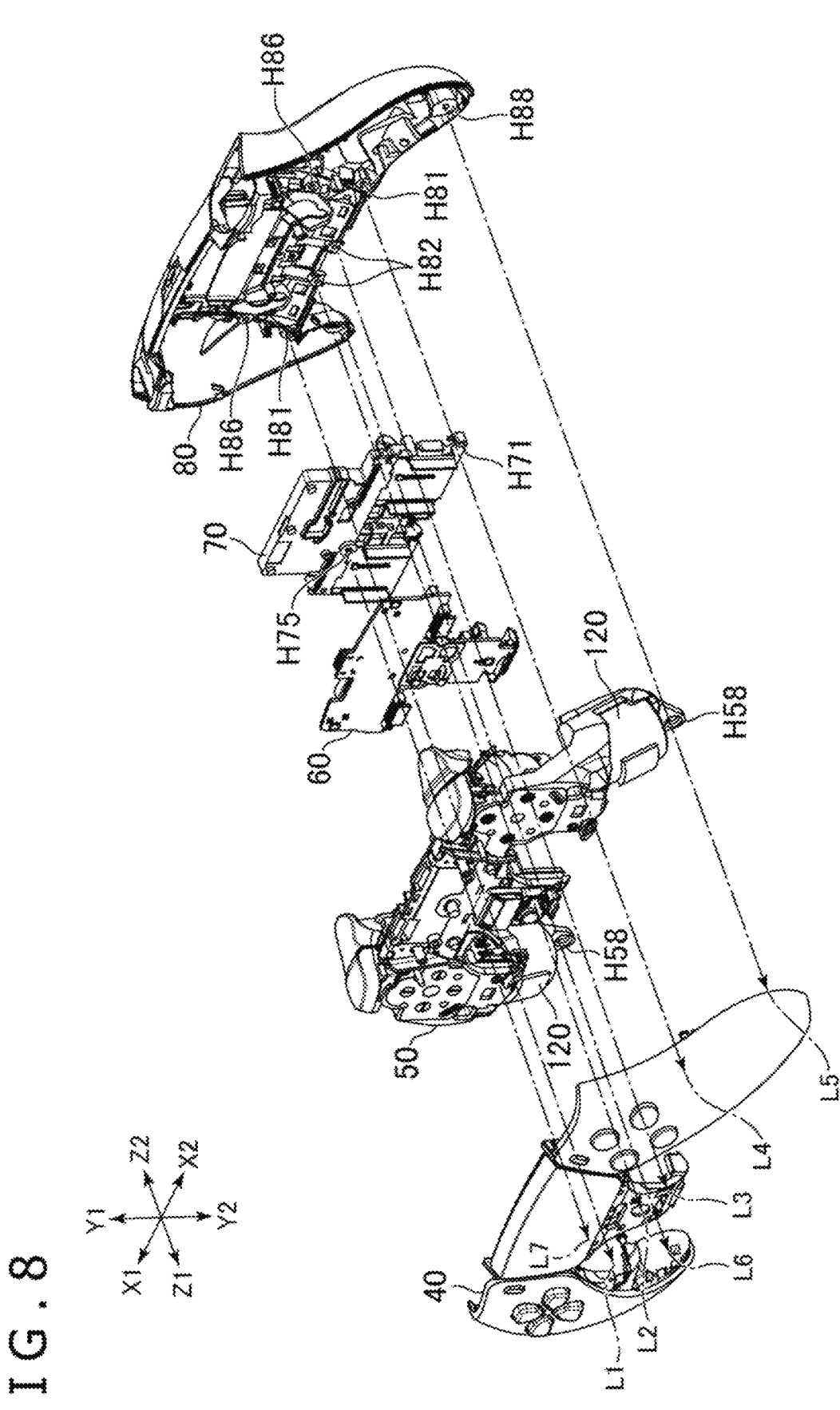

FIG.18B
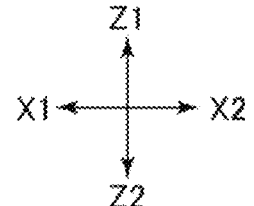
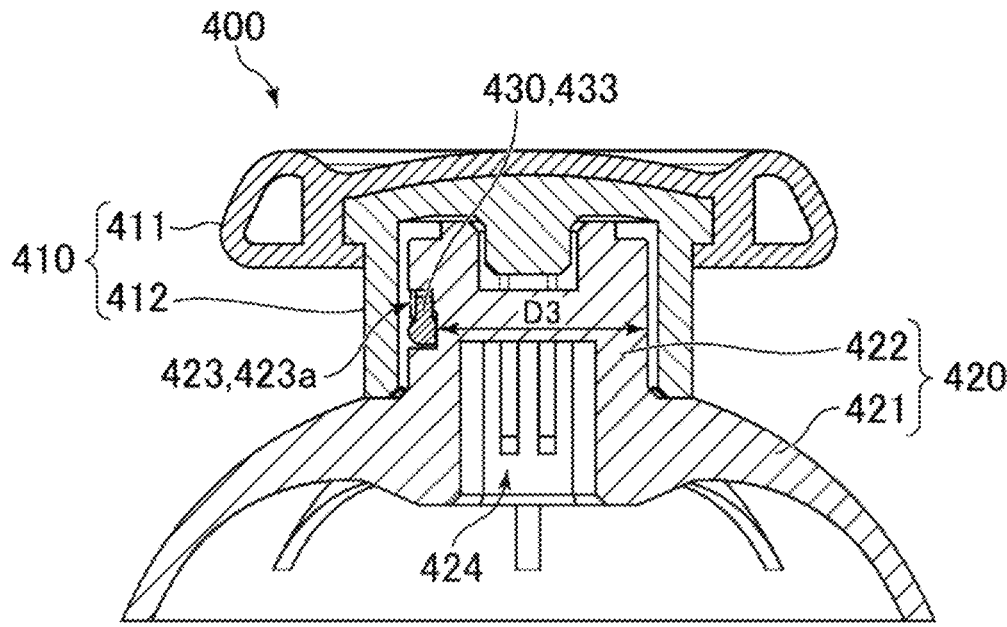

F I G . 2 5
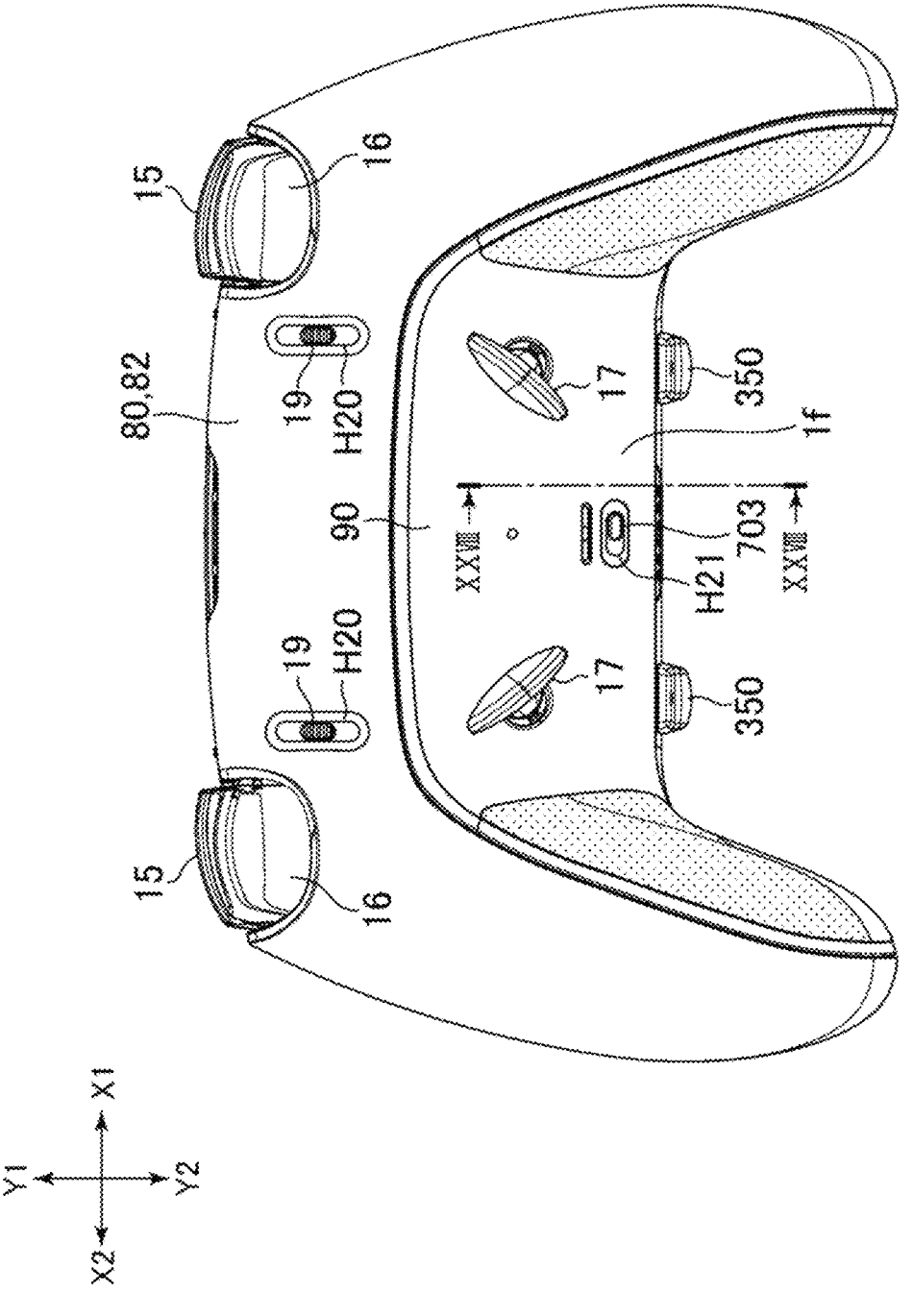

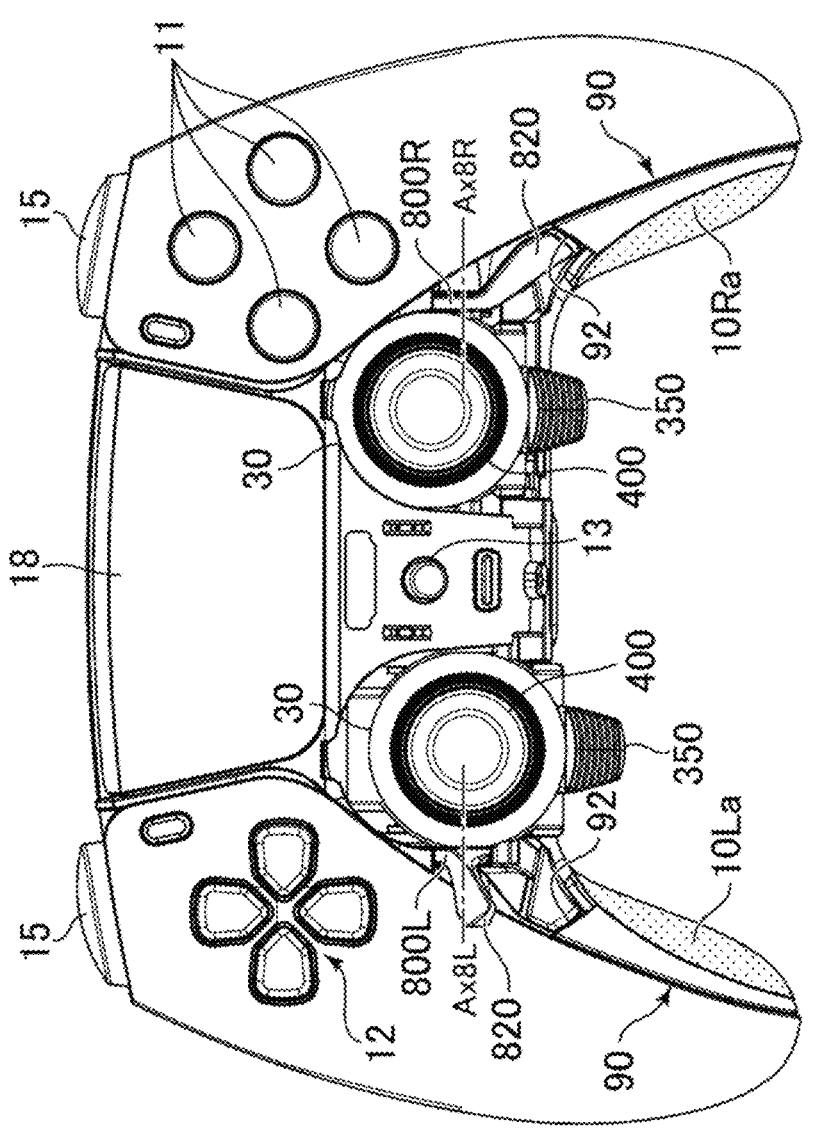
FIG.29B
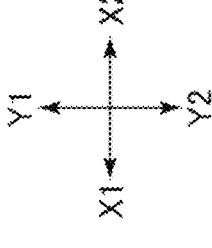

INPUT DEVICE AND COVER OF INPUT DEVICE

CROSS-REFERENCE TO RELATED APPLICATIONS

The application is a national stage application, pursuant to 35 U.S.C. § 371, of International Patent Application No. PCT/JP2022/047225, filed Dec. 21, 2022, which claims priority from Japanese Patent Application No. 2021-215204, filed Dec. 28, 2021, the entire contents of each is incorporated herein by reference.

TECHNICAL FIELD

The present disclosure relates to an input device and a cover of the input device.

BACKGROUND ART

PTL 1 below discloses an input device for inputting an instruction of a user to a game device. The input device has left and right grips to be held by the user and a plurality of operation buttons and a direction key to be operated by thumbs of the user holding the left and right grips. In addition, the input device is constructed by combining an upper housing half body (upper case) and a lower housing half body (lower case) with each other.

CITATION LIST

Patent Literature

[PTL 1]
    Japanese Patent Laid-open No. 2016-106297

SUMMARY

Technical Problem

Various operations are performed on the input device according to kinds of games, and the input device is desired to ensure rigidity. There is a desire to reduce an effect on an external appearance even in a case of increasing the number of screws for attaching an upper case, a lower case, and a frame to each other in order to increase the rigidity of the input device.

It is an object of the present disclosure to increase the rigidity of an input device while an effect on the external appearance of the input device is being suppressed.

Solution to Problem

An input device according to the present disclosure includes a device front portion including a right portion on which a first operation member is disposed, a left portion on which a second operation member is disposed, and a central portion as a part between the right portion and the left portion, a right grip extending rearward of a rear edge of the central portion from the right portion of the device front portion, a left grip extending rearward of the rear edge of the central portion from the left portion of the device front portion, an upper case forming a part of each of the device front portion, the right grip, and the left grip, a lower case forming a part of each of the device front portion, the right grip, and the left grip, a frame housed in the upper case and the lower case, a plurality of screws configured to fix the lower case to at least one of the frame and the upper case, and a lower cover attached to a lower surface of the lower case, and configured to cover the plurality of screws. The lower cover constitutes at least a part of each of a lower surface of the device front portion, a left side surface of the right grip, and a right side surface of the left grip. According to this, the rigidity of the input device can be increased while an effect on the external appearance of the input device is suppressed.

In addition, a cover of an input device according to the present disclosure is a cover attached to a lower case of the input device, the input device including a device front portion including a right portion on which a first operation member is disposed, a left portion on which a second operation member is disposed, and a central portion as a part between the right portion and the left portion, a right grip extending rearward of a rear edge of the central portion from the right portion of the device front portion, a left grip extending rearward of the rear edge of the central portion from the left portion of the device front portion, an upper case forming a part of each of the device front portion, the right grip, and the left grip, and the lower case forming a part of each of the device front portion, the right grip, and the left grip, the cover constituting at least a part of each of a lower surface of the device front portion, a left side surface of the right grip, and a right side surface of the left grip. According to this, the rigidity of the input device can be increased while an effect on the external appearance of the input device is suppressed.

BRIEF DESCRIPTION OF DRAWINGS

FIG. 1 is a plan view illustrating the upper surface of an input device according to an example of an embodiment of the present disclosure.

FIG. 5 is an exploded perspective view of the input device.

FIG. 8 is an exploded perspective view illustrating structures for attachment of an upper case, the main frame, a circuit board, the reinforcing frame, and a lower case.

FIG. 16 is a sectional view taken along a line XVI-XVI in

FIG. 14.

FIG. 18B is a sectional view of the operation stick.

FIG. 25 is a bottom view illustrating the lower surface of the input device according to another example of the embodiment of the present disclosure.

FIG. 29B is a plan view of the input device in a state in which the upper cover is removed.

DESCRIPTION OF EMBODIMENT

Figure 1:
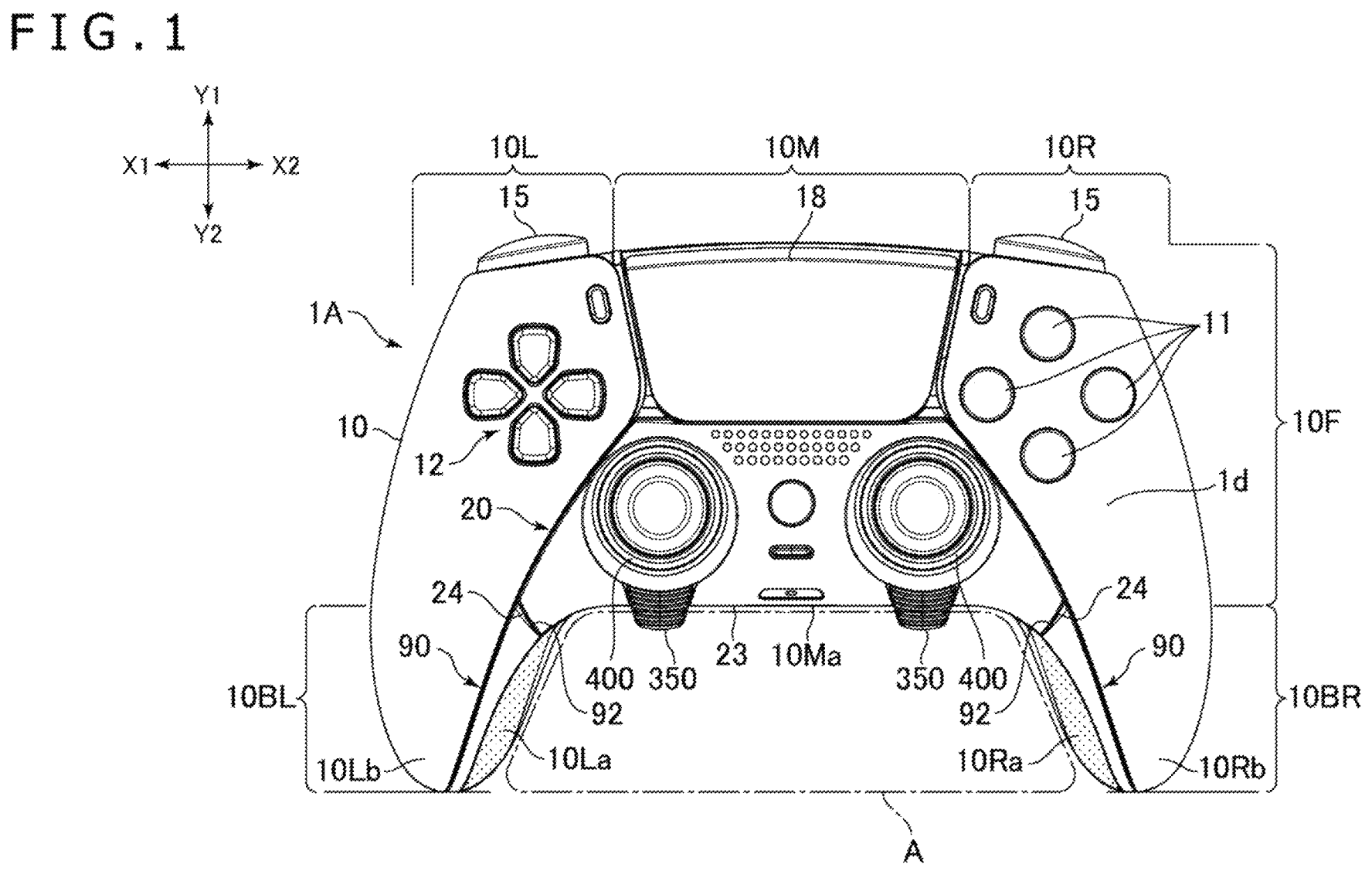
Figure 2:
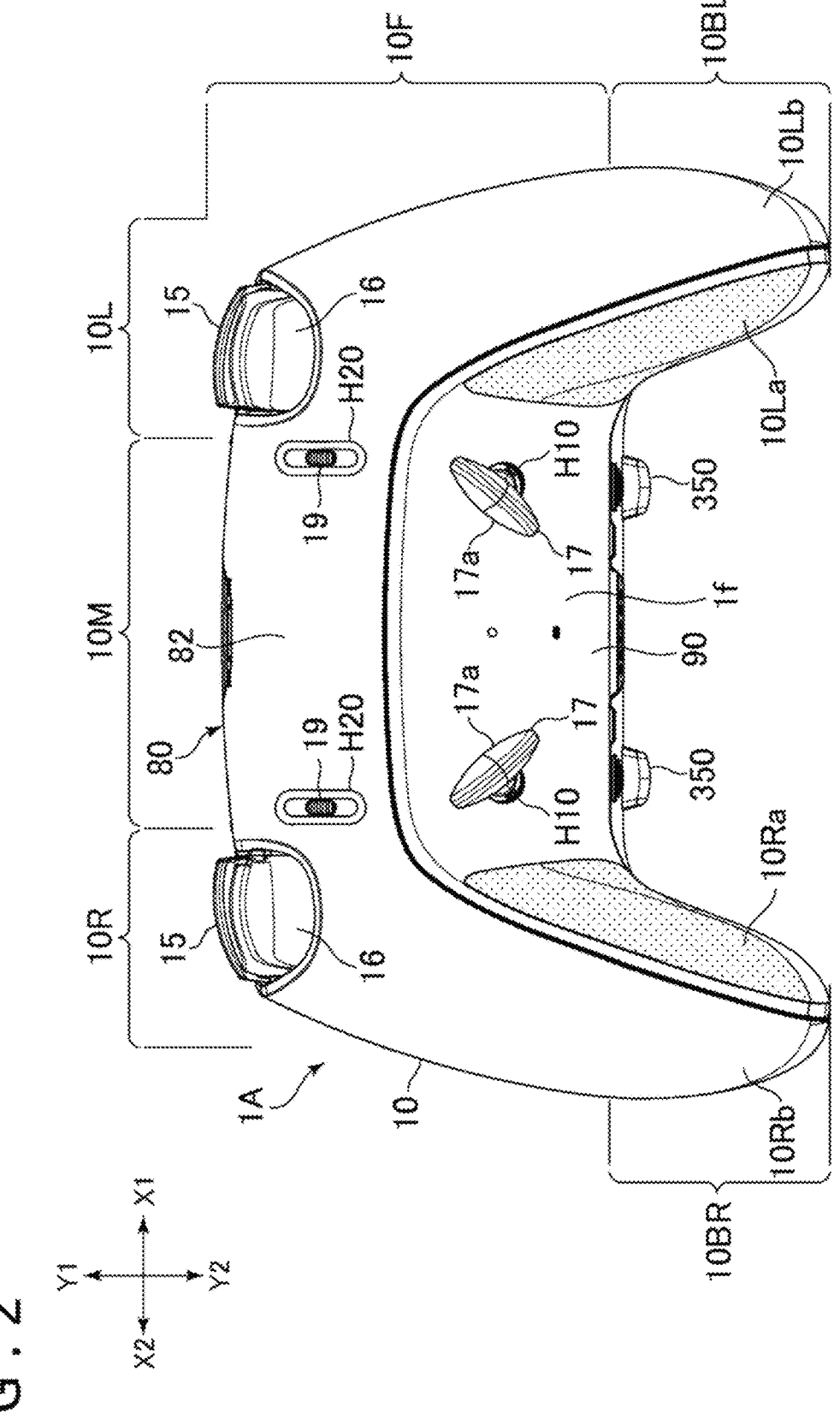
FIG. 2 is a bottom view illustrating the lower surface of the input device.
Figure 3:
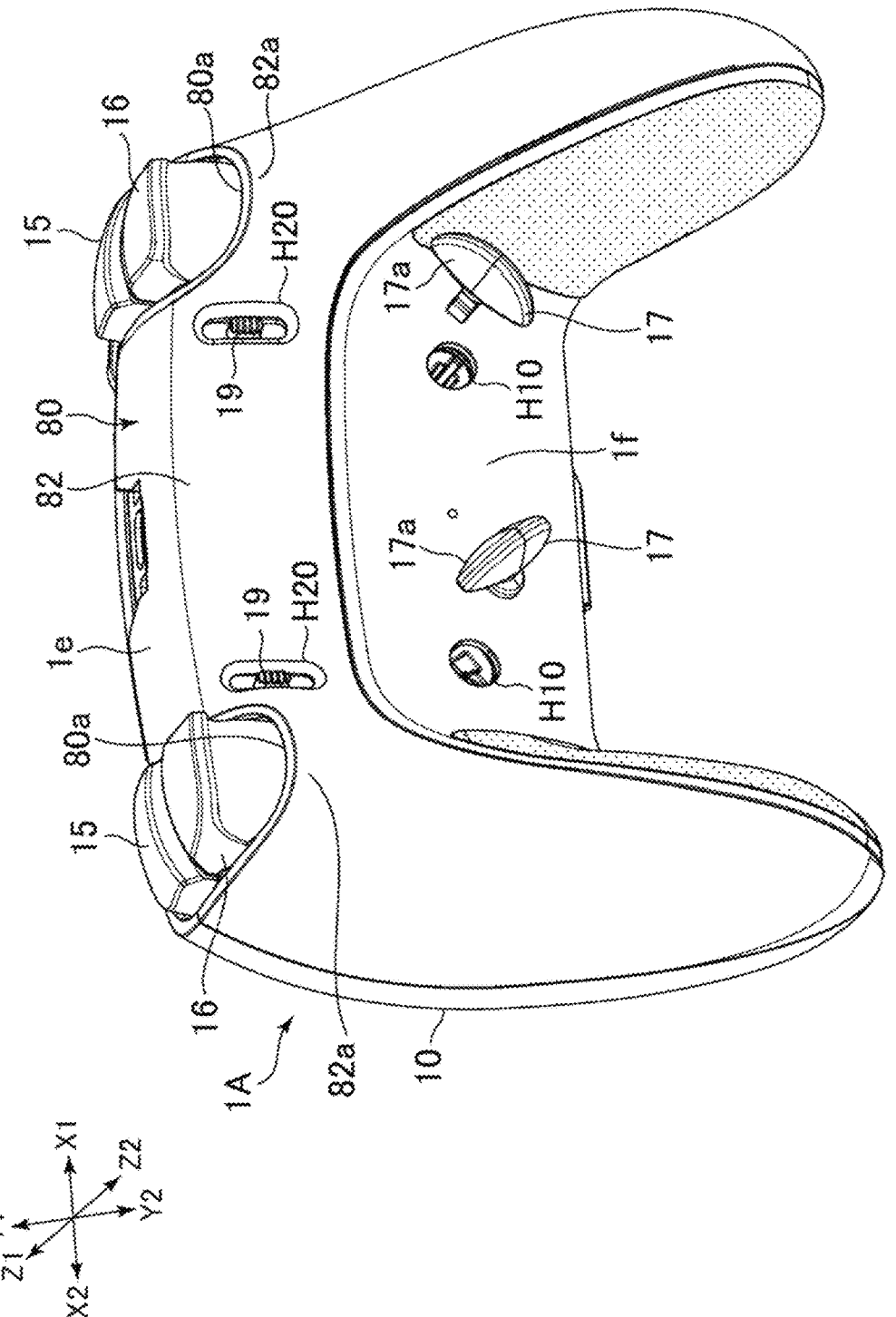
FIG. 3 is a perspective view illustrating a side surface and the lower surface of the input device and illustrating a state in which rear buttons are removed.
Figure 4:
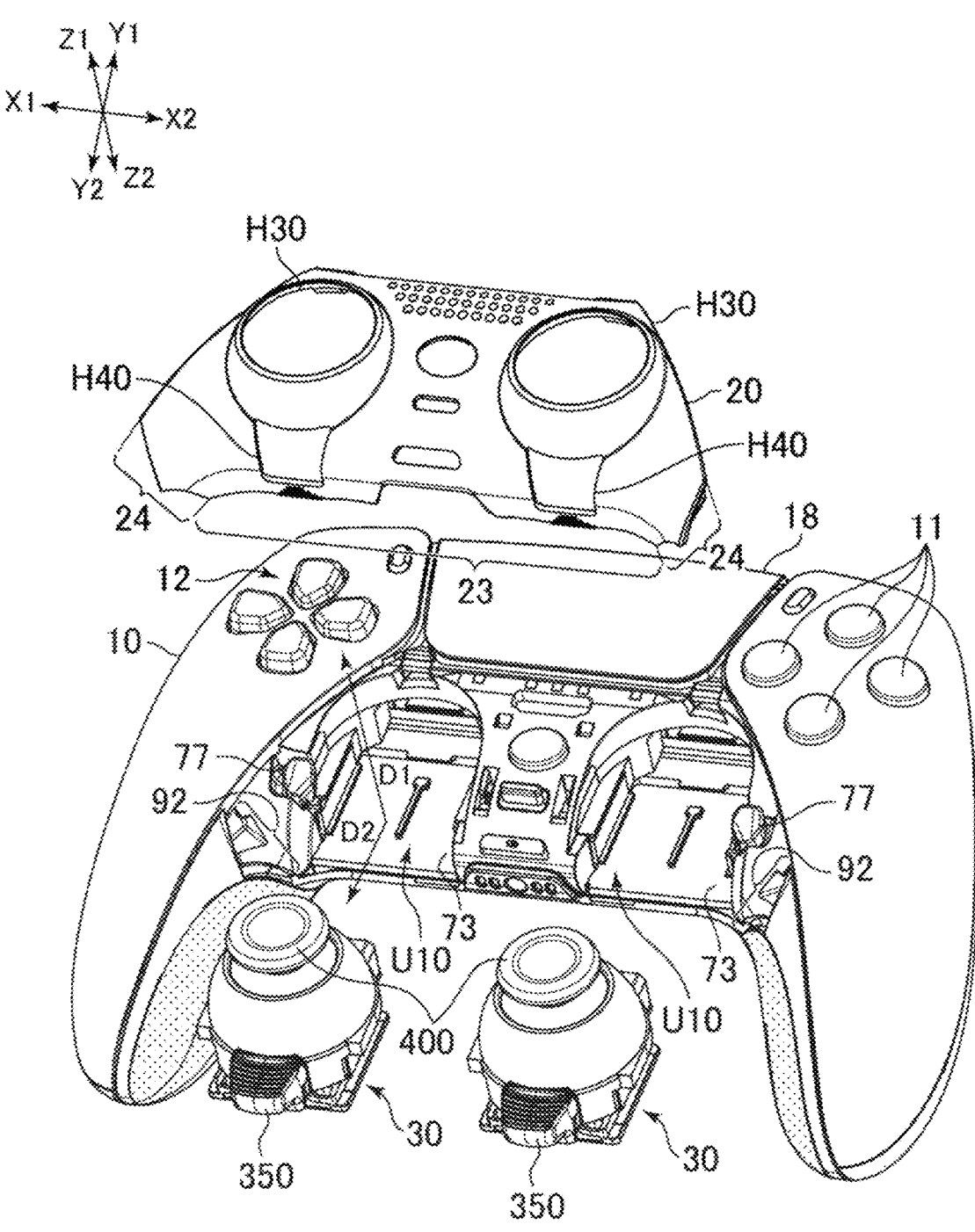
FIG. 4 is a perspective view illustrating the upper surface of the input device and illustrating a state in which an upper cover and stick units are removed.

An embodiment of the present disclosure will hereinafter be described with reference to the drawings. FIG. 1 is a plan view illustrating the upper surface of an input device 1A according to an example of the embodiment of the present disclosure. FIG. 2 is a bottom view illustrating the lower surface of the input device 1A. In addition, FIG. 3 is a perspective view illustrating a side surface and the lower surface of the input device 1A. FIG. 4 is a perspective view illustrating the upper surface of the input device 1A, and illustrates a state in which an upper cover 20 and two stick units 30 to be described later are removed. FIG. 5 is an exploded perspective view of the input device 1A.

In the following description, an X1 direction and an X2 direction of an X-axis (direction in which left and right grips 10BL and 10BR to be described later are arranged side by side) illustrated in FIG. 1 and the like are respectively set as a right direction and a left direction. In addition, a Y1 direction and a Y2 direction of a Y-axis perpendicular to the X-axis are respectively set as a frontward direction and a rearward direction. In addition, a Z1 direction and a Z2 direction of a Z-axis (extending direction of operation sticks 400 to be described later) perpendicular to the X-axis and the Y-axis illustrated in FIG. 3 and the like are respectively set as an upward direction and a downward direction. However, these directions and arrangement positions are defined to describe the shapes and relative positional relations of elements (parts, members, and portions) of the input device 1A, and do not limit the posture of the input device 1A.

[Outline of Input Device and Operation Members]

The input device 1A is used as a game-purpose input device for an information processing device that has a function of executing a game program. Incidentally, the input device 1A may be used as an input device for an information processing device that has a function of reproducing moving images, a function of communicating via the Internet, and the like. The input device 1A is capable of communication with the information processing device wiredly or wirelessly. The input device 1A transmits, to the information processing device, a signal corresponding to an operation performed on the input device 1A by a user.

The input device 1A has a main body 10 (see FIG. 4) that forms the external surface of the input device 1A. The main body 10 includes an upper case 40 and a lower case 80 (see FIG. 5) as well as an internal structure such as a main frame 50 (see FIG. 5) housed in these cases. An upper cover 20 (first exterior cover) and a lower cover 90 (second exterior cover) are attached to the main body 10. In the following description, the upper case 40 and the lower case 80 may be referred to simply as cases 40 and 80. In addition, the upper cover 20 and the lower cover 90 may be referred to simply as covers 20 and 90. A part of the external surface of the input device 1A is formed by the cases 40 and 80, and another part thereof is formed by the covers 20 and 90.

The external surface of the input device 1A includes an upper surface 1d (see FIG. 1) facing upward (first direction), a front surface 1e (see FIG. 3) facing frontward (second direction orthogonal to the first direction), and a lower surface 1f (see FIG. 3) facing downward.

The upper surface 1f is a surface formed by the upper case 40 and the upper cover 20. As illustrated in FIG. 1, the main body 10 of the input device 1A has four operation buttons 11 and a direction key 12 protruding upward from the upper surface 1d, an operation pad 18, and the like. In addition, the input device 1A has operation sticks 400 that protrude upward from the upper surface 1d. The lower surface 1f is a surface formed by the lower case 80 and the lower cover 90. Rear switches 19 and rear buttons 17 to be described later are arranged on the lower surface 1f. The front surface 1e is a surface that couples the front side of the upper surface 1d and the front side of the lower surface 1f to each other. As illustrated in FIG. 3, the main body 10 of the input device 1A has two operation buttons 15 and two trigger buttons 16 that protrude frontward from the front surface 1e.

In addition, as illustrated in FIG. 1, the main body 10 of the input device 1A includes a device front portion 10F on which a plurality of operation members are arranged. The device front portion 10F includes: a right portion 10R on which the four operation buttons 11 as push buttons are arranged; a left portion 10L on which the direction key 12 is disposed; and a central portion 10M as a part between the right portion 10R and the left portion 10L. The two operation buttons 15 are respectively arranged on the front surface of the right portion 10R and the front surface of the left portion 10L. As illustrated in FIG. 3, the two trigger buttons 16 are respectively arranged below the two operation buttons 15.

As illustrated in FIG. 1, the input device 1A has a right grip 10BR extending rearward from the right portion 10R of the device front portion 10F and a left grip 10BL extending rearward from the left portion 10L of the device front portion 10F. The right grip 10BR and the left grip 10BL extend rearward of a rear edge 10Ma of the central portion 10M. A rear end of the right grip 10BR and a rear end of the left grip 10BL are located rearward of the rear edge 10Ma of the central portion 10M. The user can stably grip the input device 1A by supporting the right grip 10BR by a right hand and supporting the left grip 10BL by a left hand. In this state, the user can perform operations of pressing the operation buttons 11 downward by a thumb of the right hand, pressing the direction key 12 by a thumb of the left hand, or pressing the operation buttons 15 and the trigger buttons 16 rearward by an index finger or a middle finger.

As illustrated in FIG. 1, the main body 10 of the input device 1A has the operation pad 18 in a plate shape in the central portion 10M. The operation pad 18 has a touch sensor. The touch sensor is a capacitive-type sensor, for example. The touch sensor outputs a signal corresponding to the position of a finger touching the upper surface of the operation pad 18. The operation pad 18 may be supported so as to be vertically movable according to a depressing operation of the user.

As illustrated in FIG. 1, the input device 1A has the operation sticks 400 in the rear of the operation pad 18. In the present embodiment, the input device 1A has two operation sticks 400. The two operation sticks 400 are arranged on a rear portion of the central portion 10M, the rear portion being in the rear of the operation pad 18, and are arranged side by side in a left-right direction. One of the two operation sticks 400 is located on a left portion of the central portion 10M. The other is located on a right portion of the central portion 10M. The user can tilt the operation sticks 400 with respect to the center lines of the operation sticks 400 located at initial positions, and can also rotate the operation sticks 400 about the center lines. The operation sticks 400 may be vertically movably supported so as to function as operation buttons. An operation member (such as an operation button) different from the operation sticks 400 may be disposed between the two operation sticks 400.

[Arrangement of Function Buttons]

In the present embodiment, two function buttons 350 are respectively arranged in the rear of the two operation sticks 400. The function buttons 350 can, for example, be used as buttons for setting the environment of a game while the information processing device is executing the game (processing of the game program). In other words, instructions to an operation system can be input by operating the function buttons 350. The user can set the environment of the game by, for example, operating another operation member (for example, an operation button 11 or the direction key 12) while pressing one of the two function buttons 350.

The "environment of the game" includes, for example, the volume of sound of the game generated from a speaker and the volume of sound in a voice chat (loudness of the voice of a partner), the magnitude or presence or absence of a vibration generated by a vibration motor 120 (see FIG. 5), the magnitude or presence or absence of a resistance to a depression of a trigger button 16, the sensitivity of the touch sensor possessed by the operation pad 18, the sensitivity of the operation sticks 400 (an amount of movement of a game screen, a game object, or the like relative to an angle of an operation stick 400), and the like. In addition, the "environment of the game" also includes an allocation of functions in the game to operation members such as the operation buttons 11 and the operation buttons 15. The function buttons 350 can also function as, for example, a shift key button or a control key button that imparts another function to another operation member (such as an operation button 11) other than the function buttons 350.

The function buttons 350 project rearward from the central portion 10M of the input device 1A, and are arranged in a region A surrounded by the rear edge 10Ma of the central portion 10M, a right side surface 10La of the left grip, and a left side surface 10Ra of the right grip as viewed in plan as illustrated in FIG. 1. Such an arrangement of the function buttons 350, for example, does not hinder game play (operation of the operation buttons 11, the direction key 12, the operation sticks 400, and the like) by the user, and enables the user to operate the function buttons 350 promptly as necessary.

In the example of FIG. 1, the function buttons 350 are arranged in the rear of the operation sticks 400 that are operated by the thumbs of the user. More specifically, the function button 350 on a left side is disposed in the rear of the operation stick 400 located on a left portion of the central portion 10M, and the function button 350 on a right side is disposed in the rear of the operation stick 400 located on a right portion of the central portion 10M. Therefore, the user can easily operate the function button 350 on the right side by, for example, shifting the position of the thumb operating an operation member on the right portion 10R (for example, the operation stick 400 on the right side) rearward. In addition, the function button 350 on the left side can be operated easily by shifting the position of the thumb operating an operation member on the left portion 10L (for example, the operation stick 400 on the left side) rearward.

The function buttons 350 can be pushed downward. The other operation members arranged on the upper surface 1d of the input device 1A (the operation buttons 11 and the direction key 12) are also members that can be pressed downward. That is, the operation direction of the function buttons 350 and the operation direction of the other operation members are the same. Thus, the user can press the function buttons 350 by the thumbs easily. In addition, an uneven pattern may be formed on the upper surfaces of the function buttons 350. This suppresses slippage of the thumbs of the user on the upper surfaces of the function buttons 350, and facilitates the operation of the function buttons 350 by using the thumbs.

[Arrangement of Rear Buttons]

As illustrated in FIG. 3, two holes H10 are provided in the lower surface 1f of the main body 10 of the input device 1A, and two rear buttons 17 (operated members) are respectively attached thereto. The two holes H10 are arranged side by side in the left-right direction in the device front portion 10F. One of the two holes H10 is located in a left portion of the main body 10. The other is located in a right portion of the main body 10. The two holes H10 are located frontward of the left grip 10BL and the right grip 10BR, and are located between the left grip 10BL and the right grip 10BR in the left-right direction.

In addition, as illustrated in FIG. 3, the lower surface 1f of the main body 10 of the input device 1A is provided with two holes H20 from which the rear switches 19 to be described later are exposed. The two holes H20 are located frontward of the two holes H10 in the device front portion 10F, and are arranged side by side in the left-right direction. The two holes H20 are located between the two trigger buttons 16 in the left-right direction.

As illustrated in FIG. 2 and FIG. 3, the rear buttons 17 attached to the respective holes H10 project downward from the lower surface 1f of the main body 10, and have an operated surface 17a to be pressed by a finger of the user. The operated surface 17a of the rear button 17 attached to the hole H10 on the left side (hole H10 on the right side in FIG. 2) of the two holes H10 faces a frontward and rightward oblique direction. The operated surface 17a of the rear button 17 attached to the hole H10 on the right side (hole H10 on the left side in FIG. 2) faces a frontward and leftward oblique direction. The rear button 17 on the left side can be pushed and tilted in a leftward and rearward oblique direction. The rear button 17 on the right side can be pushed and tilted in a rightward and rearward oblique direction. The user can perform an operation of pushing and tilting the rear buttons 17 by using middle fingers, for example, in a state in which the user is holding the left grip 10BL and the right grip 10BR. Because the user can perform an operation of pushing and tilting the rear button 17 on the left side toward the left grip 10BL, the user can easily operate the rear button 17 by using the middle finger of the left hand. Because the user can perform an operation of pushing and tilting the rear button 17 on the right side toward the right grip 10BR, the user can easily operate the rear button 17 by using the middle finger of the right hand.

As will be described later, the rear buttons 17 are attached to the holes H10 by magnetic force. The user can remove the rear buttons 17 attached to the main body 10 without the use of a tool or the like. For example, some games executed on the information processing device do not use the rear buttons 17. Therefore, because the rear buttons 17 are made removable, the user can optionally select whether or not to attach the rear buttons 17 to the input device 1A according to the kind of a game to be executed on the information processing device.

The upper cover 20 is attached to the main body 10 of the input device 1A (more specifically, the upper case 40 to be described later, which is illustrated in FIG. 5), and covers the upper surface of the main body 10. The user can remove the upper cover 20 from the main body 10 without the use of a tool such as a driver. Structures for attachment of the rear buttons 17 will be explained later in detail.

[Operation Sticks]

As illustrated in FIG. 4, the main body 10 of the input device 1A has housing recessed portions U10 for housing stick units 30. The stick units 30 are operation member units including the operation sticks 400 and circuits for detecting movement of the operation sticks 400 (circuits mounted on circuit boards 320 illustrated in FIG. 16). The stick units 30 can be attached to and detached from the housing recessed portions U10 of the main body 10. The housing recessed portions U10 open upward (in the Z1 direction) and rearward (in the Y2 direction). That is, the housing recessed portions U10 open in a direction, which is indicated by an arrow D1 in FIG. 4 and is orthogonal to a circuit board 60 to be described later (see FIG. 5) (in the projecting direction of the operation sticks 400), and in a direction, which is indicated by an arrow D2 in the same figure and is along the circuit board 60.

The user can extract the stick units 30 attached to the main body 10 rearward in a state in which the upper cover 20 is removed from the main body 10 and stopper members 77 to be described later are pulled outward in the left-right direction. Thus, the user can replace the stick units 30 with other stick units (for example, unused stick units, stick units including operation sticks 400 with a different height, or stick units provided with a decoration or the like). Because the housing recessed portions U10 open in the two directions of the upward direction (Z1 direction) and the rearward direction (Y2 direction), the user can extract the stick units 30 rearward, for example, while holding the upper sides of the stick units 30. The work of removing the stick units 30 can therefore be facilitated.

As illustrated in FIG. 4, the stick units 30 are provided with the operation sticks 400 and the function buttons 350. In addition, holes (openings) H30 and H40 that each expose at least a part of the stick units 30 are formed in the upper cover 20. The operation sticks 400 that project upward from the stick units 30 penetrate the holes H30 of the upper cover 20. The function buttons 350 that project rearward from the stick units 30 penetrate the holes H40 of the upper cover 20. Structures for attachment of the stick units 30 will be explained later in detail.

[Cases and Internal Structure]

As illustrated in FIG. 5, the input device 1A has the upper cover 20, the two stick units 30, the upper case 40, the main frame 50 (first frame), the circuit board 60, a reinforcing frame 70 (second frame), the lower case 80, and the lower cover 90. Incidentally, in the example illustrated in FIG. 5, the rear buttons 17 are removed.

The upper case 40 and the lower case 80 are a housing that houses the internal structure of the input device 1A, and form the external surface of the input device 1A. The upper case 40 forms a part of the external surface of each of the device front portion 10F, the right grip 10BR, and the left grip 10BL. Similarly to this, the lower case 80 forms a part of the external surface of each of the device front portion 10F, the right grip 10BR, and the left grip 10BL.

As illustrated in FIG. 5, the input device 1A includes, as the internal structure thereof, the main frame 50, the circuit board 60, and the reinforcing frame 70. The main frame 50 and the reinforcing frame 70 are attached to each other in an upward-downward direction. The circuit board 60 has a processor not illustrated, and is disposed in the central portion 10M of the input device 1A (see FIG. 1). The circuit board 60 is disposed between the main frame 50 and the reinforcing frame 70. In addition, a battery 110 is disposed between the reinforcing frame 70 and the lower case 80. Incidentally, in the following description, the main frame 50 and the reinforcing frame 70 may be referred to simply as the frames 50 and 70.

The upper case 40 covers the upper side of the internal structure (specifically, the main frame 50 and the reinforcing frame 70) of the input device 1A including the main frame 50 and the reinforcing frame 70, and is attached to the internal structure. The lower case 80 covers the lower side of the internal structure, and is attached to the internal structure, as with the upper case 40. Because the internal structure thus includes the reinforcing frame 70 in addition to the main frame 50, an improvement in the rigidity of the internal structure is achieved. The rigidity of the upper case 40 and the rigidity of the lower case 80 can be ensured by attaching the upper case 40 and the lower case 80 to the internal structure having a high rigidity.

The upper case 40, the main frame 50, the reinforcing frame 70, and the lower case 80 are formed by a resin, for example. This facilitates the processing of the upper case 40, the main frame 50, the reinforcing frame 70, and the lower case 80, and increases a degree of freedom of the attachment positions of screws for fixing these (positions of attachment holes). However, the material of the upper case 40, the main frame 50, the reinforcing frame 70, and the lower case 80 is not limited to a resin, but may, for example, be a metal or the like.

As illustrated in FIG. 5, the upper case 40 has recessed portions U11 at positions at which the two stick units 30 are respectively arranged. The recessed portions U11 are formed at the rear edge of the upper case 40, and open toward the rear. Similarly to this, the main frame 50 has recessed portions U12 at positions at which the two stick units 30 are respectively arranged. The recessed portions U12 are formed at the rear edge of the main frame 50, and open toward the rear. The housing recessed portions U10 (see FIG. 4) that house the stick units 30 are constituted by the recessed portions U11 of the upper case 40 and the recessed portions U12 of the main frame 50. The lower case 80 does not have recessed portions such as those of the upper case 40 and the main frame 50. Unlike the example illustrated in the figure, recessed portions that house the stick units 30 and open only upward may be formed in the upper case 40 and the main frame 50 in place of the recessed portions U11 and U12.

As illustrated in FIG. 5, a circuit board mounted with switches corresponding to the respective operation buttons 11 may be disposed on the upper surface of the main frame 50. The switches may be membrane switches, for example. In this case, a resin sheet mounted with the membrane switches may be used as the circuit board. Switches corresponding to respective directions indicated by the direction key 12 may also be arranged under the direction key 12.

Figure 6:
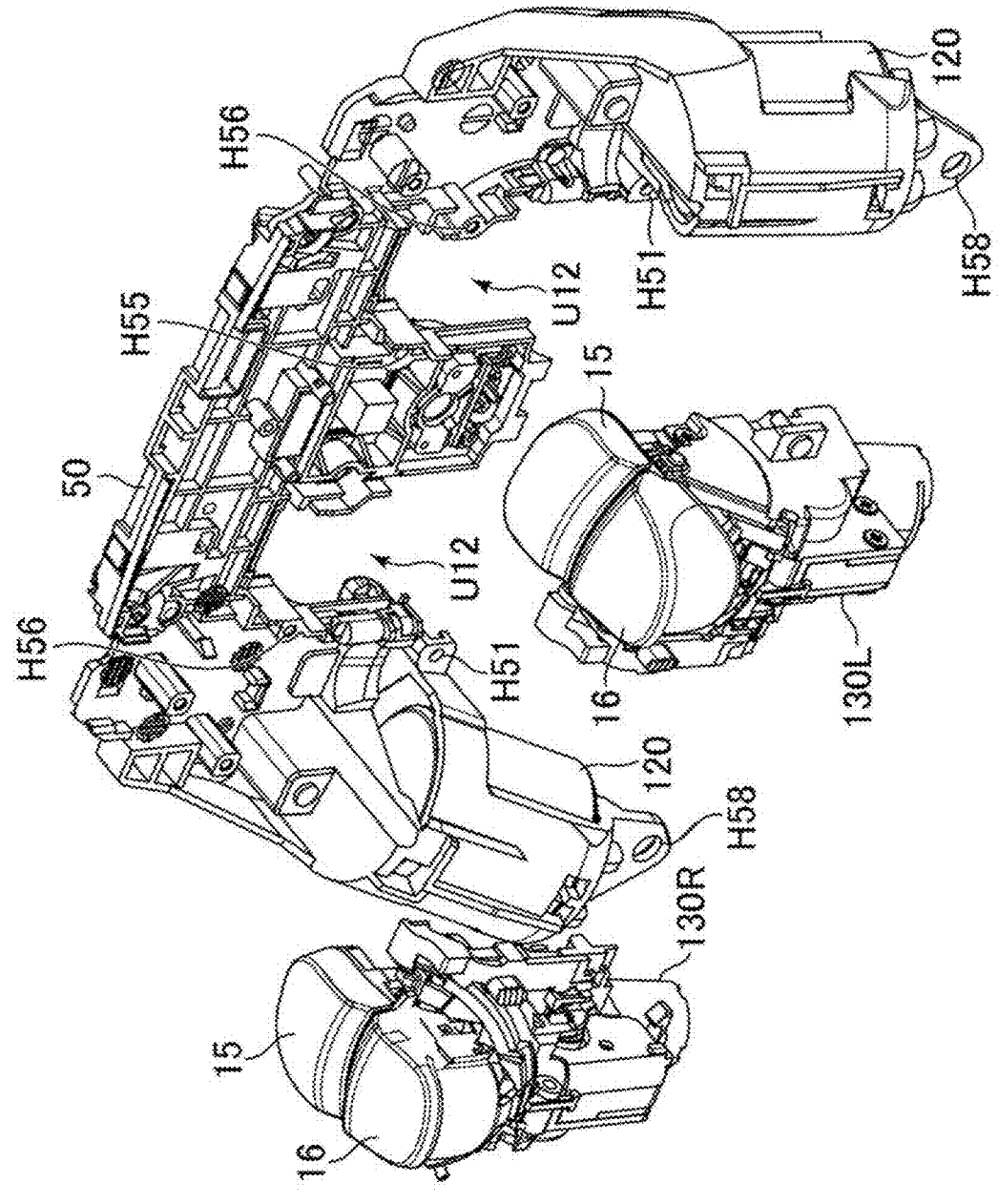
FIG. 6 is a perspective view illustrating the lower surface of a main frame, and is an exploded perspective view illustrating a state in which two trigger units are removed.

FIG. 6 is a perspective view illustrating the lower side of the main frame 50. In the main frame 50, two vibration motors 120 are respectively attached to parts arranged inside the right grip 10BR and the left grip 10BL. Two trigger units 130L and 130R including the operation buttons 15 and the trigger buttons 16 are attached to the lower side of the main frame 50. The two trigger units 130L and 130R are attached to the lower side of the main frame 50 by screws.

As illustrated in FIG. 6, the two trigger units 130L and 130R are arranged side by side in the left-right direction. The trigger unit 130L is disposed in a left portion of the input device 1A (left portion 10L of the device front portion 10F). The trigger unit 130R is disposed in a right portion of the input device 1A (right portion 10R of the device front portion 10F). In the following, the two trigger units 130L and 130R may be referred to simply as trigger units 130.

As illustrated in FIG. 6, the main frame 50 has two attachment holes H51 (a first part and a second part) separated from each other in the left-right direction. The two recessed portions U12 formed in the main frame 50 (recessed portions in which the stick units 30 are arranged) are formed at positions separated from each other in the left-right direction. The two recessed portions U12 are formed between the two attachment holes H51 and H51. As will be described later, the reinforcing frame 70 is fixed to the attachment holes H51 and H51. Thus, the rigidity of the main frame 50 can be enhanced on the peripheries of the recessed portions U12. In addition, the two attachment holes H51 and H51 are respectively arranged in the vicinities of the vibration motors 120. Therefore, because the reinforcing frame 70 is fixed to the attachment holes H51 and H51, the rigidity of the main frame 50 can be enhanced on the peripheries of the vibration motors 120.

As illustrated in FIG. 5, the circuit board 60 is attached to the lower side of the main frame 50. In the example illustrated in FIG. 5, the circuit board 60 has substantially the shape of a letter T, which is a shape avoiding the two recessed portions U12 formed in the main frame 50. Specifically, the circuit board 60 includes a rectangular board front portion 61 located below the operation pad 18 and a board rear portion 62 extending rearward from a lower end of the center of the board front portion 61. The recessed portions U12 are secured in the rear of a right portion and a left portion of the board front portion 61. The board rear portion 62 is disposed between the two recessed portions U12. Because the shape of the circuit board 60 is thus formed, the surface area of the circuit board 60 can be increased, and a space for arranging wiring and mounting components on the circuit board 60 can be secured, as compared with a case where the circuit board 60 includes only the rectangular board front portion 61.

The reinforcing frame 70 is attached to the lower side of the main frame 50, and is disposed below the main frame 50. The reinforcing frame 70 is, for example, formed by a material having a higher rigidity than the main frame 50. The rigidity of the whole of the internal structure including the main frame 50, the circuit board 60, and the like can be secured by attaching the reinforcing frame 70 to the main frame 50. In addition, the upper case 40 and the lower case 80 are fixed to the internal structure including the main frame 50 and the reinforcing frame 70 by screws not illustrated in the figure. This can secure the rigidity of the upper case 40 and the lower case 80, and thus improves the rigidity of the input device 1A as a whole.

As illustrated in FIG. 5, the reinforcing frame 70 includes a frame front portion 71 for supporting the board front portion 61 of the circuit board 60 and a frame rear portion 72 for supporting the board rear portion 62 of the circuit board 60. The frame front portion 71 and the frame rear portion 72 are of a rectangular shape, for example. The frame rear portion 72 is connected to the rear edge of the frame front portion 71, and is of a rectangular shape longer in the left-right direction than the frame front portion 71. Two stages 73 (see FIG. 4) on which the two stick units 30 are respectively arranged are secured in a right portion and a left portion of the frame rear portion 72. The board rear portion 62 is disposed between the two stages 73 in the frame rear portion 72.

Figure 7A:
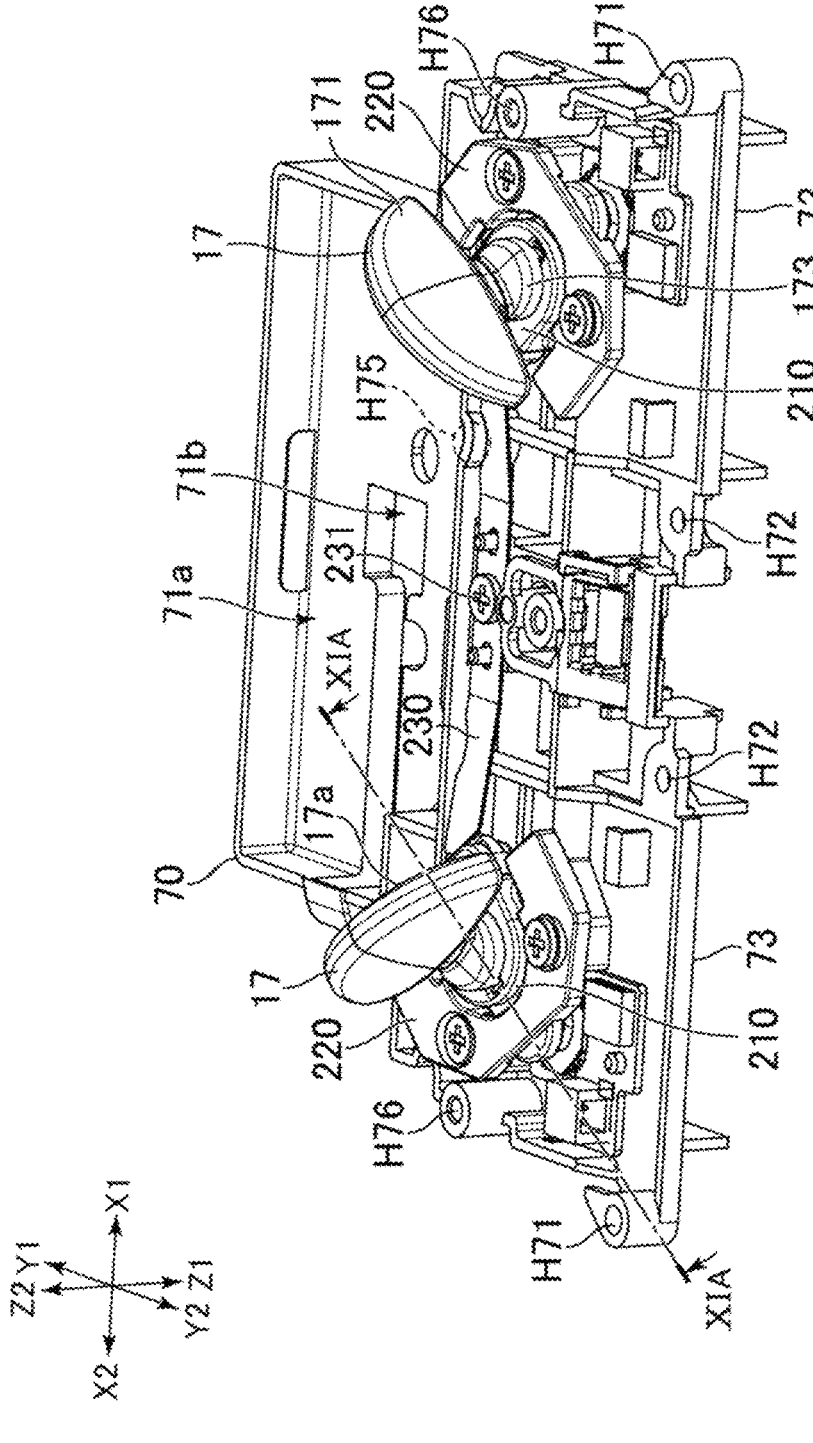
FIG. 7A is a perspective view illustrating the lower surface of a reinforcing frame.
Figure 7B:
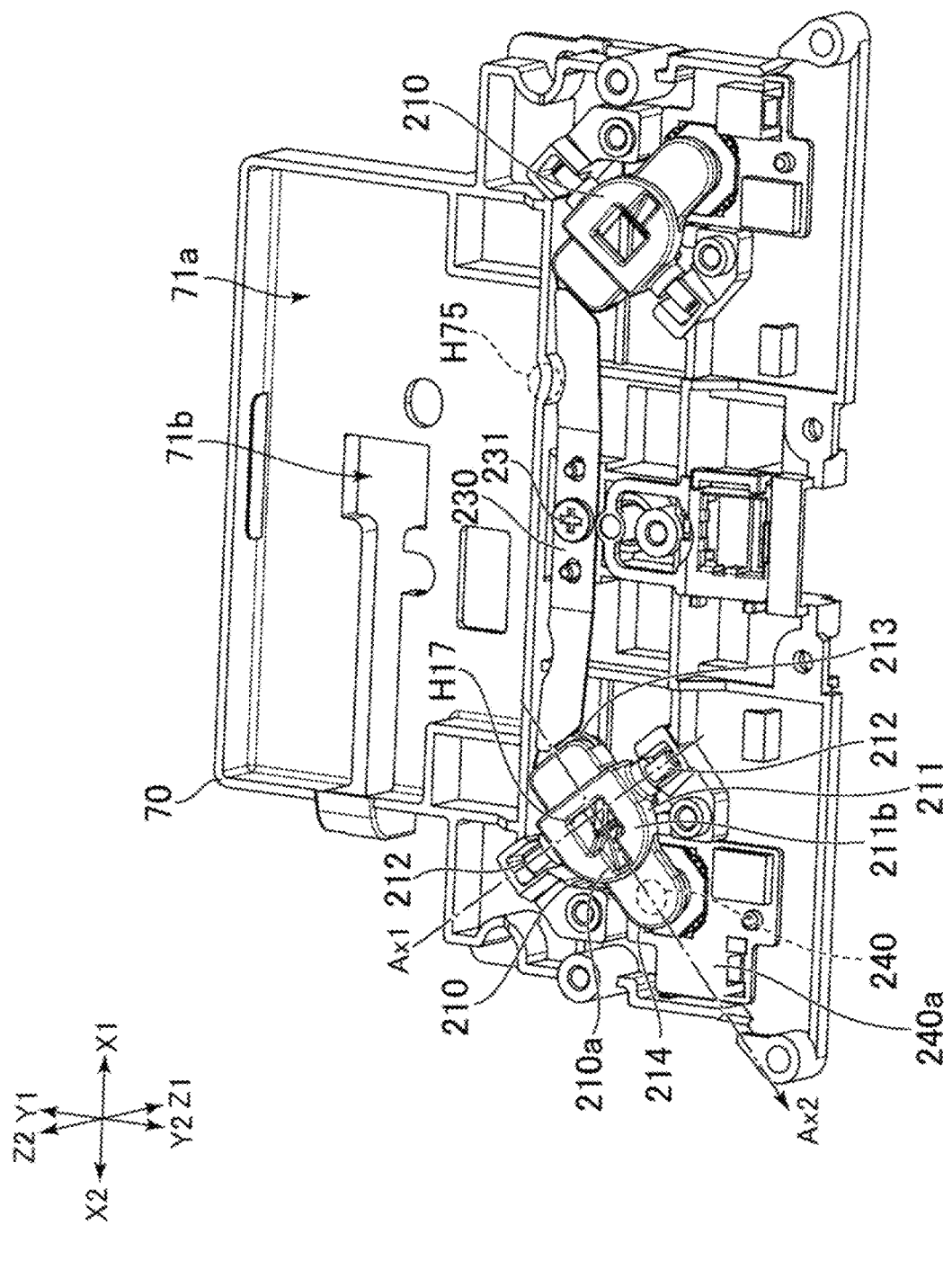
FIG. 7B is a perspective view illustrating the lower surface of the reinforcing frame, and is a view illustrating a state in which the rear buttons and falling-off preventing members are removed.

FIG. 7A is a perspective view illustrating the lower side of the reinforcing frame 70 to which the rear buttons 17 are attached. FIG. 7B is a perspective view illustrating the lower side of the reinforcing frame 70, and is a diagram illustrating a state in which the rear buttons 17 and falling-off preventing members 220 to be described later are removed. As illustrated in FIG. 5 and FIG. 7A, a box-shaped housing portion 71a for housing the battery 110 is formed in the frame front portion 71 of the reinforcing frame 70. In addition, a recessed portion 71b for housing a cable connected to the battery 110 is formed on the inside of the housing portion 71a.

In addition, as illustrated in FIG. 7A, a plurality of attachment holes H71, H72, H75, and H76 are formed in the reinforcing frame 70. A plurality of the attachment holes H71 and a plurality of the attachment holes H72 are arranged side by side in the left-right direction at the rear edge of the reinforcing frame 70. A plurality of the attachment holes H76 are respectively located at the left edge and the right edge of the reinforcing frame 70, and are formed frontward of the attachment holes H71. The attachment hole H75 (see FIG. 8) is located on the inside of the housing portion 71a. The attachment hole H75 may be located between the attachment holes H76.

Figure 9:
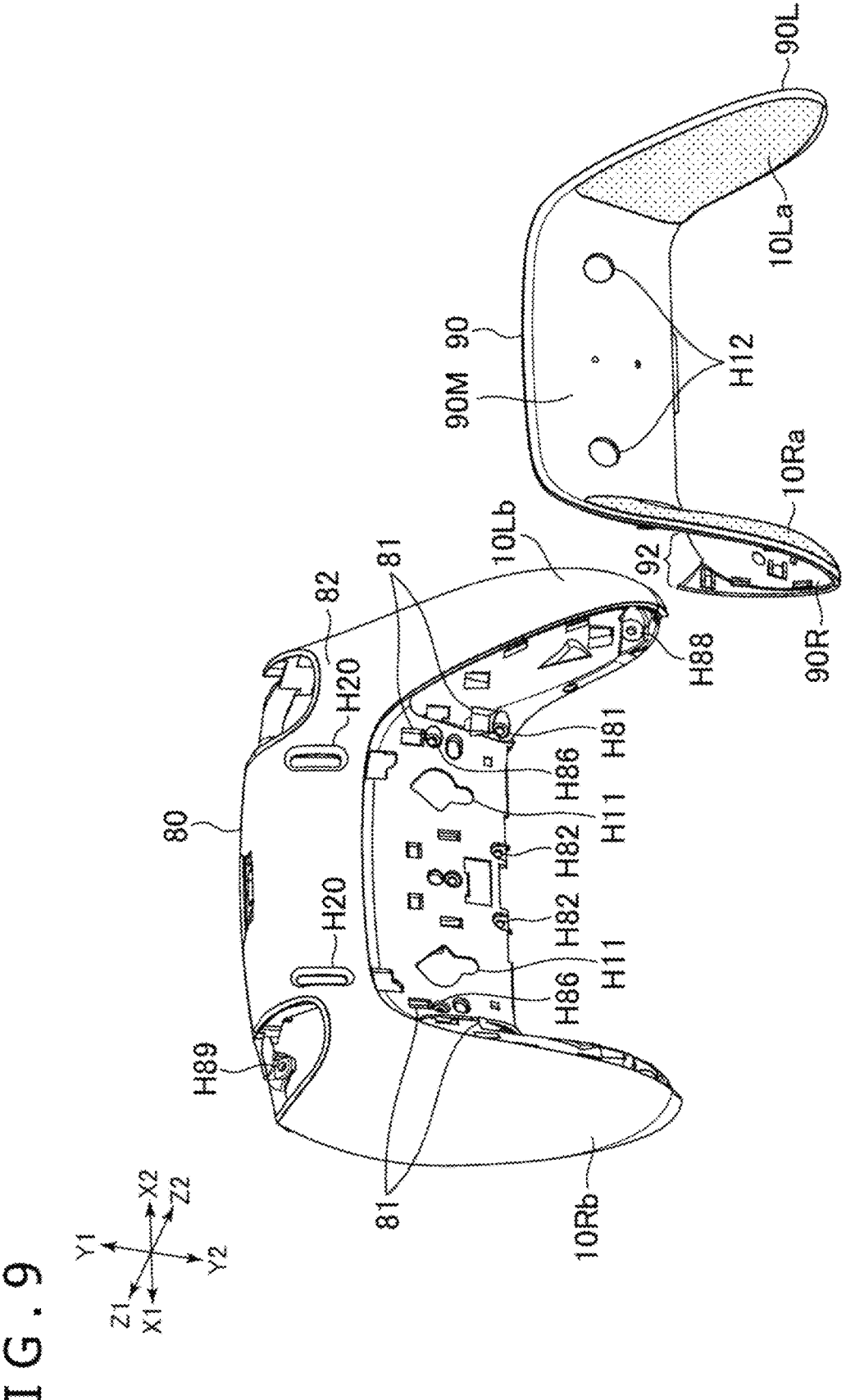
FIG. 9 is an exploded perspective view illustrating the lower case and a lower cover.

FIG. 8 is an exploded perspective view illustrating structures for attachment of the upper case 40, the main frame 50, the circuit board 60, the reinforcing frame 70, and the lower case 80. FIG. 9 is an exploded perspective view illustrating the lower case 80 and the lower cover 90. As illustrated in FIG. 9, the lower case 80 has a plurality of attachment holes H81, H82, H86, H88, and H89 formed therein as attachment portions to be attached to at least one of the upper case 40, the main frame 50, and the reinforcing frame 70. A plurality of the attachment holes H81 and H82 are arranged side by side in the left-right direction along the rear edge of the case 80. A plurality of the attachment holes H86 are located between the front edge and the rear edge of the case 80, and are formed so as to be separated from each other in the left-right direction. The two attachment holes H88 are formed in rear end portions of the left and right grips 10BR and 10BL. The two attachment holes H89 are provided at the front edge of the case 80. Specifically, the two attachment holes H89 are formed at the edges of openings within which the operation buttons 15 are arranged.

The input device 1A has a plurality of screws. These screws fix the lower case 80 to at least one of the upper case 40, the main frame 50, and the reinforcing frame 70. Attachment holes (attachment portions) into which common screws are inserted are formed in each of the upper case 40, the main frame 50, the reinforcing frame 70, and the lower case 80.

For example, screws inserted into the attachment holes H81 of the lower case 80 from the lower side are passed through the attachment holes H71 (see FIG. 7A) of the reinforcing frame 70 and the attachment holes H51 (see FIG. 6) of the main frame 50 along straight lines L1 and L4, and are fitted into attachment holes (not illustrated) of the upper case 40. Consequently, the lower case 80, the reinforcing frame 70, the main frame 50, and the upper case 40 are attached to each other. As illustrated in FIG. 6, peripheral parts of the two recessed portions U12 formed between the attachment holes H51 and H51 in the main frame 50 are attached to the reinforcing frame 70 by using the attachment holes H51 and H51, and can be thereby increased in strength. In addition, because the upper case 40, the main frame 50, the reinforcing frame 70, and the lower case 80 are fixed to each other by the common screws, the work of attaching these members is facilitated.

In addition, respective screws inserted into the attachment holes H82 (see FIG. 9) of the lower case 80 are respectively passed through the attachment holes H72 (see FIG. 7A) of the reinforcing frame 70 along straight lines L2 and L3 (see FIG. 8), respectively, and are fitted into attachment holes (not illustrated) of the upper case 40. The attachment holes H72 of the reinforcing frame 70 are not fixed to the main frame 50. However, between the attachment holes H72, a part of the reinforcing frame 70, which is between the two recessed portions U12 of the main frame 50, is fitted to the inside of the upper case 40. Thus, rattling of the main frame 50 can be suppressed between the attachment holes H72 and H72.

Screws inserted into the attachment holes H86 (see FIG. 9) of the lower case 80 from the lower side are fitted into the attachment holes H76 of the reinforcing frame 70. In addition, screws inserted into attachment holes H88 and H88 located in rear end portions of the left and right grips 10BL and 10BR in the lower case 80 are passed through attachment holes H58 and H58 of the main frame 50 along straight lines L5 and L6, and are fitted into attachment holes (not illustrated) of the upper case 40. Thus, rattling of rear end portions of the main frame 50 (parts in the rear of the vibration motors 120) can be suppressed within the input device 1A. In addition, screws inserted into the attachment holes H89 (see FIG. 9) formed at the front edge of the lower case 80 from the lower side are fitted into attachment holes of the upper case 40.

As illustrated in FIG. 8, a screw inserted into the attachment hole H75 of the reinforcing frame 70 is passed through an attachment hole (not illustrated) of the circuit board 60 and an attachment hole H55 (see FIG. 6) of the main frame 50 along a straight line L7, and is fitted into an attachment hole (not illustrated) of the upper case 40. Thus, the circuit board 60 is fixed between the main frame 50 and the reinforcing frame 70. As with the main frame 50, the board rear portion 62 (see FIG. 5) of the circuit board 60 is fitted, between the attachment holes H72 (see FIG. 7A) of the reinforcing frame 70, to the inside of the upper case 40. Consequently, rattling of the board rear portion 62 can also be suppressed.

The rigidity of the input device 1A can be secured by attaching the lower case 80 to the upper case 40, the main frame 50, the circuit board 60, and the reinforcing frame 70 by thus inserting a plurality of screws into the lower case 80. Because all of the plurality of screws for fixing the upper case 40 or the reinforcing frame 70 to the lower case 80 are inserted from the lower side of the lower case 80, it is possible to improve work efficiency at a time of assembling the input device 1A.

[Lower Cover]

The plurality of screws inserted into the lower case 80 are exposed on a lower surface 82 of the lower case 80. As illustrated in FIG. 9, the lower cover 90 is attached to the lower surface 82 of the lower case 80, and covers the plurality of attachment holes (for example, the attachment holes H81, H82, H86, and H88) formed in the lower case 80. As illustrated in FIG. 2 and FIG. 9, the lower cover 90 forms at least a part of each of the lower surface of the device front portion 10F, the left side surface 10Ra of the right grip 10BR, and the right side surface 10La of the left grip 10BL. Thus covering the plurality of screws inserted into the lower case 80 by the lower cover 90 can increase the fixation strength of the cases 40 and 80, the frames 50 and 70, and the like while an effect on the excellent external appearance of the input device 1A is being suppressed.

The plurality of screws that are inserted into the lower case 80 are inserted from the lower side of the lower case 80 toward the upper case 40. As illustrated in FIG. 4, the screws are not exposed from the upper case 40 in a state in which the upper cover 20 is removed from the input device 1A to replace the stick units 30. Therefore, even in the state in which the upper cover 20 is removed from the input device 1A, the external appearance of the input device 1A can be made excellent, and accidental removal of the screws by the user can be prevented.

As illustrated in FIG. 2 and FIG. 9, the lower cover 90 forms the left side surface 10Ra of the right grip 10BR and the right side surface 10La of the left grip 10BL. The lower cover 90 exposes the lower case 80 at a right side surface 10Rb of the right grip 10BR and a left side surface 10Lb of the left grip 10BL. The surface (left side surface 10Ra) of a right portion 90R (see FIG. 9) of the lower cover 90 has the form of a surface (part indicated by hatching in FIG. 9)

different from the right side surface 10Rb of the right grip 10BR. In addition, the surface (right side surface 10La) of a left portion 90L (see FIG. 9) of the lower cover 90 has the form of a surface different from the left side surface 10Lb of the left grip 10BL.

Here, a description that "form of a surface is different" means that a tactile feeling (texture) when the user touches the surface is different, and means that, for example, the shape or material (hardness or the like) of the surface is different. For example, in regions shaded in FIG. 2 and FIG. 9, the form of the surfaces is different from the right side surface 10Rb of the right grip 10BR and the left side surface 10Lb of the left grip 10BL. When the user is holding the input device 1A, fingers of the user holding the left grip 10BL are in contact with the right side surface 10La of the left grip 10BL, and fingers of the user holding the right grip 10BR are in contact with the left side surface 10Ra of the right grip 10BR. The fingers of the user are in contact with the surfaces facing the center of the input device 1A in the external surfaces of the left and right grips 10BL and 10BR. Here, because the regions in which the form of the surfaces is different are provided to the parts touched by the fingers of the user on the lower cover 90, the user can select a lower cover 90 that makes the own fingers feel a desired tactile feeling.

In the present embodiment, the surface of the lower cover 90 has an uneven pattern on the left side surface 10Ra of the right grip 10BR and the right side surface 10La of the left grip 10BL as the form of the surfaces different from the right side surface 10Rb of the right grip 10BR and the left side surface 10Lb of the left grip 10BL. Because an uneven pattern is thus formed on the parts with which the fingers are in contact, the user can grip the input device 1A more stably. The lower cover 90 may be formed by two-color molding. That is, the material of the parts on which the uneven pattern is formed may be different from the material of other parts. The parts on which the uneven pattern is formed may be formed by a resin having an elastic property or a rubber.

In the present embodiment, no uneven pattern is formed on the right side surface 10Rb of the right grip 10BR and the left side surface 10Lb of the left grip 10BL. That is, no uneven pattern is formed on the right side surface 10Rb and the left side surface 10Lb constituting the outside of the input device 1A in the left-right direction. This suppresses wear of the uneven pattern due to contact of the outside of the input device 1A in the left-right direction with another member (a wall or a floor within a room or the like), and makes it possible to maintain the quality of the input device 1A over a long period of time.

A part 90M constituting the central portion 10M in the lower cover 90 has no uneven pattern formed thereon either. The rear buttons 17 are arranged on the lower surface of the central portion 10M. Because no uneven pattern is formed on this part, the user can smoothly move fingers along the lower surface of the lower cover 90 in order to operate the rear buttons 17. In addition, the left portion 90L and the right portion 90R of the lower cover 90 are coupled to each other by the part 90M. Therefore, as compared with a structure in which the left portion 90L and the right portion 90R are two members independent of each other, it is possible to reduce the number of parts, and facilitate the assembling of the input device 1A.

The lower cover 90 covers a part rearward of the two holes H20 that expose the rear switches 19 in the device front portion 10F. The front edge of the lower cover 90 is located rearward of the two holes H20. This can suppress a decrease in a space within the lower case 80 (space in which the internal structure including the frames 50 and 70 and the like is disposed) by an amount corresponding to a thickness part of the lower cover 90 on the periphery of the two holes H20.

As illustrated in FIG. 9, two holes H1*l* arranged side by side in the left-right direction are formed in the lower case 80. Two holes H12 arranged side by side in the left-right direction are also formed in the lower cover 90. The holes H11 and the holes H12 are located at same positions in the left-right direction and the front-rear direction, and constitute the holes H10 into which the rear buttons 17 are inserted.

As illustrated in FIG. 9, a plurality of engaging portions 81 are formed in the lower case 80. The engaging portions 81 are, for example, holes or recessed portions. Engaging portions 91 (see FIG. 5) that catch the engaging portions 81 are formed on the cover 90. The engaging portions 91 are, for example, projecting portions to be fitted into the engaging portions 81 as holes or recessed portions, and pawls are formed on the projecting portions. The lower cover 90 can be attached to the lower case 80 by engagement between the engaging portions 81 and 91.

As illustrated in FIG. 1 and FIG. 4, the upper cover 20 has edge portions 24 at parts of the peripheral edge thereof, and the lower cover 90 has edge portions 92 at parts of the peripheral edge thereof, the edge portions 92 being adjacent to the edge portions 24 of the upper cover 20. Because the upper cover 20 and the lower cover 90 thus have the edge portions 24 and 92 adjacent to each other, the external appearance of the input device 1B can be made excellent. The upper cover 20 has a rear wall portion 23 constituting a rear edge in a central portion of the upper cover 20, and has the edge portions 24 respectively at a right portion and a left portion thereof located on opposite sides from each other with the rear edge of the upper cover 20 interposed therebetween. In addition, the lower cover 90 has the edge portions 92 respectively at the right portion and the left portion thereof. The edge portions 24 (protruding edges) located at the right portion and the left portion of the upper cover 20 are located rearward of the rear edge located in the central portion of the upper cover 20 (more specifically, the external surface of the rear wall portion 23).

As described above, the lower cover 90 forms the left side surface 10Ra of the right grip 10BR and the right side surface 10La of the left grip 10BL. Here, the two edge portions 92 of the lower cover 90 are respectively arranged at the left side surface 10Ra of the right grip 10BR and the right side surface 10La of the left grip 10BL. In addition, the two edge portions 24 of the upper cover 20 are respectively adjacent to the left side surface 10Ra of the right grip 10BR and the right side surface 10La of the left grip 10BL. The external surface of the upper cover 20 and the external surface of the lower cover 90 at the edge portions 24 are flush with each other at the edge portions 24 and 92. This can further improve the external appearance of the input device 1B.

[Structures for Attachment of Rear Buttons]

Figure 10A:
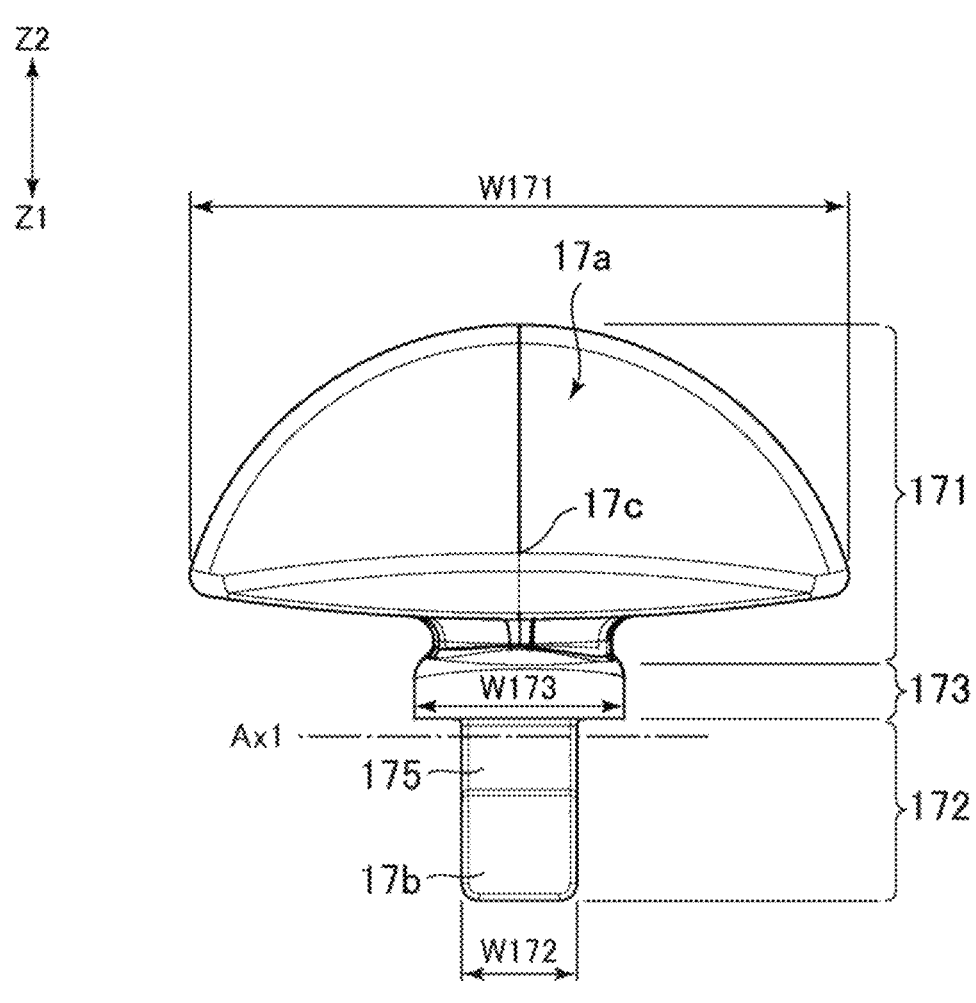
FIG. 10A is a side view of a rear button.
Figure 10B:
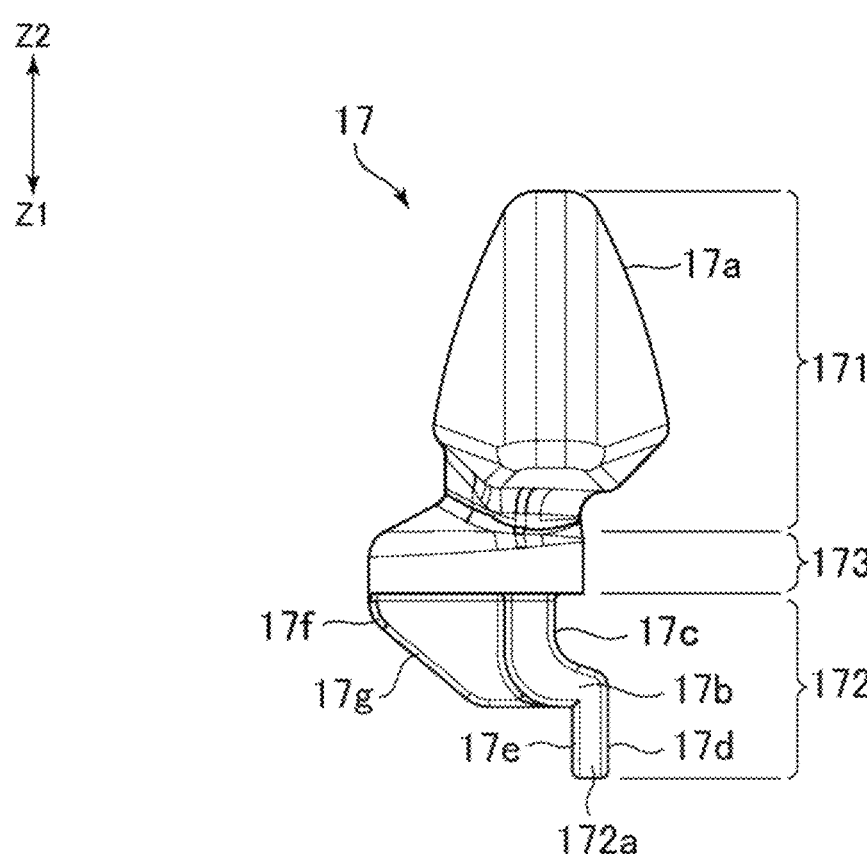
FIG. 10B is a side view of the rear button.
Figure 11A:
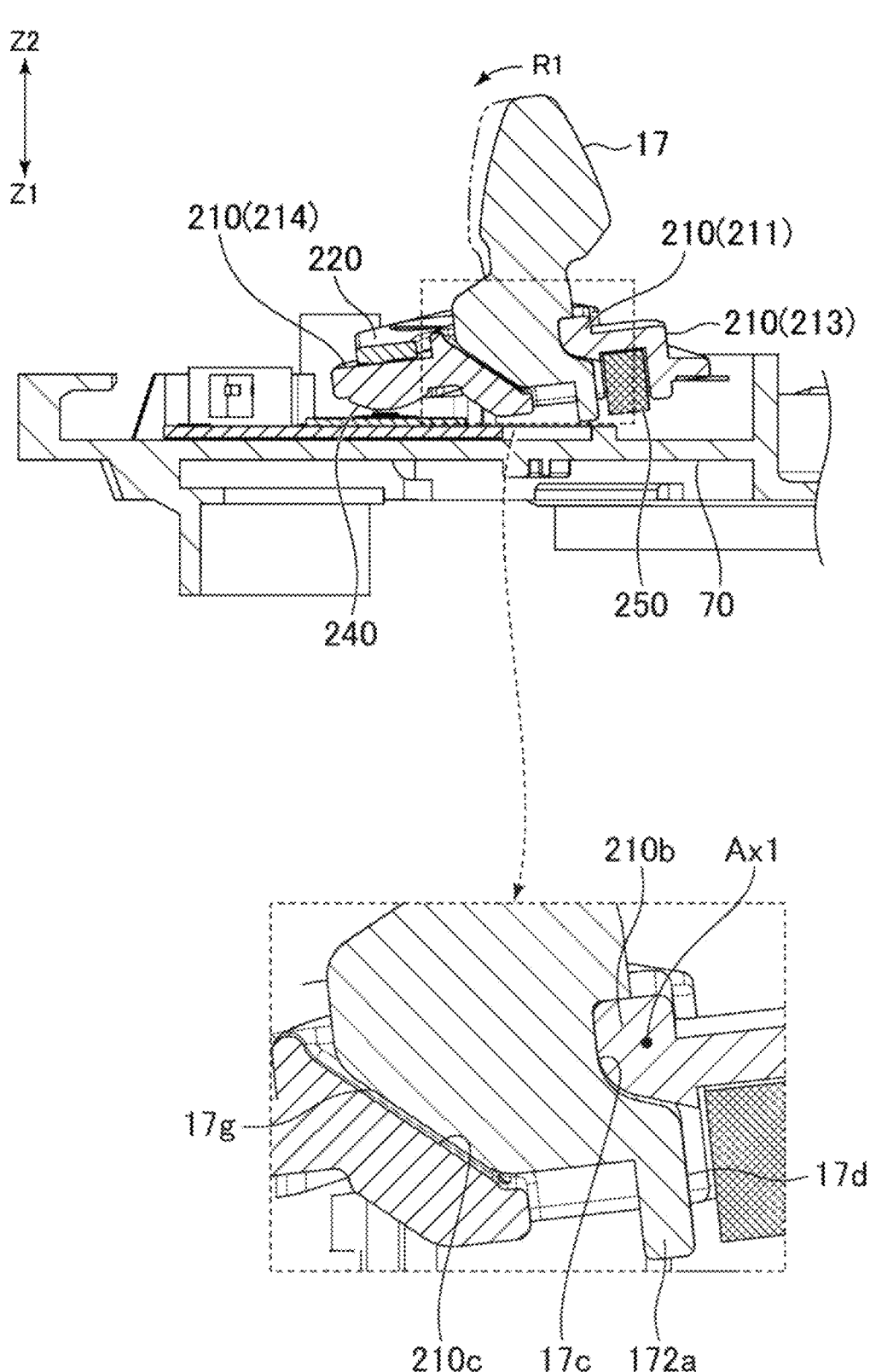
FIG. 11A is a sectional view taken along a line XIA-XIA in FIG. 7A.
Figure 11B:
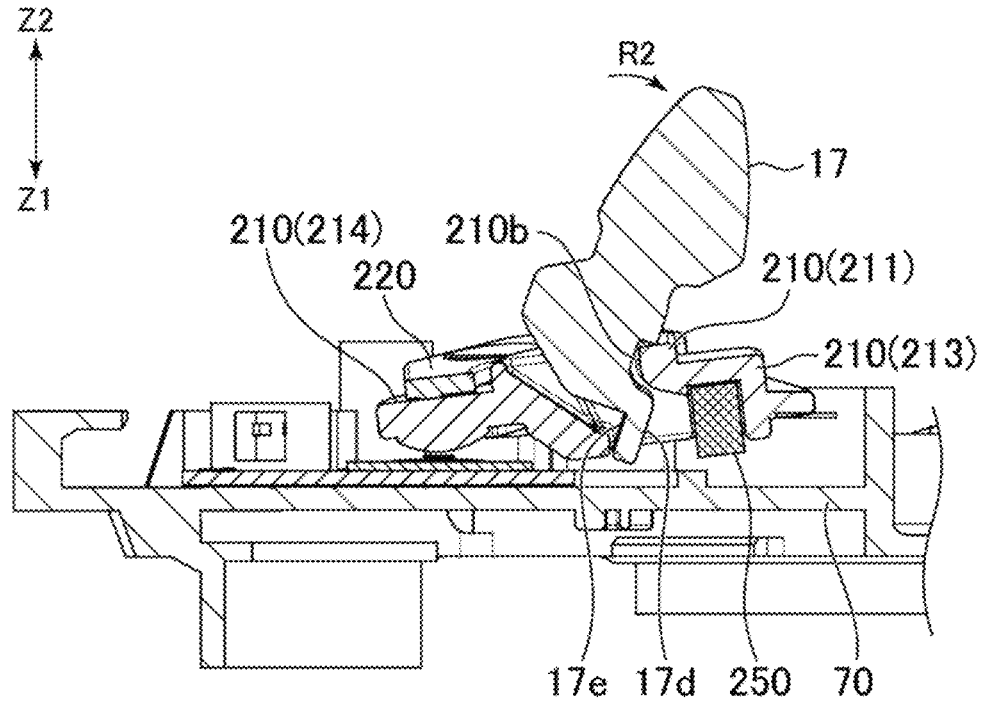
FIG. 11B is a view illustrating a motion of removing the rear button in the sectional view of FIG. 11A.
Figure 11C:
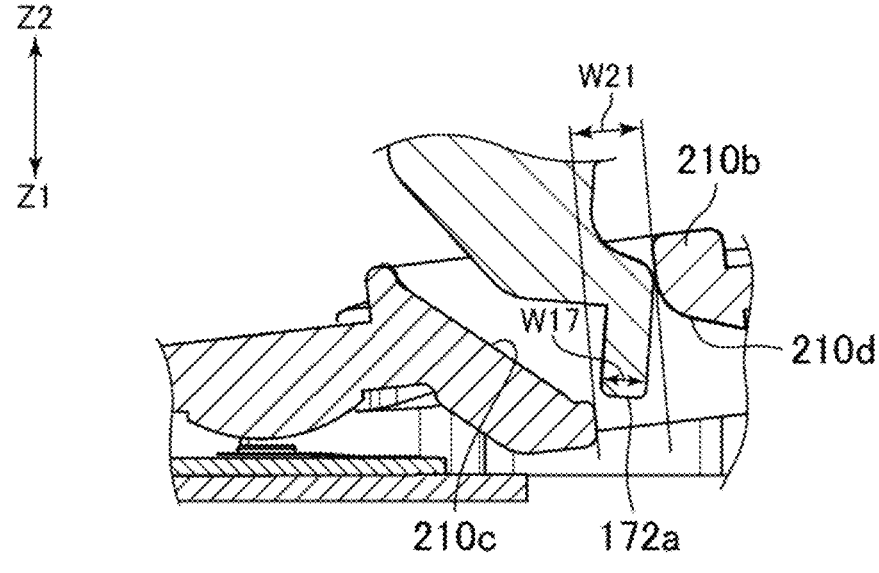
FIG. 11C is a view illustrating the motion of removing the rear button in the sectional view of FIG. 11A.
Figure 11D:
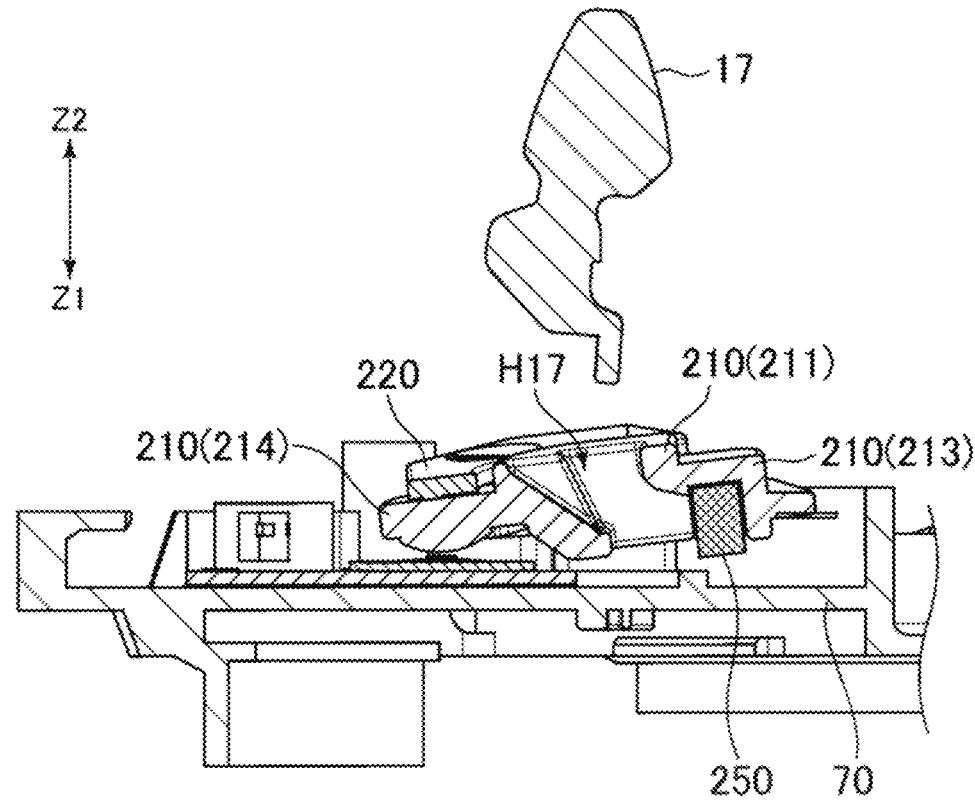
FIG. 11D is a view illustrating the motion of removing the rear button in the sectional view of FIG. 11A.

FIG. 10A is a view of the operated surface 17*a* of a rear button 17 as viewed from the front. FIG. 10B is a side view of the rear button 17. In the present embodiment, the two rear buttons 17 attached to the input device 1A have the same shape. However, the two rear buttons 17 may be different from each other in shape. FIG. 11A is a sectional view taken along a line XIA-XIA in FIG. 7A. FIG. 11B, FIG. 11C, and FIG. 11D are views illustrating an action of removing the rear button 17 in the sectional view of FIG. 11A.

As illustrated in FIG. 7A, the two rear buttons 17 can be attached to the reinforcing frame 70. More specifically, two supporting members 210 that respectively support the two rear buttons 17 are attached to the reinforcing frame 70, and the rear buttons 17 can be attached to the supporting member 210. The supporting members 210 and the rear buttons 17 can move integrally with each other about shaft portions 212 (see FIG. 7B) formed in the supporting members 210. Two falling-off preventing members 220 are respectively arranged under (in the Z2 direction in FIG. 7A with respect to) the two supporting members 210. The falling-off preventing members 220 prevent the falling off of the shaft portions 212 possessed by the supporting member 210. The falling-off preventing members 220 are each attached to the reinforcing frame 70. The falling-off preventing members 220 are fixed to the reinforcing frame 70 by screws, for example.

The supporting members 210 and the falling-off preventing members 220 may be formed by a metal. The rigidity of the supporting members 210 and the falling-off preventing members 220 can be thereby ensured. The material of the supporting members 210 and the falling-off preventing members 220 is not limited to a metal. The supporting members 210 and the falling-off preventing members 220 may be formed by a resin or the like. In addition, the supporting members 210 and the falling-off preventing members 220 may be formed by respective different materials.

As illustrated in FIG. 7A, a leaf spring 230 as an elastic member is attached to the reinforcing frame 70. The leaf spring 230 biases the supporting members 210 to initial positions (position indicated in FIG. 11A). The leaf spring 230 is, for example, a metallic sheet extending in the left-right direction. The leaf spring 230 is attached to the center of the reinforcing frame 70 by a screw 231. Both ends of the leaf spring 230 respectively catch ends of the two supporting members 210 (end portions of extending portions 213 to be described later; see FIG. 7B), and bias the ends of the respective supporting members 210 upward (in the Z1 direction). Because the two supporting members 210 are thus biased by one leaf spring 230, the number of parts can be reduced as compared with a case where two elastic members that bias the two supporting members 210 are provided. Incidentally, the elastic member that biases the supporting members 210 to the initial positions does not necessarily have to be the leaf spring 230. Two coil springs may be respectively provided to the two supporting members 210, or two leaf springs may be respectively provided to the two supporting members 210.

As illustrated in FIG. 7B, the supporting members 210 attached to the reinforcing frame 70 include a base portion 211 having a hole H17 formed therein and two shaft portions 212 projecting from the base portion 211 in directions opposite from each other. The shaft portions 212 have a cylindrical shape, and are fitted into grooves formed in the reinforcing frame 70. The supporting member 210 can move about an axis Ax1 of the two shaft portions 212. As illustrated in FIG. 7B, the axis Ax1 extends in an oblique direction with respect to both the left-right direction and the front-rear direction so as to approach the center in the left-right direction of the input device 1A toward the rear (in the Y2 direction). The left side rear button 17 attached to the supporting member 210 can be pushed and tilted toward the left grip 10BL gripped by the user. The right side rear button 17 attached to the supporting member 210 can be pushed and tilted toward the right grip 10BR.

Incidentally, the shaft portions 212 of the supporting member 210 are not limited to the example illustrated in FIG. 7B, but may be recessed portions or holes formed in two side surfaces facing each other. In this case, projecting portions to be fitted to the insides of the shaft portions 212 as recessed portions or holes may be formed on the reinforcing frame 70. In addition, the shaft portions 212 may be one shaft as long as the shaft does not interfere with the hole H17.

In addition, as illustrated in FIG. 7B, the supporting member 210 has a first extending portion 213 that extends from the base portion 211 in a direction orthogonal to the axis Ax1 of the shaft portions 212 and that is pushed upward (in the Z1 direction) by the leaf spring 230. The supporting member 210 has a second extending portion 214 that extends from the base portion 211 in an opposite direction (direction indicated by a straight line Ax2 in FIG. 7B) from the direction in which the first extending portion 213 extends. The second extending portion 214 is provided on an opposite side from the first extending portion 213 with the shaft portions 212 interposed therebetween. As illustrated in FIG. 7A, the falling-off preventing member 220 regulates the falling off of the shaft portions 212 from the grooves formed in the reinforcing frame 70. The falling-off preventing member 220 is substantially U-shaped. The falling-off preventing member 220 covers the second extending portion 214 in addition to the two shaft portions 212.

As illustrated in FIG. 7B, the input device 1A has a sensor (switch) 240 that outputs a signal corresponding to movement of the supporting member 210. A sensor board 240a mounted with the sensor 240 may be attached to the reinforcing frame 70, for example. The sensor 240 is separated from the axis Ax1 in the direction orthogonal to the axis Ax1 (direction indicated by the straight line Ax2 in FIG. 7B). The sensor 240 is disposed between the reinforcing frame 70 and the second extending portion 214 of the supporting member 210. The upper case 40 and the lower case 80 as a housing that houses the internal structure of the input device 1A house the supporting member 210, the falling-off preventing member 220, the leaf spring 230, and the sensor 240 together with the reinforcing frame 70.

The rear button 17 extends in a direction orthogonal to the axis Ax1 and intersecting the straight line Ax2. Specifically, as illustrated in FIG. 2, FIG. 7A, and FIG. 7B, the rear button 17 extends downward (in the Z2 direction) from the position of the axis Ax1. Then, the rear button 17 projects from the lower case 80 and the lower cover 90. The rear button 17 is attached to the supporting member 210 so as to move together with the supporting member 210. More specifically, as illustrated in FIG. 7A and FIG. 7B, the rear button 17 is attached to the inside of the hole H17 formed in the base portion 211 of the supporting member 210. The rear button 17 includes an insertion portion 172 that is inserted into the hole H17. The insertion portion 172 has a surface (inclined surface 17g to be described later) that is in contact with the inside of the hole H17 in an operating direction of the rear button 17 (rotational direction about the axis Ax1). Thus, due to this contact, the rear button 17 moves together with the supporting member 210.

The second extending portion 214 of the supporting member 210 is located on the lower side of the sensor 240. When the operated surface 17a of the rear button 17 is pushed by the user, and the supporting member 210 moves about the axis Ax1, the second extending portion 214 of the supporting member 210 slightly moves upward, and presses the sensor 240. When the sensor 240 is pressed by the second extending portion 214, the sensor 240 outputs a signal corresponding to the pressing. It is thereby possible to detect the pushing operation of the user on the rear button 17.

As illustrated in FIG. 7A, FIG. 7B, FIG. 10A, and FIG. 10B, the rear button 17 includes a projecting portion 171 that projects downward from the lower case 80 and the lower cover 90 in a state in which the rear button 17 is attached to the input device 1A. In addition, the rear button 17 includes the insertion portion 172 that is inserted into the hole H17 formed in the base portion 211 of the supporting member 210 and a supported portion 173 that covers the opening of the hole H17 in a state in which the insertion portion 172 is inserted in the hole H17. The projecting portion 171 has the operated surface 17*a* that is operated by a finger of the user.

As illustrated in FIG. 10A, the projecting portion 171, the supported portion 173, and the insertion portion 172 formed in the rear button 17 are arranged in the upward-downward direction in this order. In the direction of the axis Ax1 (left-right direction in FIG. 10A), a width W173 of the supported portion 173 is larger than a width W172 of the insertion portion 172. In a state in which the insertion portion 172 is inserted in the hole H17, the supported portion 173 may be in contact with a lower surface 211*b* (see FIG. 7B) of the base portion 211 of the supporting member 210. In addition, in the direction of the axis Ax1, a width W171 of the projecting portion 171 is larger than the width W173 of the supported portion 173. In the example illustrated in FIG. 10A, the width W171 of the projecting portion 171 is larger than twice the width W173 of the supported portion 173 (more specifically, three times the width W173). It is thereby possible to make the operated surface 17*a* of the projecting portion 171 wider and thus facilitate operation of the user on the operated surface 17*a*.

In FIG. 10A, the projecting portion 171 (operated surface 17*a*) of the rear button 17 is formed in substantially a semicircular shape. In addition, as illustrated in FIG. 10B, the operated surface 17*a* of the rear button 17 has a shape in which a lower end at a center thereof in the direction of the axis Ax1 bulges. The insertion portion 172 of the rear button 17 includes a curved portion 17*b* that extends upward (in the Z1 direction) from the supported portion 173 and then extends toward the first extending portion 213 (see FIG. 11A) of the supporting member 210. The curved portion 17*b* and the supported portion 173 form a recessed portion 17*c*. In addition, a projecting portion 172*a* that projects upward is formed as an end (end portion in the Z1 direction) of the insertion portion 172. The projecting portion 172*a* has a magnetic force receiving surface 17*d* facing in the direction of a magnet 250 to be described later and a stopper target surface 17*e* facing in an opposite direction from the magnetic force receiving surface 17*d* in a state in which the rear button 17 is attached to the supporting member 210. The stopper target surface 17*e* faces in a direction in which the sensor 240 is located. In addition, the insertion portion 172 includes a projecting portion 17*f* that projects from the curved portion 17*b* toward the sensor 240.

As illustrated in FIG. 7B, a recessed portion (groove portion) 210*a* recessed with a narrow width toward the direction of the sensor 240 is formed in the inner surface of the hole H17 formed in the base portion 211 of the supporting member 210. The projecting portion 17*f* formed in the rear button 17 is fitted into this recessed portion 210*a*. A direction in which the rear button 17 is oriented with respect to the hole H17 can be thereby limited to only one direction. That is, movement (rattling) of the rear button 17 in the direction along the axis Ax1 can be suppressed.

As illustrated in FIG. 11A, the supporting member 210 includes the magnet 250. The rear button 17 is formed by a magnetic substance such as iron. The rear button 17 is attached to the supporting member 210 by the magnetic force of the magnet 250. That is, the insertion portion 172 of the rear button 17 receives the magnetic force of the magnet 250, and is retained on the inside of the hole H17. At this time, the magnetic force receiving surface 17*d* is pulled by the magnet 250, and the inner surface of the recessed portion 210*a* of the supporting member 210 supports the projecting portion 17*f* of the rear button 17. Incidentally, without limitation to the example illustrated in the figure, the rear button 17 may, for example, have a magnet, and may be attached to the supporting member 210 by the magnetic force of the magnet. In this case, the supporting member 21 may be formed by a magnetic substance. In addition, a part of the rear button 17 may be formed by a magnetic substance (or a magnet). In this case, it suffices for the insertion portion 172 of the rear button 17 or the projecting portion 172*a* at the end of the insertion portion 172 to be a magnetic substance (or a magnet).

As illustrated in FIG. 7B and FIG. 11A, the magnet 250 is retained by the first extending portion 213 of the supporting member 210, and is located between the first extending portion 213 and the reinforcing frame 70. The magnet 250 is disposed on an opposite side from the sensor 240 with the axis Ax1 interposed therebetween, the axis Ax1 being defined by the shaft portions 212 of the supporting member 210. In other words, the magnet 250 is disposed on an opposite side from the sensor 240 with respect to the base portion 211 of the supporting member 210 (position in which the rear button 17 is attached).

The rear button 17 can move about the shaft portions 212 between the initial position indicated by a solid line in FIG. 11A and a first inclination posture indicated by a chain double-dashed line in FIG. 11A. The rear button 17 can move between the initial position and the first inclination posture together with the supporting member 210. The first inclination posture is defined in a first rotational direction R1 (see FIG. 11A) about the axis Ax1 (see FIG. 7B) defined by the shaft portions 212 of the supporting member 210 with respect to the initial position. When the rear button 17 is in the first inclination posture, the rear button 17 presses the sensor 240 via the second extending portion 214 of the supporting member 210.

The supporting member 210 is biased to the initial position by the leaf spring 230 (see FIG. 7B). The leaf spring 230 is disposed in an opposite direction from the sensor 240 with the axis Ax1 of the supporting member 210 interposed therebetween. This makes it possible to easily avoid interference between the leaf spring 230 and the sensor 240 and secure a sufficient size of the leaf spring 230.

As illustrated in FIG. 11A, a projecting portion 210*b* is formed at the edge of the opening of the hole H17 formed in the supporting member 210. The projecting portion 210*b* is fitted into the recessed portion 17*c* formed in the insertion portion 172 of the rear button 17. The magnetic force receiving surface 17*d* of the insertion portion 172 is located above (in the Z1 direction with respect to) the projecting portion 210*b*. Therefore, when the magnetic force receiving surface 17*d* is attracted by the magnet 250, a moment toward the first inclination posture acts on the rear button 17 at the initial position, and the projecting portion 17*f* of the rear button 17 comes into contact with the inner surface of the recessed portion 210*a* (inclined surface 210*c*) formed in the inner surface of the hole H17 of the supporting member 210.

As illustrated in FIG. 10B, an inclined surface 17g is formed on the projecting portion 17f of the rear button 17. In addition, as illustrated in FIG. 7B and FIG. 11A, the inclined surface 210c is formed also on the recessed portion 210a of the hole H17 formed in the supporting member 210. When the user moves the rear button 17 from the initial position to the first inclination posture in the first rotational direction R1 (operating direction of the rear button 17), the inclined surface 17g of the rear button 17 presses the inclined surface 210c of the supporting member 210. Thus, the rear button 17 moves from the initial position to the first inclination posture together with the supporting member 210. As described above, the inclined surface 17g of the rear button 17 is in contact with the inclined surface 210c of the supporting member 210 also when the rear button 17 is at the initial position. It is thereby possible to suppress rattling of the rear button 17 against the supporting member 210 when the user operates the rear button 17.

The rear button 17 can be moved to a second inclination posture illustrated in FIG. 11B. The second inclination posture is defined in a second rotational direction R2 as an opposite direction from the first rotational direction R1 with respect to the initial position in FIG. 11A. As described above, the projecting portion 210b (see FIG. 11A) formed on the supporting member 210 is fitted in the recessed portion 17c formed in the rear button 17. As illustrated in FIG. 11B, the rear button 17 can be moved from the initial position to the second inclination posture about a distal end of the projecting portion 210b. When the rear button 17 moves from the initial position to the second inclination posture, movement of the supporting member 210 is regulated by the falling-off preventing member 220. The rear button 17 is allowed to move in the downward direction (the Z2 direction or the projecting direction of the projecting portion 171), as illustrated in FIG. 11C and FIG. 11D, in a state in which the rear button 17 is in the second inclination posture. That is, the rear button 17 is allowed to move in a direction orthogonal to the axis Ax1. Thus, the rear button 17 can be removed from the supporting member 210 by an operation of the user from the outside of the upper case 40 and the lower case 80 as a housing. When the user removes the rear button 17, the user needs to perform a two-step operation of extracting the rear button 17 in the upward-downward direction after moving the rear button 17 in the second rotational direction R2. It is therefore possible to suppress the falling of the rear button 17 off the supporting member 210 without an intention of the user.

In addition, as illustrated in FIG. 11B, when the rear button 17 is in the second inclination posture, the stopper target surface 17e of the insertion portion 172 collides with the supporting member 210. This regulates further movement in the second rotational direction R2. Thus, in a case where the user intends to remove the rear button 17, the user can remove the rear button 17 by an easy operation.

As illustrated in FIG. 11C, a width W21 of a passage defined by the distal end of the projecting portion 210b and a lower end of the inclined surface 210c that supports the insertion portion 172 is larger than a width W17 of the projecting portion 172a of the rear button 17. Therefore, when the posture of the rear button 17 (posture of the projecting portion 172a) coincides with the opening direction of the passage defined by the distal end of the projecting portion 210b and the lower end of the inclined surface 210c, the rear button 17 can be removed from the supporting member 210 in the opening direction. In the projecting portion 210b of the supporting member 210 fitted in the recessed portion 17c of the rear button 17, a corner portion

210d (see FIG. 11C) that comes into contact with the curved portion 17b of the rear button 17 is chamfered. This makes it possible to smoothly make the rear button 17 coincide with the opening direction of the passage defined by the distal end of the projecting portion 210b and the lower end of the inclined surface 210c, as illustrated in FIG. 11C, after the user moves the rear button 17 in the second rotational direction R2 and disposes the rear button 17 in the second inclination posture.

[Structures for Attachment of Stick Units]

Figure 15:
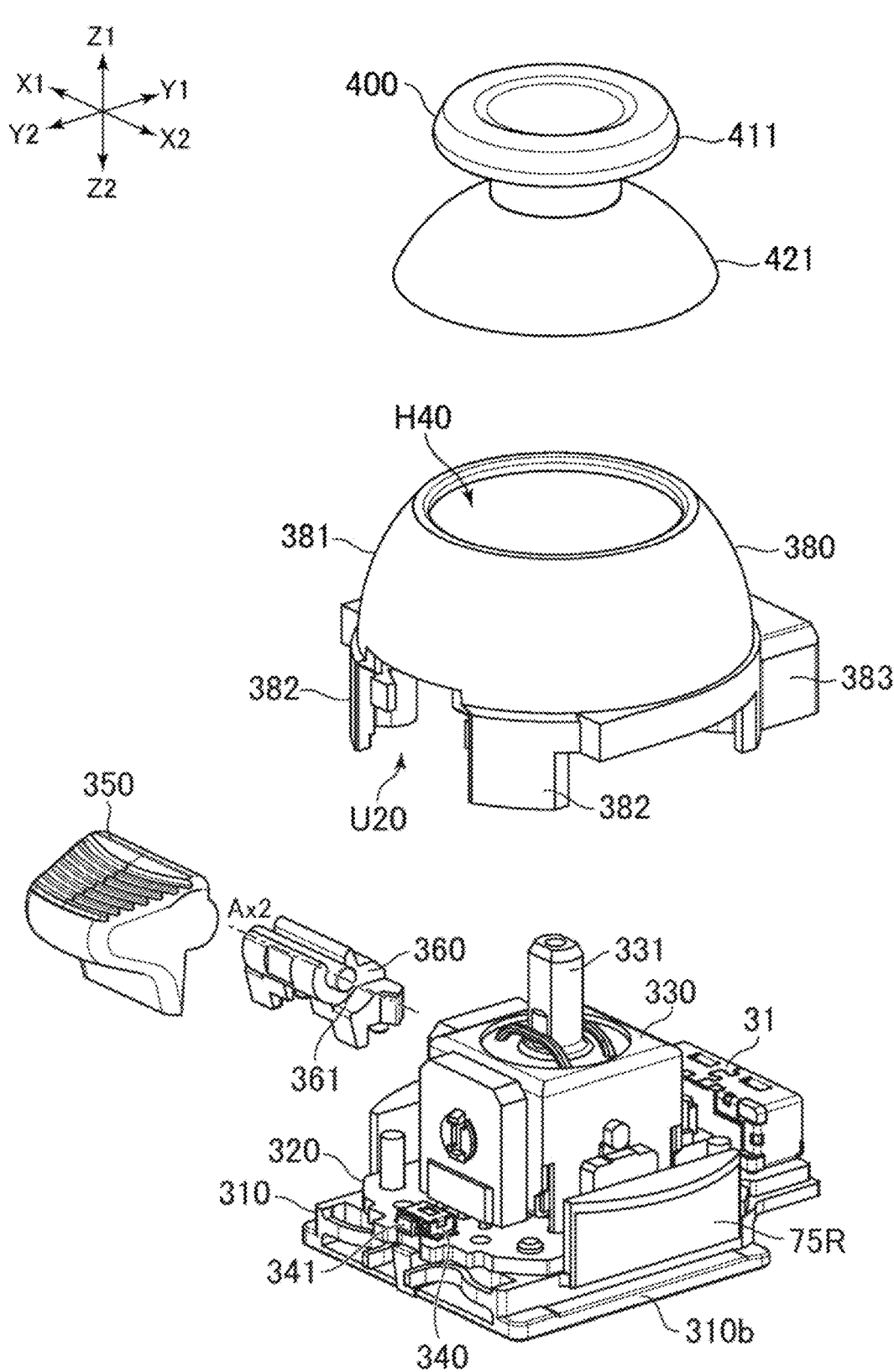
FIG. 15 is an exploded perspective view of the stick unit.

Supporting structures supporting the operation sticks 400 (a supporting mechanism 330 of the operation stick 400 illustrated in FIG. 15 and a pedestal member 310 as a supporting member of the operation stick 400) are detachably attached to the reinforcing frame 70. The supporting structures of the operation sticks 400 are attached to the upper surface of the reinforcing frame 70. In addition, as described above, the rear buttons 17 are detachably attached to the lower surface of the reinforcing frame 70. As illustrated in FIG. 4, the two stages 73 are provided to the upper surface of the reinforcing frame 70. The two stick units 30 including the supporting structures of the operation sticks 400 are detachably attached to the two stages 73, respectively. The two stages 73 are exposed from the housing recessed portions U10 in a state in which the upper cover 20 and the two stick units 30 are removed from the input device 1A.

Figure 12:
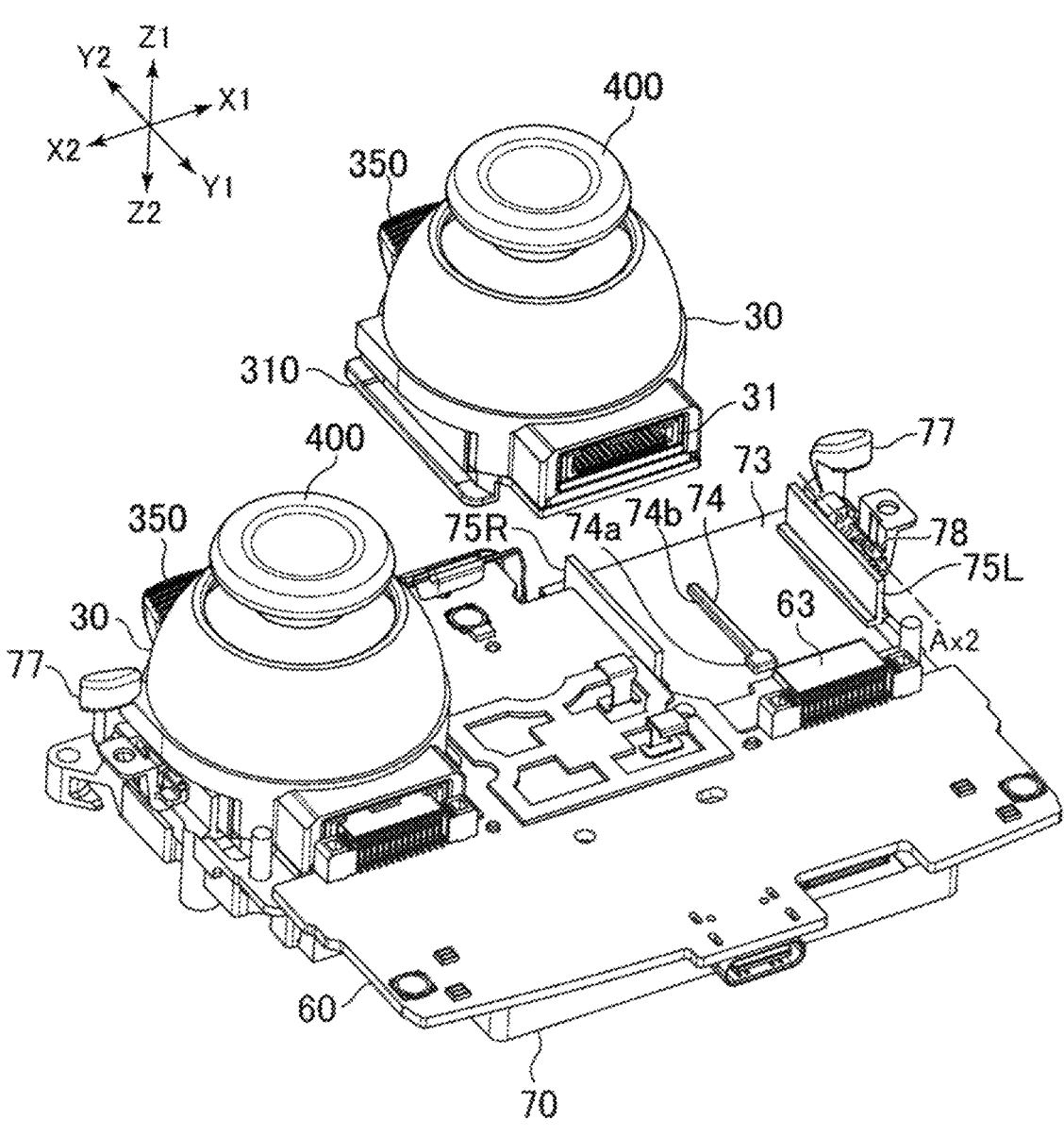
FIG. 12 is a perspective view illustrating the circuit board, the reinforcing frame, and the stick units.
Figure 13:
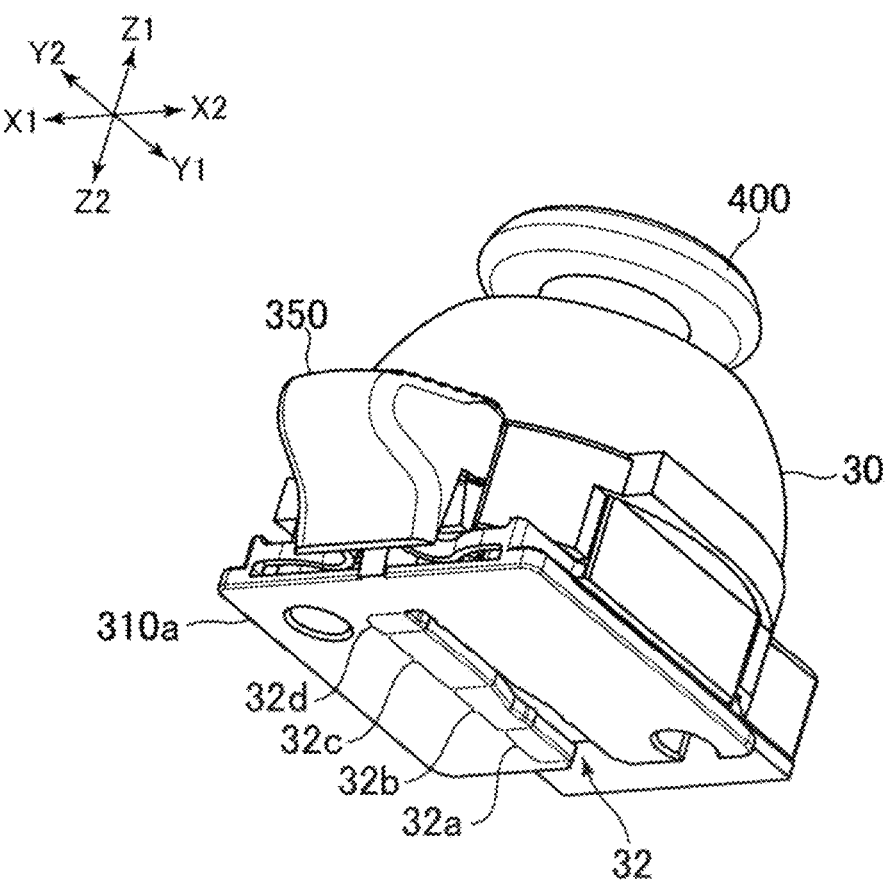
FIG. 13 is a perspective view illustrating the lower surface of a stick unit.
Figure 14:
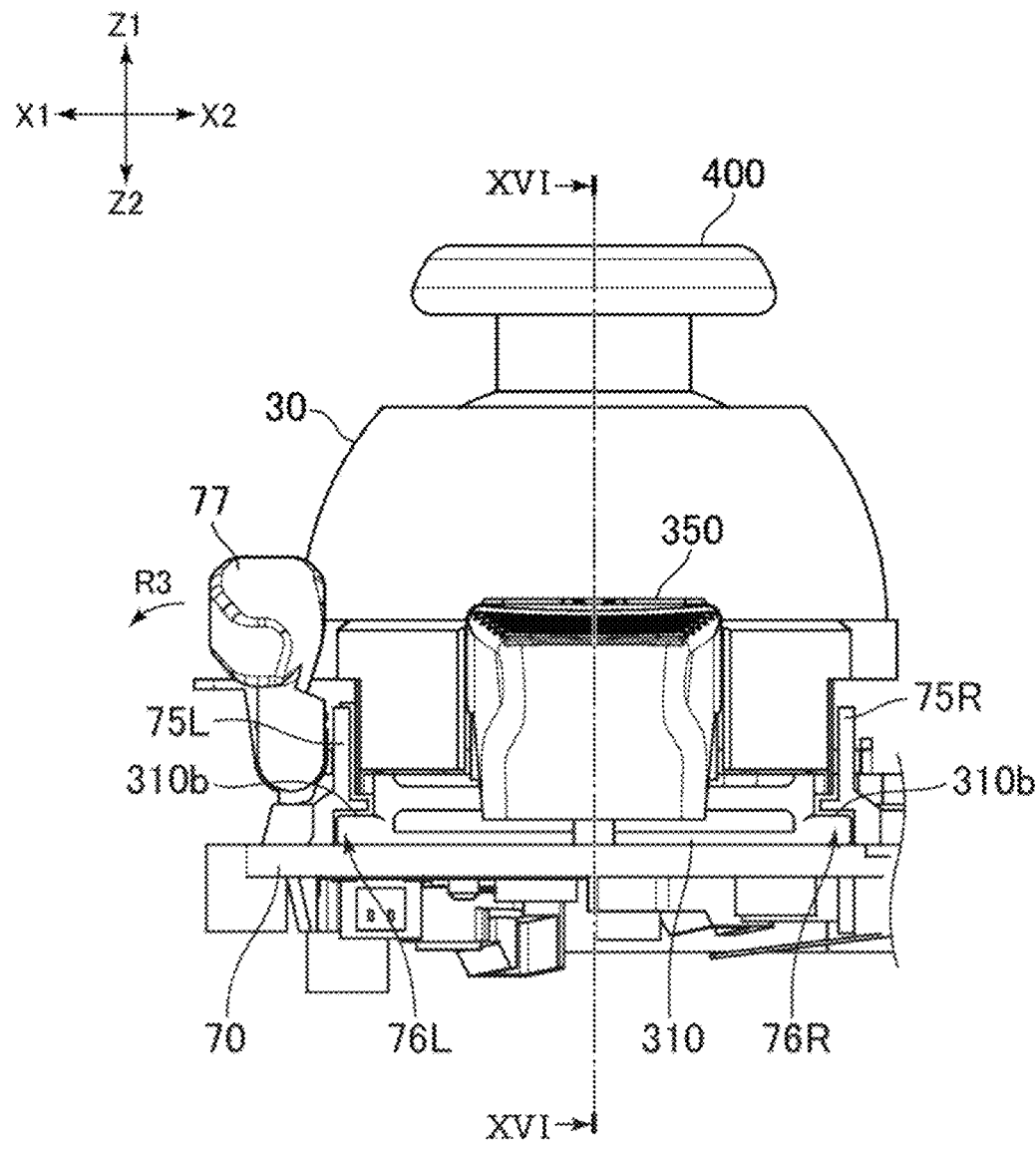
FIG. 14 is a rear view illustrating the rear surface of the reinforcing frame to which the stick unit is attached.
Figure 16:
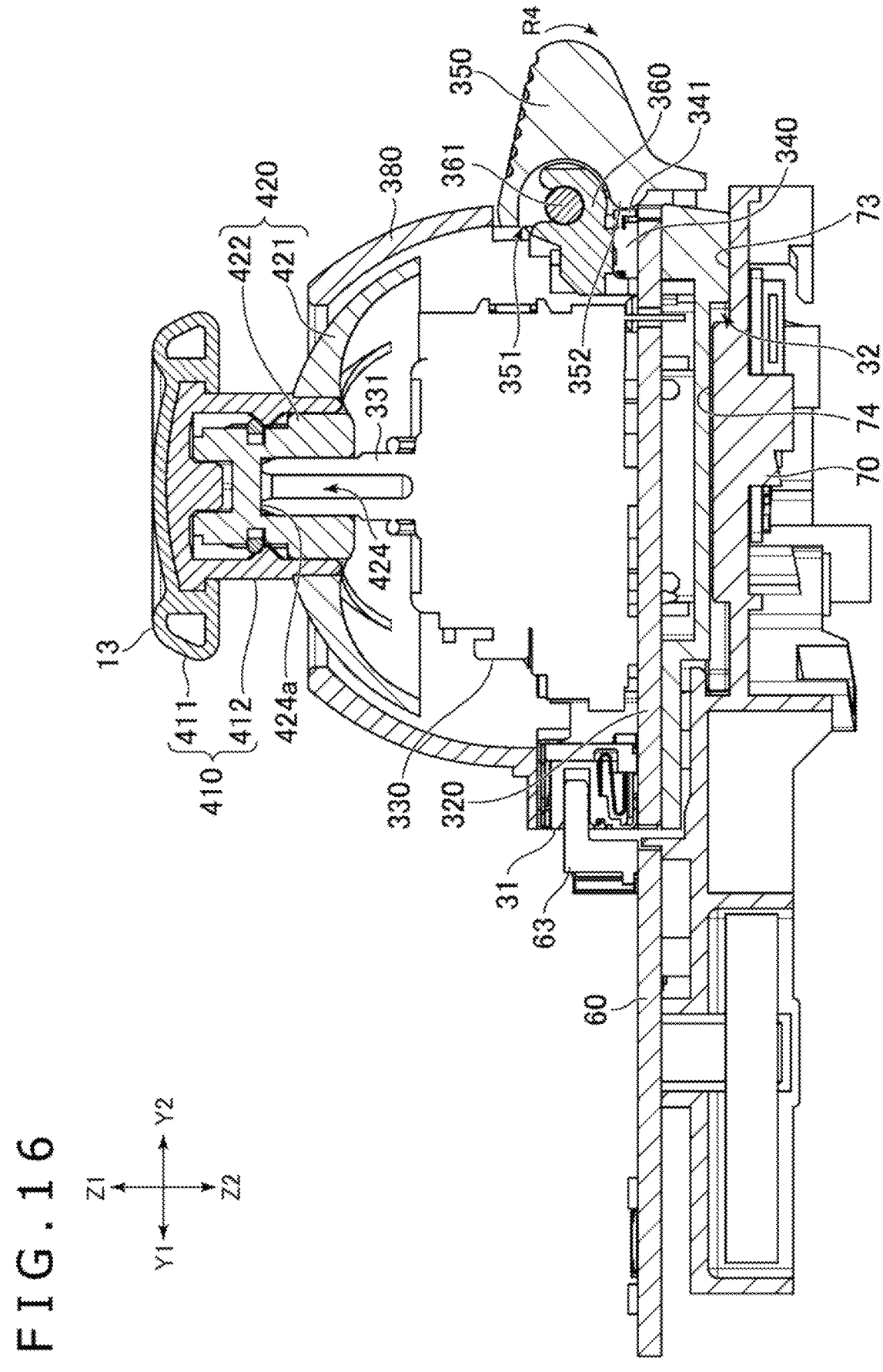

FIG. 12 is a perspective view illustrating the circuit board 60, the reinforcing frame 70, and the stick units 30. FIG. 13 is a perspective view illustrating the lower surface of a stick unit 30. FIG. 14 is a rear view illustrating the rear side of the reinforcing frame 70 in a state in which the stick unit 30 is attached thereto. FIG. 15 is an exploded perspective view of the stick unit 30. FIG. 16 is a sectional view taken along a line XVI-XVI of FIG. 14.

As illustrated in FIG. 12, the circuit board 60 is attached to the reinforcing frame 70. The circuit board 60 is disposed along the front-rear direction and the left-right direction in the main body 10 of the input device 1A. The stick units 30 can be attached to and detached from the housing recessed portions U10 illustrated in FIG. 4 in the front-rear direction. The circuit board 60 has connectors 63 (see FIG. 16) that open rearward. The stick units 30 have connectors 31 (see FIG. 16) that open frontward. The connectors 63 of the circuit board 60 and the connectors 31 of the stick unit 30 are fitted to each other in the front-rear direction. The stick units 30 are thereby electrically connected to the main body 10 of the input device 1A. In addition, the stick units 30 can be extracted rearward from the circuit board 60.

The main body 10 of the input device 1A and the stick units 30 have guides that extend in the front-rear direction and that regulate movement of the stick units 30 in the front-rear direction. As illustrated in FIG. 12, for example, a guide projecting portion 74 that projects upward from the upper surface of the reinforcing frame 70 is formed on the stage 73 of the reinforcing frame 70. The guide projecting portion 74 includes a rectangular front end portion 74a projecting on the stage 73 and an extending portion 74b extending rearward from the front end portion 74a. The extending portion 74b is formed with a narrower width than the front end portion 74a in the left-right direction.

As illustrated in FIG. 13, a guide recessed portion 32 that opens downward and frontward is formed in a lower surface 310a of the stick unit 30 (lower surface of a pedestal member 310 to be described later). When the stick unit 30 is fitted into the housing recessed portion U10, the guide projecting portion 74 of the reinforcing frame 70 fits into the guide recessed portion 32 of the stick unit 30. That is, the guide projecting portion 74 and the guide recessed portion 32 constitute a guide that regulates movement of the stick unit 30 in the front-rear direction.

As illustrated in FIG. 13, the guide recessed portion 32 includes: a first part 32a that extends rearward from a front end of the lower surface 310a of the pedestal member 310; a second part 32b that further extends rearward from the first part 32a and gradually decreases in width in the left-right direction; and a third part 32c that further extends rearward from the second part 32b. When the guide projecting portion 74 of the reinforcing frame 70 is inserted into an opening at a front end of the guide recessed portion 32, the front end portion 74a having a larger width in the left-right direction than the extending portion 74b of the guide projecting portion 74 passes through the first part 32a of the guide recessed portion 32, and catches inner walls of the second part 32b that gradually decreases in width in the left-right direction. It is thereby possible to suppress rattling in the left-right direction of the stick unit 30 attached to the housing recessed portion U10.

In addition, as illustrated in FIG. 13, the guide recessed portion 32 includes a rear end portion 32d located in the rear of the third part 32c. Projections that project to the inside of the guide recessed portion 32 are formed at a boundary between side surfaces of the third part 32c and side surfaces of the rear end portion 32d. The left and right projections formed at the boundary between the third part 32c and the rear end portion 32d sandwich the extending portion 74b of the guide projecting portion 74. It is thereby possible to suppress rattling in the left-right direction of the stick unit 30 in the housing recessed portion U10.

As illustrated in FIG. 12 and FIG. 14, guide walls 75L and 75R that extend upward are respectively formed on the left and right of the stage 73 in the reinforcing frame 70. The stick unit 30 is disposed between the guide wall 75L on the left side and the guide wall 75R on the right side. The left side surface of the stick unit 30 may be in contact with the guide wall 75L on the left side. In addition, the right side surface of the stick unit 30 may be in contact with the guide wall 75R on the right side. It is thereby possible to suppress rattling in the left-right direction of the stick unit 30.

As illustrated in FIG. 12, the main body 10 of the input device 1A has a stopper member 77. The stopper member 77 is attached to the reinforcing frame 70 constituting the main body 10 via a spring 78 as an elastic member. The stopper member 77 can be moved between a locking position (first position) for regulating movement in the front-rear direction of the stick unit 30 and an unlocking position (second position) for allowing movement in the front-rear direction of the stick unit 30. The stopper member 77 can move in a rotational direction R3 (see FIG. 14) about an axis Ax2 defined by a shaft portion to which the spring 78 is attached. As illustrated in FIG. 14, when the stopper member 77 is at an initial position as the locking position by being biased by the spring 78, the stopper member 77 interferes with the stick unit 30 in the front-rear direction, and regulates rearward movement of the stick unit 30. The user can extract the stick unit 30 rearward by moving the stopper member 77 to the unlocking position in the rotational direction R3 against the elastic force of the spring 78.

As illustrated in FIG. 14 and FIG. 15, the pedestal member 310 forming the lower surface 310a of the stick unit 30 includes a projecting portion (guided portion) 310b projecting in the left direction at a lower edge on the left side of the pedestal member 310, and includes a projecting portion (guided portion) 310b projecting in the right direc-tion at a lower edge on the right side of the pedestal member 310. In addition, a groove portion (guide portion) 76L recessed in the left direction is formed between the guide wall 75L on the left side and the stage 73. A groove portion (guide portion) 76R recessed in the right direction is also formed between the guide wall 75R on the right side and the stage 73.

As illustrated in FIG. 14, in a state in which the stick unit 30 is attached to the reinforcing frame 70, the left and right projecting portions 310b of the pedestal member 310 respectively enter the insides of the recessed portions 76L and 76R. Here, the projecting portions 310b of the pedestal member 310 are sandwiched in the upward-downward direction by the inner surfaces of the recessed portions 76L and 76R. It is thereby possible to suppress rattling of the stick unit 30 also in the upward-downward direction.

[Internal Structures of Stick Units]

As illustrated in FIG. 15, the stick unit 30 includes the pedestal member 310 and the connector 31, the circuit board 320, the supporting mechanism 330, a sensor part 340, the function button 350, a supporting member 360, a cover member 380, and the operation stick 400. The supporting mechanism 330 is a supporting mechanism that supports the operation stick 400. The supporting mechanism 330 has a supporting projecting portion 331 that projects upward. The supporting mechanism 330 allows the supporting projecting portion 331 to be inclined with respect to a center line along the upward-downward direction, and supports the support-ing projecting portion 331 rotatably about the center line. The sensor part 340 has a contact 341 that detects movement of the function button 350.

As illustrated in FIG. 16, a recessed portion 424 that opens downward is formed in the operation stick 400 (more specifically, in a column portion 422 of a base member 420 to be described later). The supporting projecting portion 331 of the supporting mechanism 330 is inserted into this recessed portion 424. The operation stick 400 is thereby supported by the supporting projecting portion 331. The upper surface of the supporting projecting portion 331 may be in contact with a lower surface 424a formed on the inside of the recessed portion 424.

As illustrated in FIG. 16, the circuit board 320 is disposed on the upper side of the pedestal member 310 as a supporting member, and is supported by the pedestal member 310. A circuit for detecting movements of the operation stick 400 and the function button 350 is formed on the circuit board 320. In addition, the above-described connector 31 for electric connection to the main body 10 of the input device 1A is mounted on the circuit board 320. The supporting mechanism 330 and the sensor part 340 are also mounted on the circuit board 320. The connector 31 is disposed at a front end of the circuit board 320. The supporting mechanism 330 is disposed in the rear of the connector 31. The sensor part 340 is disposed in the rear of the supporting mechanism 330. The connector 31, the supporting mechanism 330, and the sensor part 340 are arranged in the front-rear direction in this order. Arranging the connector 31, the supporting mecha-nism 330, and the sensor part 340 on the same circuit board 320 obviates a need for dedicated circuit boards for provid-ing the connector and the sensor, and can reduce the number of parts of the stick unit 30.

As illustrated in FIG. 16, the circuit board 320 of the stick unit 30 is disposed in the rear of the circuit board 60 included in the main body 10 of the input device 1A. As with the circuit board 60, the circuit board 320 is disposed along the front-rear direction. The circuit board 320 is disposed at a same position as the circuit board 60 in the upward-downward direction. That is, the circuit board 320 and the circuit board 60 are located on a substantially same plane. As described above, the guide projecting portion 74 and the recessed portions 76L and 76R (see FIG. 14) of the reinforcing frame 70 extend in a direction along the circuit board 320. The stick unit 30 can be fitted into the main body 10 in the direction along the circuit board 320.

The circuit board 60 included in the main body 10 and the circuit board 320 included in the stick unit 30 are arranged in the central portion 10M of the input device 1A. The sensor part 340 that detects movement of the function button 350 is mounted on the circuit board 320. This enables the function button 350 to be disposed in the rear of the operation stick 400 and project rearward from the central portion 10M, as illustrated in FIG. 1.

As illustrated in FIG. 15 and FIG. 16, the cover member 380 is placed on the pedestal member 310, and covers at least a part of each of the pedestal member 310, the supporting mechanism 330, and the sensor part 340. The cover member 380 and the pedestal member 310 constitute a case that houses the connector 31, the circuit board 320, the supporting mechanism 330, and the sensor part 340.

As illustrated in FIG. 15, the cover member 380 includes: a dome-shaped upper wall portion 381 that surrounds the periphery of the supporting mechanism 330; and a lower wall portion 382 that extends downward from the upper wall portion 381 and constitutes a lower end of the cover member 380. A circular hole H40 is formed in the center of the upper wall portion 381. The operation stick 400 passes through the hole H40, and projects upward. As illustrated in FIG. 16, a disk-shaped top portion 411 and a dome-shaped cover portion 421 are formed in the operation stick 400, as will be described later. As viewed in plan, the size (diameter) of the hole H40 is smaller than the size (diameter) of the cover portion 421 of the operation stick 400. Then, an outer circumferential portion of the cover portion 421 overlaps the edge of the hole H40 as viewed in plan. It is therefore possible to prevent the inside of the cover member 380 (inside of the stick unit 30) from being exposed to the outside in a state in which the stick unit 30 is removed from the main body 10. In particular, in the example illustrated in the figure, the size of the cover portion 421 is set such that the outer circumferential portion of the cover portion 421 and the edge of the hole H40 overlap each other even in a state in which the operation stick 400 is inclined until coming into contact with the edge of the hole H40.

In addition, as illustrated in FIG. 15, a protruding portion 383 that protrudes frontward from the upper wall portion 381 is formed frontward of the lower wall portion 382 of the cover member 380. The protruding portion 383 covers the upper surface and left and right side surfaces of the connector 31. Because the protruding portion 383 thus covers the connector 31, damage to the connector 31 due to an external impact can be prevented.

As illustrated in FIG. 15, a notch U20 that opens rearward is formed in the lower wall portion 382. The supporting member 360 is exposed rearward from the notch U20. The supporting member 360 has a shaft portion 361 in a cylindrical shape extending in the left-right direction, and is fixed to the inside of the stick unit 30. As illustrated in FIG. 16, the supporting member 360 is, for example, disposed on the upper side of the sensor part 340. A recessed portion 351 is formed in the front surface of the function button 350. The shaft portion 361 of the supporting member 360 is supported on the inside of the recessed portion 351. Specifically, end portions of the shaft portion 361 are supported by the left and right side surfaces of the recessed portion 351. Thus, the function button 350 is rotatably supported by the shaft portion 361 of the supporting member 360.

As illustrated in FIG. 16, the contact 341 of the sensor part 340 is provided on the rear surface of the sensor part 340. In addition, a projecting portion 352 is formed on the front surface of the function button 350. The projecting portion 352 of the function button 350 is formed on the lower side of the recessed portion 351 that houses the shaft portion 361 of the supporting member 360. The projecting portion 352 pushes the contact 341 when the function button 350 is pushed by the user and thereby moves about the shaft portion 361. Thus, the sensor part 340 can detect the pushing operation of the user on the function button 350.

In the present embodiment, the contact 341 can move in a direction along the circuit board 320 (specifically, in the front-rear direction). The function button 350 can move in a direction intersecting the circuit board 320 (specifically, in the upward-downward direction). The function button 350 can move in a rotational direction R4 (see FIG. 16) about an axis Ax3 defined by the shaft portion 361 of the supporting member 360. Because the shaft portion 361 of the supporting member 360 thus converts the direction in which the function button 350 moves from the upward-downward direction to the front-rear direction, the movable direction of the contact 341 with respect to the circuit board 320 can be changed to a direction along the circuit board 320. In addition, the pushing direction of the function button 350 is the same as the pushing direction of the operation buttons 11 and the like (downward direction), so that user operation on the function button 350 is facilitated.

[Structures of Operation Sticks]

Figure 17:
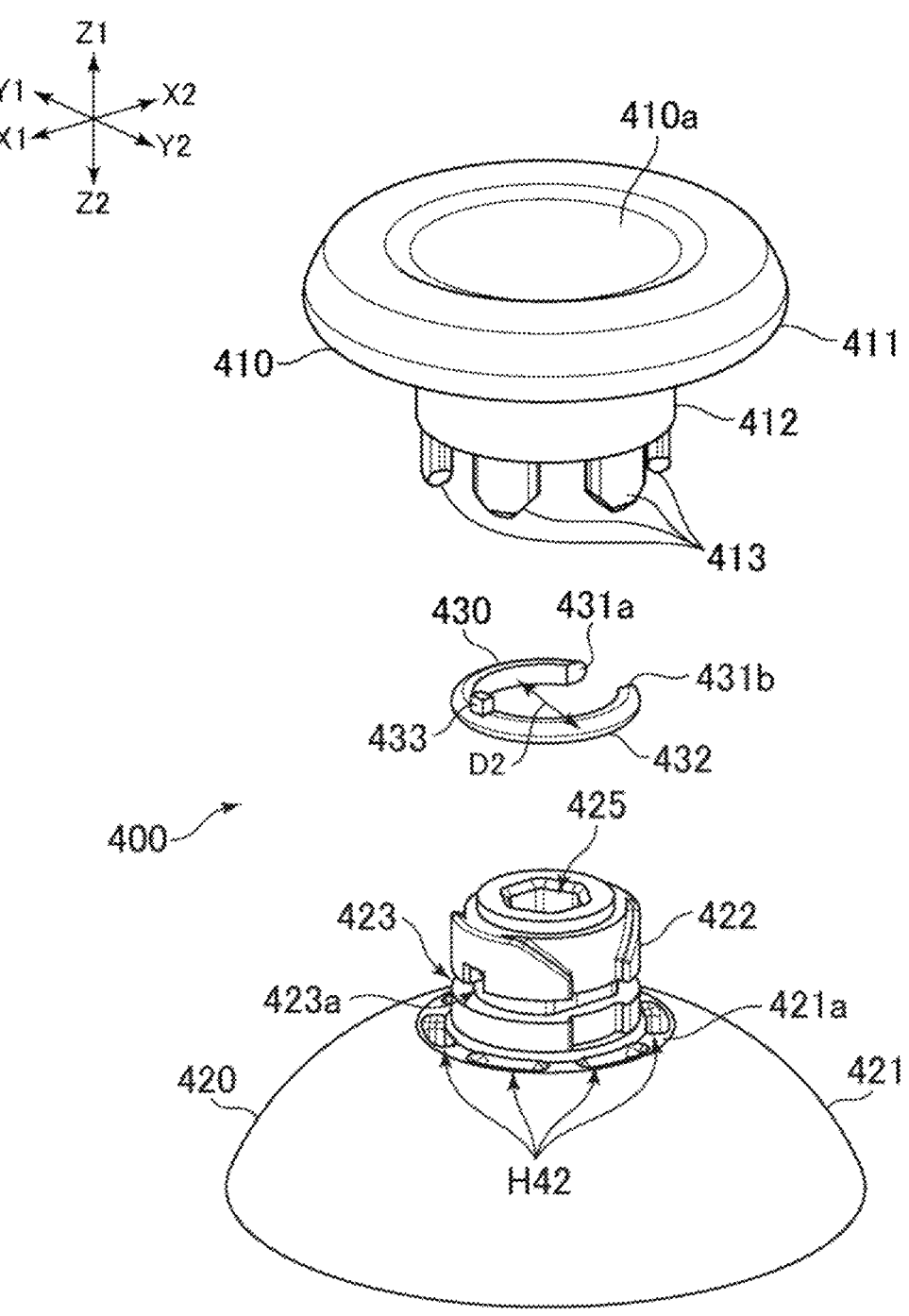
FIG. 17 is an exploded perspective view of an operation stick.
Figure 18A:
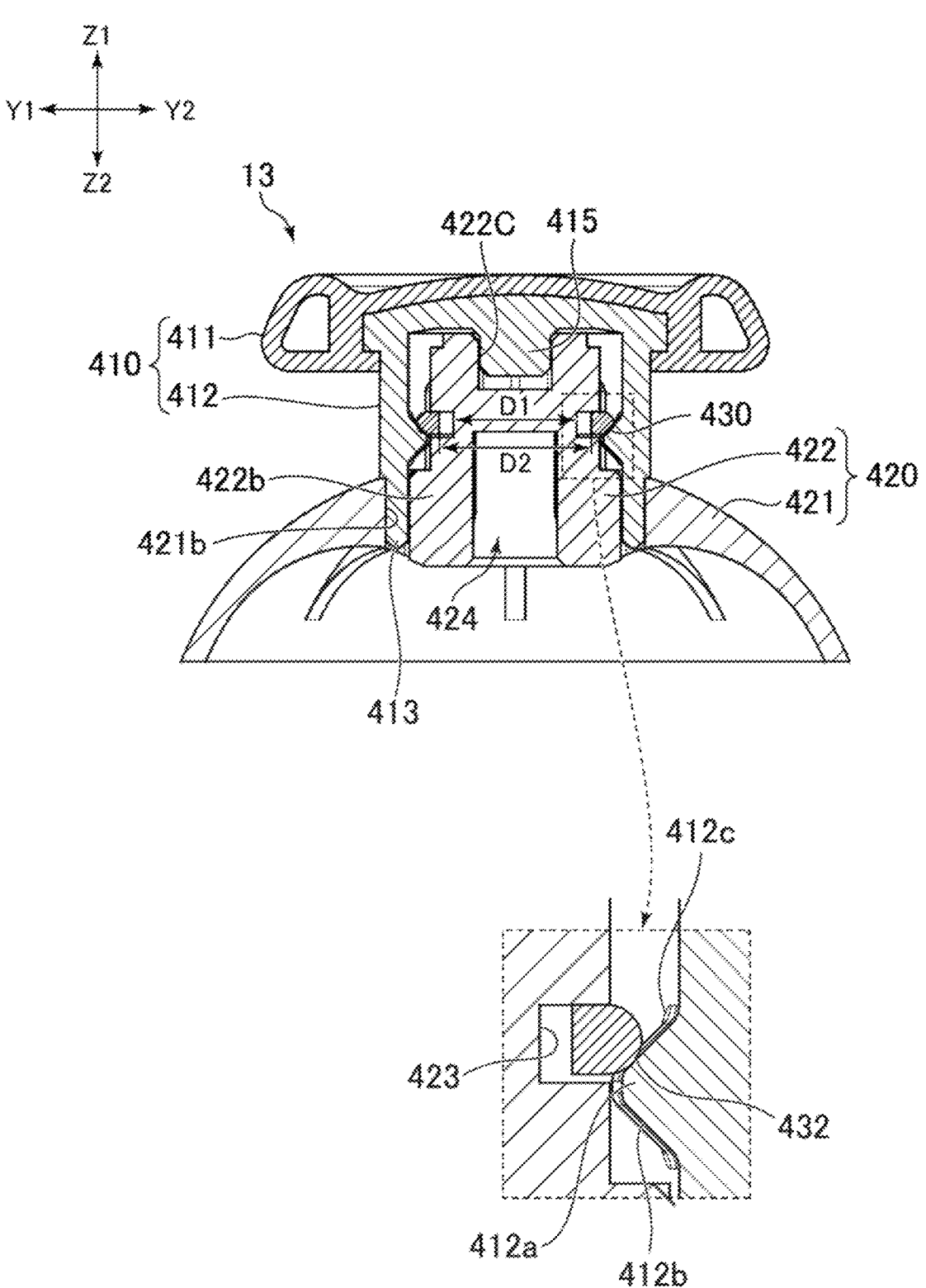
FIG. 18A is a sectional view of the operation stick.

FIG. 17 is an exploded perspective view of an operation stick 400. FIG. 18A and FIG. 18B are sectional views of the operation stick 400. FIG. 18A and FIG. 18B illustrate sections obtained by two cutting planes that perpendicularly intersect each other. Incidentally, in the present disclosure, FIG. 18A is a sectional view obtained by a cutting plane parallel with the Y-axis and the Z-axis, and FIG. 18B is a sectional view obtained by a cutting plane parallel with the X-axis and the Z-axis. The rotational positions about the Z axis of the operation stick 400 are not limited to the examples illustrated in FIG. 18A and FIG. 18B. For example, FIG. 18B may be a sectional view obtained by a cutting plane parallel with the Y-axis and the Z-axis, and FIG. 18A may be a sectional view obtained by a cutting plane parallel with the X-axis and the Z-axis.

As illustrated in FIG. 17, the operation stick 400 includes a top member 410 having an upper surface 410a to be touched by a finger of the user and a base member 420 to which the top member 410 is attached. The top member 410 includes a disk-shaped top portion 411 including the upper surface 410a and a tubular portion 412 extending downward from the top portion 411. In addition, the tubular portion 412 of the top member 410 has a plurality of extending portions 413 that extend in the upward-downward direction and that constitute a lower end of the tubular portion 412.

The top member 410 and the base member 420 may be formed by a resin, for example. The top portion 411 and the tubular portion 412 may be formed integrally with each other, or may be formed as respective separate members. In addition, in a case where the top portion 411 and the tubular portion 412 are formed as separate members, the material of the top portion 411 may be different from the material of the tubular portion 412. For example, the top portion 411 may be formed by an elastic material such as a rubber or an elastomer. As yet another example, the top member 410 may be molded by two-color molding. In this case, the upper surface 410a of the top portion 411 may be formed by an elastic material such as a rubber or an elastomer.

The base member 420 includes a dome-shaped cover portion 421 and a column portion 422 that extends in the upward-downward direction. As illustrated in FIG. 18A, a recessed portion 424 is formed in the lower surface of the column portion 422. When the supporting projecting portion 331 extending upward from the supporting mechanism 330 is inserted into this recessed portion 424, the operation stick 400 including the column portion 422 is supported by the supporting projecting portion 331 (see FIG. 16). The cover portion 421 spreads in a radial direction from a lower end of the column portion 422. The column portion 422 is disposed in the center of the cover portion 421. In a state in which the base member 420 is supported by the supporting projecting portion 331 of the supporting mechanism 330, the cover portion 421 covers the upper side of the supporting mechanism 330.

As illustrated in FIG. 18A and FIG. 18B, the column portion 422 of the base member 420 can be fitted into the inside of the tubular portion 412 of the top member 410. In addition, as illustrated in FIG. 17 and FIG. 18A, a plurality of holes H42 that surround a base portion of the column portion 422 are formed in the upper surface of the cover portion 421. The plurality of extending portions 413 formed on the top member 410 can be respectively fitted into these plurality of holes H42.

As illustrated in FIG. 17 and FIG. 18A, an elastic member 430 is attached to the peripheral surface of the column portion 422 of the base member 420. The elastic member 430 is located on the inside of the tubular portion 412 of the top member 410, and catches the inner surface of the tubular portion 412. The elastic member 430 thereby limits upward movement of the top member 410. That is, the elastic member 430 regulates the slipping of the top member 410 from the base member 420. The elastic member 430 has, for example, a C-shape or a circular arc shape formed by a metal. The elastic member 430 is attached to the peripheral surface of the column portion 422 having a cylindrical shape. Without being limited to this, the elastic member 430 may have the shape of a rectangular frame. In addition, the column portion 422 may have a prism shape.

As illustrated in FIG. 17, the elastic member 430 is elastically deformable such that two end portions 431a and 431b thereof approach each other. In addition, as illustrated in FIG. 18A, the elastic member 430 has a slope 432 oriented obliquely downward. The tubular portion 412 of the top member 410 has, on an inner surface thereof, an engaging projecting portion 412a that engages with the slope 432 of the elastic member 430. The engaging projecting portion 412a projects from the inner surface of the tubular portion 412. The engaging projecting portion 412a has an upper surface 412c oriented obliquely upward with respect to the inner surface of the tubular portion 412 and a lower surface 412b oriented obliquely downward with respect to the inner surface of the tubular portion 412. When the column portion 422 of the base member 420 is fitted into the inside of the tubular portion 412, the lower surface 412b of the engaging projecting portion 412a goes over the elastic member 430, and the upper surface 412c of the engaging projecting portion 412a catches the slope 432 of the elastic member 430.

The slipping of the top member 410 from the base member 420 can be regulated by thus limiting upward movement of the top member 410 by the elastic member 430 attached to the column portion 422 of the base member 420. In addition, when the user pulls the top member 410 attached to the base member 420 upward, the elastic member 430 is bent by being pressed by the engaging projecting portion 412a formed on the inside of the tubular portion 412. Thus, the user can extract the top member 410 from the base member 420 and replace the top member 410 with another operated member (for example, an operated member having a different height from the lower end to the top portion 411).

As illustrated in FIG. 17, a groove portion 423 to which the elastic member 430 is attached is formed in the external surface of the column portion 422 of the base member 420. The elastic member 430 catches the inside of the groove portion 423. The elastic member 430 is thereby attached to the base member 420. In addition, a projecting portion 433 that projects upward is formed on the elastic member 430. A recessed portion 423a is formed in the groove portion 423. As illustrated in FIG. 18B, the projecting portion 433 enters the inside of the recessed portion 423a. The projecting portion 433 comes into contact with the inner surface of the recessed portion 423a, and can thereby regulate rotation of the elastic member 430 about the axis of the column portion 422 along the upward-downward direction. In addition, the groove portion 423 extends to the two end portions 431a and 431b of the elastic member 430. The groove portion 423 is not formed between the two end portions 431a and 431b. The rotation of the elastic member 430 around the column portion 422 can be regulated also by contact of the end portions 431a and 431b with the inner surface of the groove portion 423 (end surfaces in a circumferential direction about the axis of the column portion 422).

As illustrated in FIG. 18A, a thickness D1 in the Y-axis direction of the column portion 422 at a position at which the groove portion 423 is formed is smaller than a diameter D2 of a circle defined by the inner circumferential surface of the elastic member 430 having a C-shape or a circular arc shape. Therefore, a clearance is formed between the elastic member 430 and the column portion 422 in a direction orthogonal to the Z-axis direction. This clearance allows the elastic member 430 to be elastically deformed by being pressed by the engaging projecting portion 412a.

In addition, in the X-axis direction illustrated in FIG. 18B, a thickness D3 of the column portion 422 at the position at which the groove portion 423 is formed is larger than the thickness D1 of the column portion 422 and the diameter D2 of the circle defined by the elastic member 430 in the Y-axis direction illustrated in FIG. 18A. Therefore, at a position at which the projecting portion 433 (FIG. 17) of the elastic member 430 is formed, no clearance is formed between the elastic member 430 and the column portion 422. Thus, the projecting portion 433 of the elastic member 430 catches the recessed portion 423a of the groove portion 423 formed in the column portion 422. It is thereby possible to suppress the falling of the elastic member 430 off the column portion 422 and movement of the elastic member 430 such that the elastic member 430 rotates with respect to the column portion 422.

As illustrated in FIG. 18A, the base member 420 has a contact surface 421b (first surface) at a position lower than the position to which the elastic member 430 is attached, the contact surface 421b being in contact with the top member 410 in a direction orthogonal to the axis of the operation stick 400 along the upward-downward direction. This contact can regulate a positional displacement between the top member 410 and the base member 420 in the direction orthogonal to the axis of the operation stick 400. In the example illustrated in the figure, as described above, the top member 410 has the plurality of extending portions 413 that project downward from the tubular portion 412 and surround the column portion 422. On the other hand, the base member 420 has the plurality of holes H42 that surround the base portion of the column portion 422. The plurality of extending portions 413 are inserted into the plurality of holes H42. Then, the external surfaces of the extending portions 413 (surfaces oriented outward in the radial direction of the operation stick 400) are in contact with the inner surfaces of the holes H42 (surfaces oriented inward in the radial direction of the operation stick 400). That is, the inner surfaces of the holes H42 function as the contact surface 421b. It is thereby possible to regulate a positional displacement between the top member 410 and the base member 420 in the Y-axis direction and the X-axis direction. The extending portions 413 are in contact with the inner surfaces of the holes H42 also in the circumferential direction of the operation stick 400. It is thereby possible to regulate a positional displacement between the top member 410 and the base member 420 in the circumferential direction of the operation stick 400.

Incidentally, unlike the example illustrated in the figure, the inner surfaces of the extending portions 413 (surfaces oriented inward in the radial direction of the operation stick 400) may be in contact with inner surfaces 422b of the holes H42 (surfaces oriented outward in the radial direction of the operation stick 400). This contact can also regulate a positional displacement between the top member 410 and the base member 420 in the direction orthogonal to the axis of the operation stick 400.

In addition, the column portion 422 of the base member 420 has a contact surface (second surface) 422c at a position higher than the position to which the elastic member 430 is attached, the contact surface 422c being in contact with the top member 410. The contact surface 422c regulates a positional displacement between the top member 410 and the base member 420 in a direction orthogonal to the column portion 422. As illustrated in FIG. 17, the column portion 422 has a first fitting portion 425 as a recessed portion at an upper end thereof. In addition, as illustrated in FIG. 18A, the top member 410 has a second fitting portion 415 as a projecting portion on a lower surface thereof. The first fitting portion 425 and the second fitting portion 415 are fitted to each other in the upward-downward direction. Then, the peripheral surface of the second fitting portion 415 is in contact with the inner surface of the first fitting portion 425. That is, the inner surface of the first fitting portion 425 functions as the contact surface 422c described above. This can regulate a positional displacement between the top member 410 and the base member 420 in the Y-axis direction and the X-axis direction orthogonal to the upward-downward direction in which the column portion 422 extends.

Incidentally, as opposed to the example illustrated in the figure, the first fitting portion 425 may be a projecting portion. In this case, the second fitting portion 415 may be a recessed portion into which the first fitting portion 425 as a projecting portion is fitted. This also can regulate a positional displacement between the top member 410 and the base member 420 in the Y-axis direction and the X-axis direction.

[Internal Structures of Trigger Units]

Figure 19A:
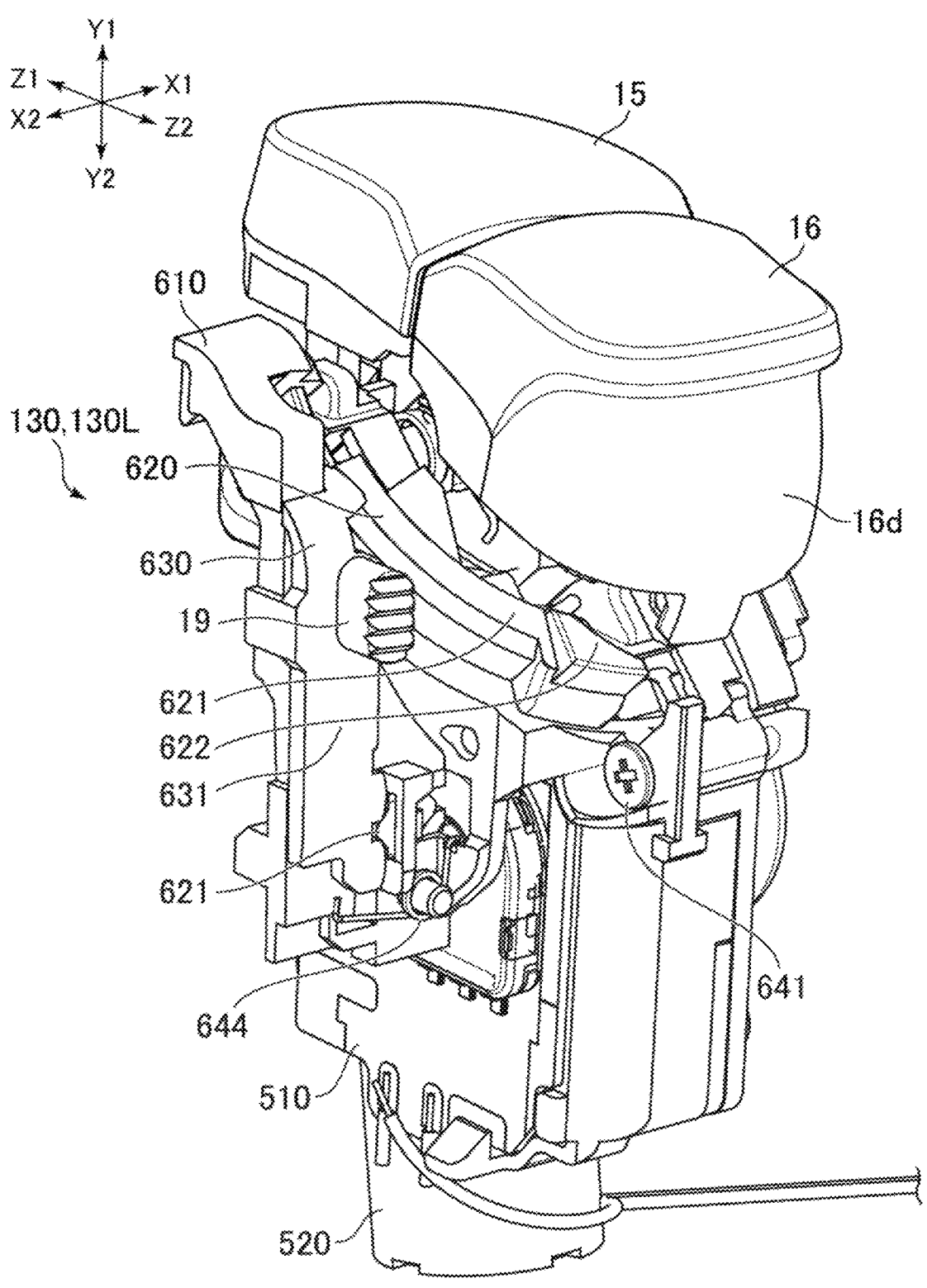
FIG. 19A is a perspective view of a trigger unit.
Figure 19B:
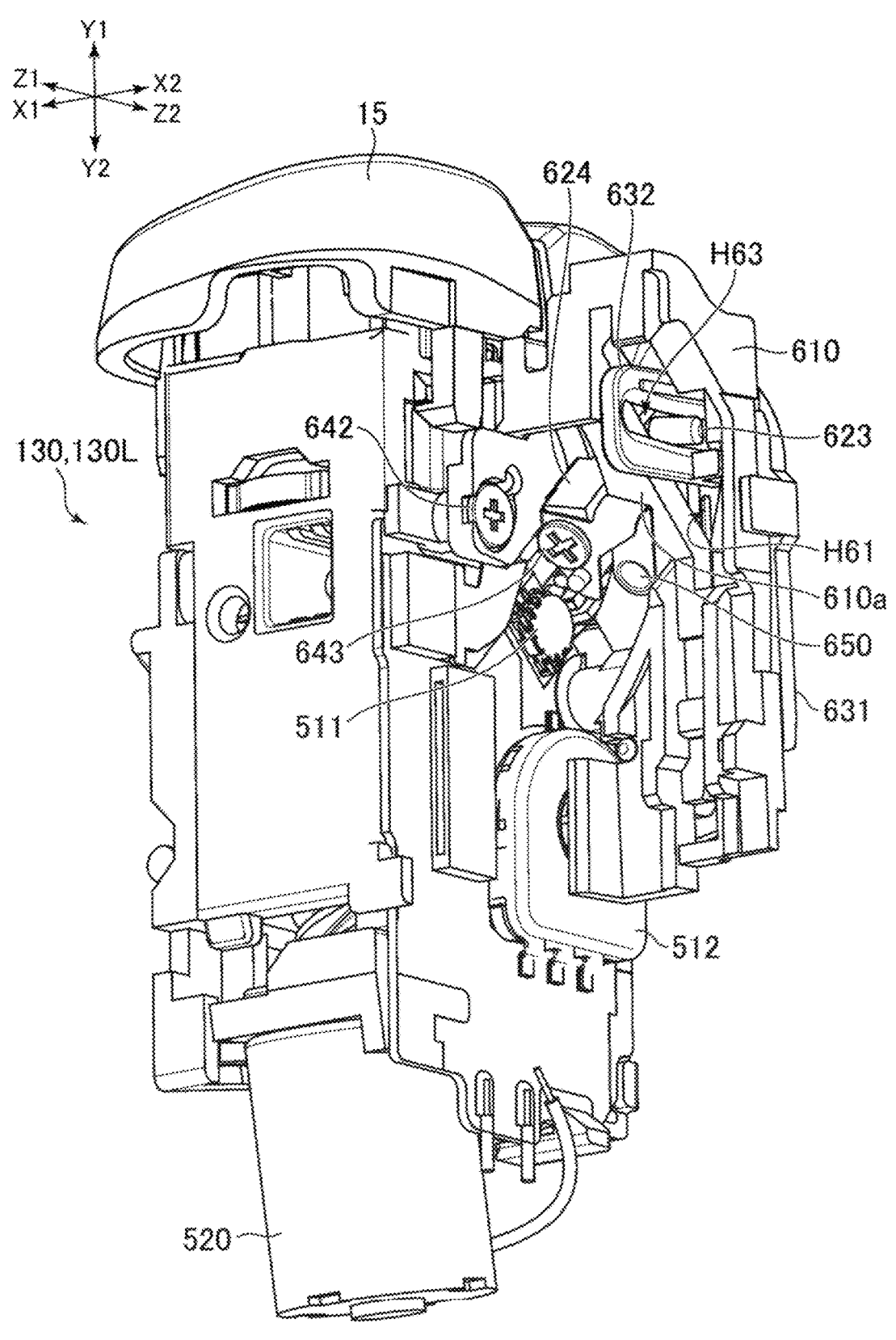
FIG. 19B is a perspective view of the trigger unit.
Figure 20:
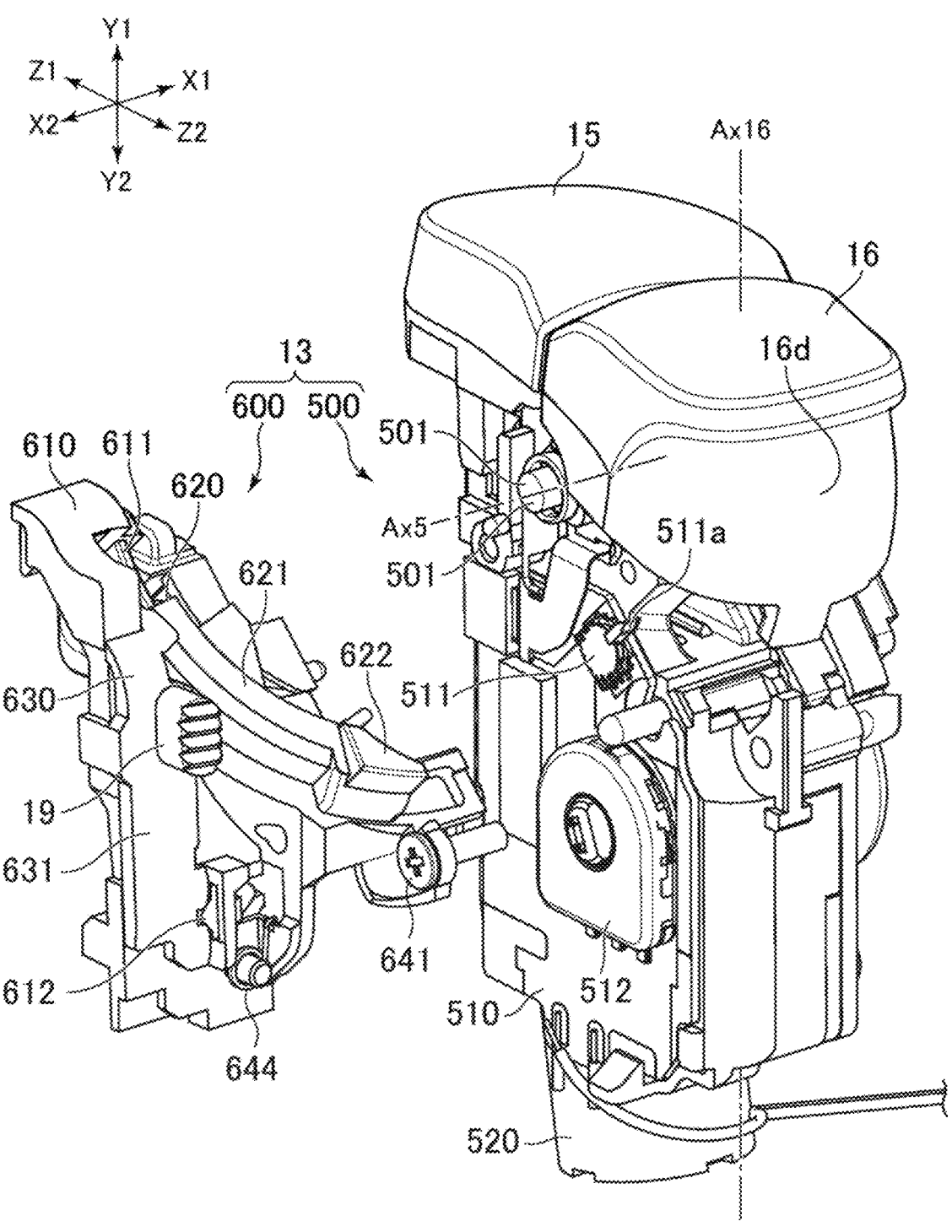
FIG. 20 is an exploded perspective view of the trigger unit.
Figure 21A:
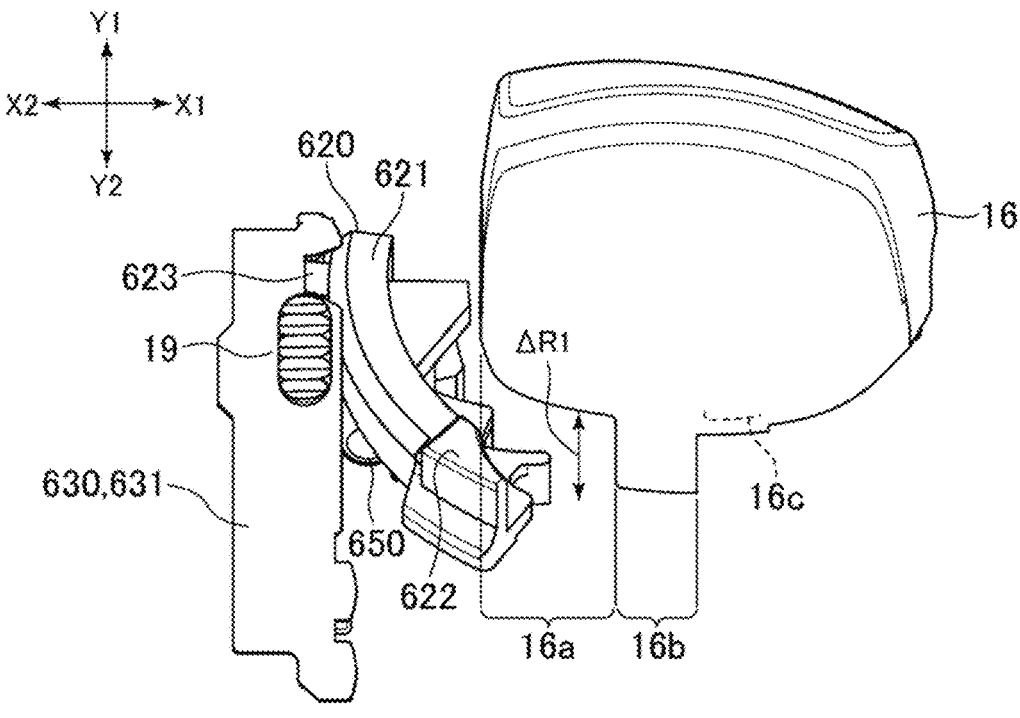
FIG. 21A is a view illustrating a trigger button, a stopper member, and an operation member.
Figure 21B:
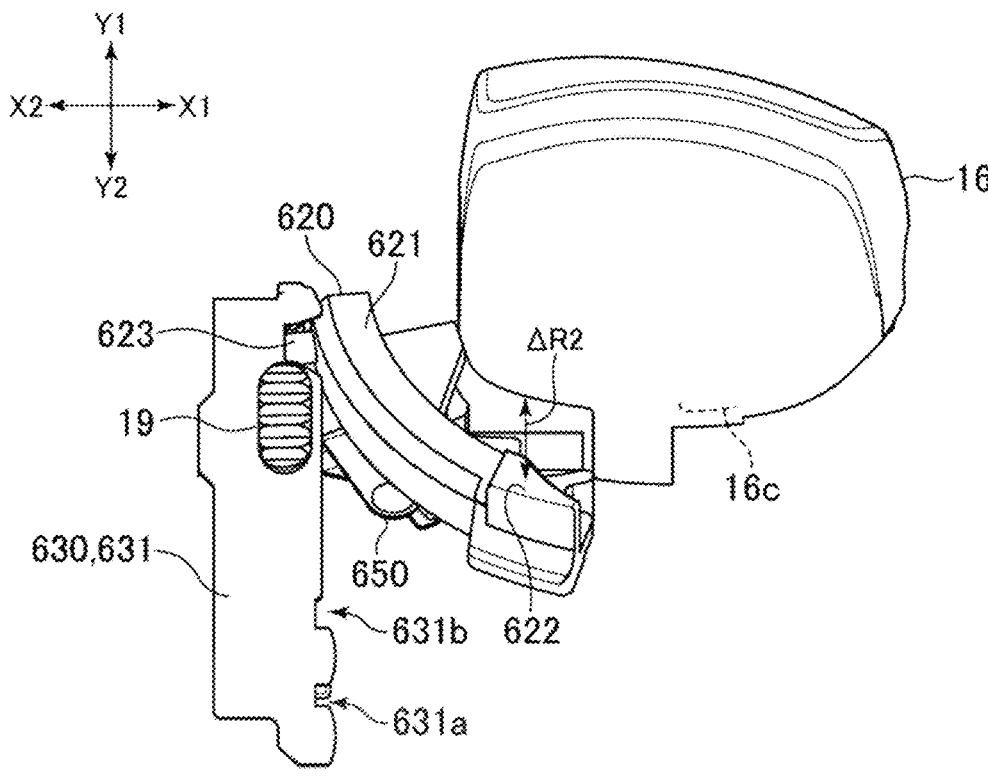
FIG. 21B is a view illustrating the trigger button, the stopper member, and the operation member.
Figure 21C:
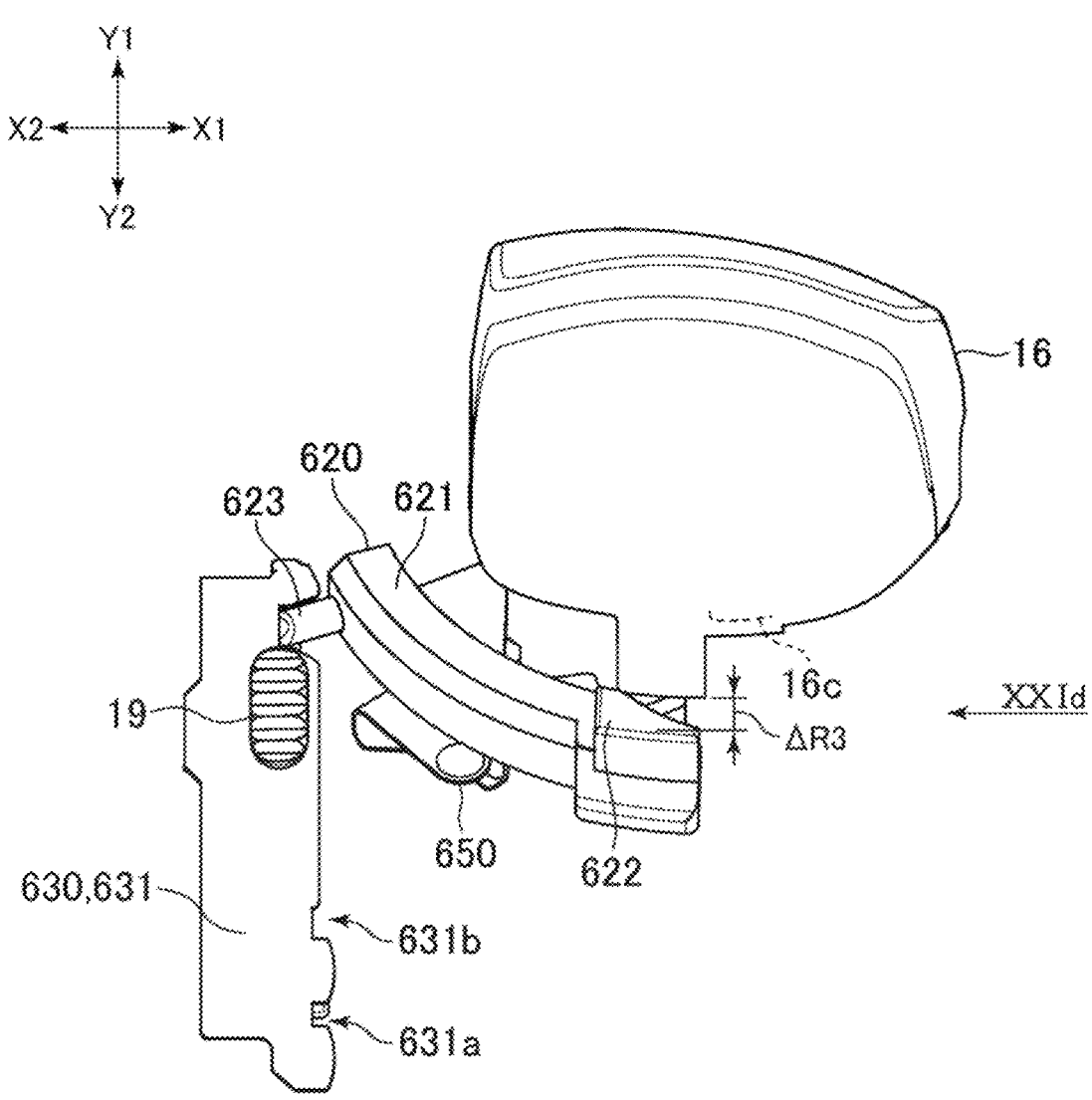
FIG. 21C is a view illustrating the trigger button, the stopper member, and the operation member.
Figure 21D:
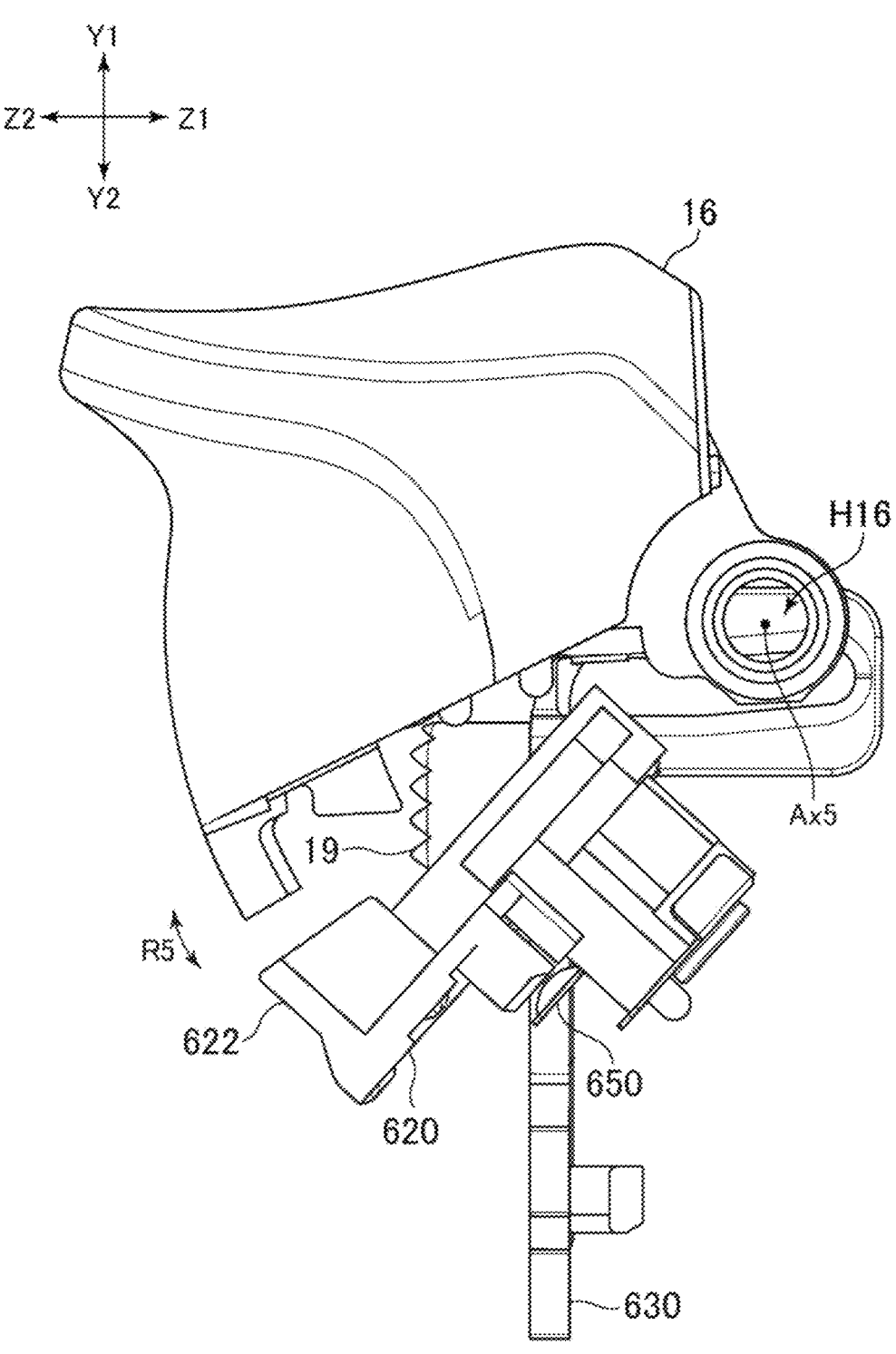
FIG. 21D is a view illustrating the trigger button, the stopper member, and the operation member.

FIG. 19A and FIG. 19B are perspective views of a trigger unit 130 attached to the main frame 50. FIG. 19A is a view of the left side of a trigger unit 13 as viewed obliquely from below. FIG. 19B is a view of the left side of the trigger unit 130 as viewed obliquely from above. FIG. 20 is an exploded perspective view of the trigger unit 130. FIGS. 21A to 21D are views illustrating a part of members constituting the trigger unit 130, and illustrate the positions of a trigger button 16, a stopper member 620, and an operation member 630. FIGS. 21A to 21C illustrate the lower sides of the trigger button 16, the stopper member 620, and the operation member 630. FIG. 21D illustrates the left side surfaces of the trigger button 16, the stopper member 620, and the operation member 630 in the state of FIG. 21C (view of the trigger button 16 and the like as viewed in the direction of an arrow XXId in FIG. 21C). Incidentally, while FIG. 19A and FIG. 19B illustrate the trigger unit 130L attached to the left side of the main frame 50, the trigger unit 130R attached to the right side of the main frame 50 has a configuration similar to that of the trigger unit 130L on the left side.

As illustrated in FIG. 19A, the trigger unit 130 has the operation button 15, the trigger button 16, and the rear switch 19. As illustrated in FIG. 20, the trigger unit 130 includes a core unit 500 to which the operation button 15 and the trigger button 16 are attached and a stopper unit 600 that is attached to the core unit 500 and limits a movable range of the trigger button 16. The core unit 500 has a circuit board 510 and a motor 520. The circuit board 510 is attached to a side surface of the core unit 500. The motor 520 is attached to a rear end of the core unit 500. A rotating shaft of the motor 520 is disposed inside the core unit 500.

The trigger button 16 has a supported portion H16 (see FIG. 21D) in a base portion thereof. The supported portion H16 is a hole. A rod-shaped shaft member 501 (see FIG. 20) is fitted inside this hole H16. The trigger button 16 can move in a rotational direction R5 (see FIG. 21D) about an axis Ax5 along the left-right direction which axis is defined by a shaft member 501.

The stopper unit 600 includes a guide frame 610 as well as a stopper member 620 and an operation member 630 attached to the guide frame 610. As illustrated in FIG. 19A and FIG. 19B, the guide frame 610 is fixed to the core unit 500 by screws 641 and 642.

The stopper member 620 is housed inside the upper case 40 and the lower case 80 as exterior members of the input device 1A. In addition, as illustrated in FIG. 2, the rear switch 19 as a part of the operation member 630 is exposed to the outside (lower side) of the lower case 80 via the hole H20 (see FIG. 3). The rear switch 19 is formed integrally with the operation member 630, and projects downward from the operation member 630.

As illustrated in FIG. 20, a lower surface 16d of the trigger button 16 is curved so as to surround a center line Ax16 of the trigger button 16 along the front-rear direction. As illustrated in FIG. 3, an opening 80a for exposing the trigger button 16 frontward is formed in the lower case 80. The edge of the opening 80a is curved along the lower surface 16d of the trigger button 16. Then, in the lower surface 82 of the lower case 80, a part 82a located on the periphery of the edge of the opening 80a is also curved so as to conform to the lower surface 16d of the trigger button 16 (this part 82a will hereinafter be referred to as a curved portion). The stopper member 620 moves along the curved portion 82a on the inside of the curved portion 82a of the lower surface 82. That is, the stopper member 620 moves along a curve on the inside of the curved portion 82a. As illustrated in FIG. 20, a guide projecting portion 611 is formed in the guide frame 610. The guide projecting portion 611 is curved along the curved portion 82a. The stopper member 620 includes a guided portion 621. A recessed portion (groove portion) into which the guide projecting portion 611 is fitted is formed in the guided portion 621. As with the guide projecting portion 611, the guided portion 621 is curved along the curved portion 82*a*. The stopper member 620 can move along the guide projecting portion 611.

FIG. 21A illustrates a state in which the stopper member 620 is at an initial position (first position). FIG. 21C illustrates a state in which the stopper member 620 is at a final position (second position). FIG. 21B illustrates a state in which the stopper member 620 is at an intermediate position (third position) located between the initial position and the final position. The stopper member 620 is movable between the initial position illustrated in FIG. 21A and the final position illustrated in FIG. 21C.

In the example illustrated in the figures, the stopper unit 600 is disposed on the left side of the trigger button 16. As illustrated in FIGS. 21A to 21C, the rear edge (lower edge) of the trigger button 16 includes a rear edge 16*b* that projects more rearward than a rear edge 16*a* of a left portion of the trigger button 16 (rear edge on the stopper unit 600 side). The stopper member 620 has a head portion 622 as a stopper portion at a distal end of the guided portion 621, the head portion 622 projecting in the direction of the trigger button 16. The head portion 622 of the stopper member 620 limits the movable range of the trigger button 16 by abutting against the rear edge 16*a* or 16*b* as a stopper target portion of the trigger button 16.

Specifically, as illustrated in FIG. 21A, in a case where the stopper member 620 is located at the initial position, the head portion 622 of the stopper member 620 is located outside a region that the rear edges 16*a* and 16*b* pass when the trigger button 16 moves about the axis Ax5. In the example illustrated in the figure, the head portion 622 of the stopper member 620 is located leftward of the region that the rear edges 16*a* and 16*b* pass. Therefore, the interference of the head portion 622 with the rear edges 16*a* and 16*b* does not occur when the trigger button 16 moves about the axis Ax5. Hence, the trigger button 16 can move in the range of a distance ΔR1 (first range) as a maximum movable range. In other words, the stopper member 620 allows movement of the trigger button 16 in the range of the distance ΔR1 in a state in which the stopper member 620 is located at the initial position.

As illustrated in FIG. 21C, in a case where the stopper member 620 is located at the final position, the head portion 622 of the stopper member 620 is located midway in a region that the rear edge 16*b* (part projecting rearward) passes when the trigger button 16 moves about the axis Ax5. Therefore, when the trigger button 16 moves about the axis Ax5, the rear edge 16*b* abuts against the head portion 622 of the stopper member 620, and the movable range of the trigger button 16 becomes the range of a distance ΔR3 as a minimum movable range. In other words, the stopper member 620 limits the movable range of the trigger button 16 to the distance ΔR3 range smaller than the range of the distance ΔR1 in a state in which the stopper member 620 is located at the final position.

As illustrated in FIG. 21B, in a case where the stopper member 620 is located at the intermediate position, the head portion 622 of the stopper member 620 is located midway in a region that the rear edge 16*a* (edge located frontward of the rear edge 16*b*) passes when the trigger button 16 moves about the axis Ax5. Therefore, when the trigger button 16 moves about the axis Ax5, the rear edge 16*a* abuts against the head portion 622 of the stopper member 620, and the movable range of the trigger button 16 becomes the range of a distance ΔR2 as an intermediate movable range. In other words, the stopper member 620 limits the movable range of the trigger button 16 to the distance ΔR2 range as a range between the range of the distance ΔR1 and the range of the distance ΔR3 in a state in which the stopper member 620 is located at the intermediate position.

It is to be noted that the shape of the stopper member 620 is not limited to the example illustrated in the figures. For example, the stopper member 620 may not have the head portion 622 that projects toward the trigger button 16. In this case, the guided portion 621 of the stopper member 620 may abut against the edge 16*a* or 16*b* of the trigger button 16.

The operation member 630 engages with the stopper member 620, and moves together with the stopper member 620. As illustrated in FIG. 19B and FIG. 21C, a projecting portion 623 that projects in the left direction (X2 direction) from an end portion (specifically, a front end portion) of the guided portion 621 is formed on the stopper member 620. A hole H63 (see FIG. 19B) that opens in the left-right direction is formed in the operation member 630. The projecting portion 623 of the stopper member 620 is fitted to the inside of the hole H63. A movement of the operation member 630 is thereby transmitted to the stopper member 620 via the projecting portion 623. Incidentally, a recessed portion such as a notch or a groove into which the projecting portion 623 of the stopper member 620 is fitted may be formed in the operation member 630 in place of the hole H63. In addition, a recessed portion may be formed in the stopper member 620, and a projecting portion that fits into the recessed portion of the stopper member 620 may be formed on the operation member 630.

The operation member 630 moves the stopper member 620 between the initial position illustrated in FIG. 21A and the final position illustrated in FIG. 21C. When the rear switch 19 is at a frontmost position, the stopper member 620 is disposed at the initial position (see FIG. 21A). When the rear switch 19 is at a rearmost position, the stopper member 620 is disposed at the final position (see FIG. 21C). When the rear switch 19 is at a position (intermediate position) between the frontmost position and the rearmost position, the stopper member 620 is disposed at the intermediate position (see FIG. 21B). When the user operates the rear switch 19, the operation member 630 moves, and the stopper member 620 moves between the initial position and the final position with respect to the guide frame 610. Then, due to the movement of the stopper member 620, the movable range of the trigger button 16 changes in a range of the distances ΔR1 to ΔR3 described above (see FIGS. 21A to 21C). Hence, by operating the rear switch 19, the user can set the movable range of the trigger button 16 to the range of one of the distances ΔR1 to ΔR3 and thus adjust the movable range of the trigger button 16.

The operation member 630 can move in a direction different from that of the stopper member 620. Specifically, the operation member 630 can move along a straight line. The operation member 630 can move in a direction orthogonal to the rotational direction R5 in which the trigger button 16 moves. On the other hand, as illustrated in FIGS. 21A to 21C, the stopper member 620 moves in the left-right direction as viewed from the bottom of the trigger button 16. As described above, in the present embodiment, the stopper member 620 can move along the curved portion 82*a* of the lower case 80 (in other words, along the lower surface 16*d* of the trigger button 16). Because the moving direction of the operation member 630 and the moving direction of the stopper member 620 are thus made different from each other, the moving direction of the operation member 630 (rear switch 19) can be set to be a direction that facilitates operation of the user.

In the present embodiment, the operation member 630 can linearly move in the front-rear direction (Y-axis direction in FIG. 19A) as the depression direction of the trigger button 16 along the lower surface of the guide frame 610. The user can move the rear switch 19 provided to the operation member 630 along the depression direction of the trigger button 16. This can make it easier to intuitively grasp that the rear switch 19 can set the movable range of the trigger button 16.

The user can move the rear switch 19 exposed from the hole H20 in the front-rear direction. When the rear switch 19 is moved, the whole of the operation member 630 including the rear switch 19 moves in the front-rear direction with respect to the guide frame 610. An uneven pattern is formed on the lower surface of the rear switch 19. This facilitates the operation of the user on the rear switch 19. It is to be noted that the direction in which the operation member 630 and the rear switch 19 can be moved is not limited to the front-rear direction, but that the operation member 630 and the rear switch 19 may be able to be moved in the left-right direction, for example.

As illustrated in FIG. 19A and FIG. 19B, the opening of the hole H63 formed in the operation member 630 extends in the upward-downward direction. The hole H63 regulates relative movement between the operation member 630 and the stopper member 620 in the front-rear direction (Y-axis direction), but allows relative movement therebetween in the upward-downward direction. Thus, the operation member 630 can move in a direction different from that of the stopper member 620.

The operation member 630 includes a first plate portion 631 (see FIG. 21A) having the lower surface of the operation member 630 and a second plate portion 632 (see FIG. 19B) in which the hole H63 is formed. The second plate portion 632 connects to the first plate portion 631, and extends upward (in the Z1 direction in FIG. 19B) from the first plate portion 631. In addition, a guide hole H61 (see FIG. 19B) that opens in the upward-downward direction (Z-axis direction) is formed in the guide frame 610 to which the operation member 630 is attached. The second plate portion 632 of the operation member 630 is passed through the inside of this guide hole H61.

As illustrated in FIG. 21B, the first plate portion 631 having the lower surface of the operation member 630 has a first recessed portion 631a and a second recessed portion 631b in a side surface thereof on the trigger button 16 side. An engaging member 612 (see FIG. 20) that projects to the side surface of the first plate portion 631 is attached to the guide frame 610. In a state in which the operation member 630 is at the initial position illustrated in FIG. 21A (front-most position that disposes the stopper member 620 at the initial position), a distal end of the engaging member 612 catches a rear end of the first plate portion 631, and thereby limits rearward movement of the operation member 630. In a state in which the operation member 630 is at the intermediate position illustrated in FIG. 21B (position that places the stopper member 620 at the intermediate position), the distal end of the engaging member 612 catches the first recessed portion 631a. The engaging member 612 thereby retains the operation member 630 at the intermediate position. In a state in which the operation member 630 is at the final position illustrated in FIG. 21C (rearmost position that places the stopper member 620 at the final position), the engaging member 612 catches the second recessed portion 631b located frontward of the first recessed portion 631a, and thereby limits rearward movement of the operation member 630. Thus, the engagement of the operation member 630 with the engaging member 612 retains the operation member 630 at a predetermined position among the initial position, the intermediate position, and the final position respectively illustrated in FIGS. 21A to 21C, and sets the movable range of the trigger button 16 at one of a plurality of stages (three stages in the present embodiment).

As illustrated in FIG. 20, a torsion spring 644 is attached to the guide frame 610. One end of the torsion spring 644 catches the guide frame 610. Another end of the torsion spring 644 catches the engaging member 612. The torsion spring 644 thereby biases the engaging member 612 to the side surface of the operation member 630 (surface in which the recessed portions 631a and 631b are formed). The operation member 630 can be moved to the three positions described above against the elastic force of the torsion spring 644.

Figure 22:
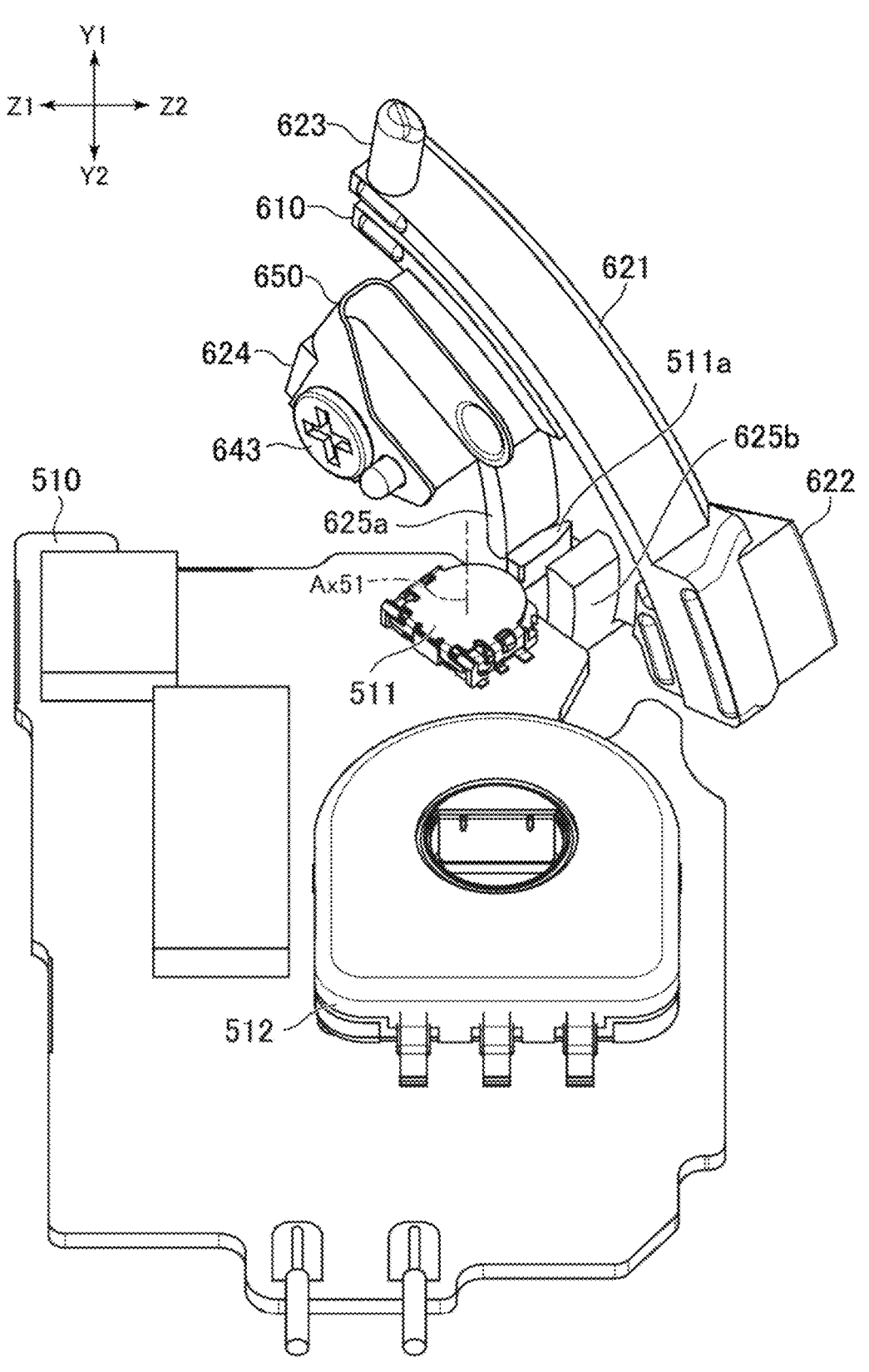
FIG. 22 is a view illustrating the stopper member and a circuit board.

FIG. 22 is a diagram illustrating the stopper member 620 and the circuit board 510 (see FIG. 20) that is attached to the core unit 500. As illustrated in FIG. 22, the stopper member 620 has a projecting portion 624 that projects from the guided portion 621. The projecting portion 624 projects in a direction perpendicular to the direction in which the projecting portion 623 projects. The projecting portion 624 projects obliquely upward (Z1 direction) and rearward (Y2 direction) from the stopper member 620. An elastic member 650 is attached to a distal end of the projecting portion 624. The elastic member 650 is a sheet metal, for example. The elastic member 650 is fixed to the distal end of the projecting portion 624 by a screw 643.

As illustrated in FIG. 19B, in a state in which the stopper member 620 is attached to the guide frame 610, the projecting portion 624 of the stopper member 620 projects obliquely upward (Z1 direction) through a hole formed in the guide frame 610. The elastic member 650 attached to the projecting portion 624 is in contact with a guide slope 610a formed on the guide frame 610, and thereby presses the stopper member 620 against the guide frame 610. This can suppress a collision of the stopper member 620 with the guide frame 610 and the occurrence of an impact sound when the trigger button 16 collides with the stopper member 620.

As illustrated in FIG. 22, the circuit board 510 attached to the core unit 500 is mounted with a first sensor 511, a second sensor 512, and a processor not illustrated. The first sensor 511 is one for detecting the position of the stopper member 620. The first sensor 511 has a movable projecting portion 511a that projects toward the stopper member 620. The stopper member 620 has two wall portions 625a and 625b that project toward the first sensor 511. The movable projecting portion 511a of the first sensor 511 is disposed between the two wall portions 625a and 625b. When the stopper member 620 moves between the initial position and the final position, the movable projecting portion 511a of the first sensor 511 is pushed by one of the two wall portions 625a and 625b, and moves about an axis Ax51 of the sensor 511 which axis is perpendicular to the circuit board 510. The first sensor 511 can detect the position of the stopper member 620 on the basis of the position of the movable projecting portion 511a.

The first sensor 511 may be one for detecting the position of the operation member 630. In this case, the first sensor 511 may have a movable projecting portion that projects in the direction of the operation member 630 and moves by being pushed by the operation member 630. Then, the position of the stopper member 620 can be detected indirectly on the basis of the output of the first sensor 511. In addition, the first sensor 511 may be a sensor of a noncontact type such as an optical sensor. It suffices for the first sensor 511 to detect the position of the stopper member 620 or the operation member 630.

The core unit 500 may include a sensor, not illustrated, which detects a depression amount of the trigger button 16. The processor mounted on the circuit board 510 or/and the processor mounted on the circuit board 60 attached to the main frame 50 may transmit a ratio of the depression amount of the trigger button 16 to the movable range of the trigger button 16 to the information processing device that is executing the game program. The processor(s) may maintain a certain resolution with regard to the position of the trigger button 16 without depending on the position of the stopper member 620. The movable range of the trigger button 16 is determined by the position of the operation member 630 and the stopper member 620. The movable range of the trigger button 16 can therefore be detected on the basis of the output from the first sensor 511.

The second sensor 512 is one for detecting the position of an actuator 550 (see FIG. 23) to be described later. The second sensor 512 is disposed in the rear of the first sensor 511. Because the first and second sensors 511 and 512 are mounted on the same circuit board 510, the number of parts of the trigger unit 130 can be reduced as compared with a case where the sensors are respectively mounted on two circuit boards.

Figure 23:
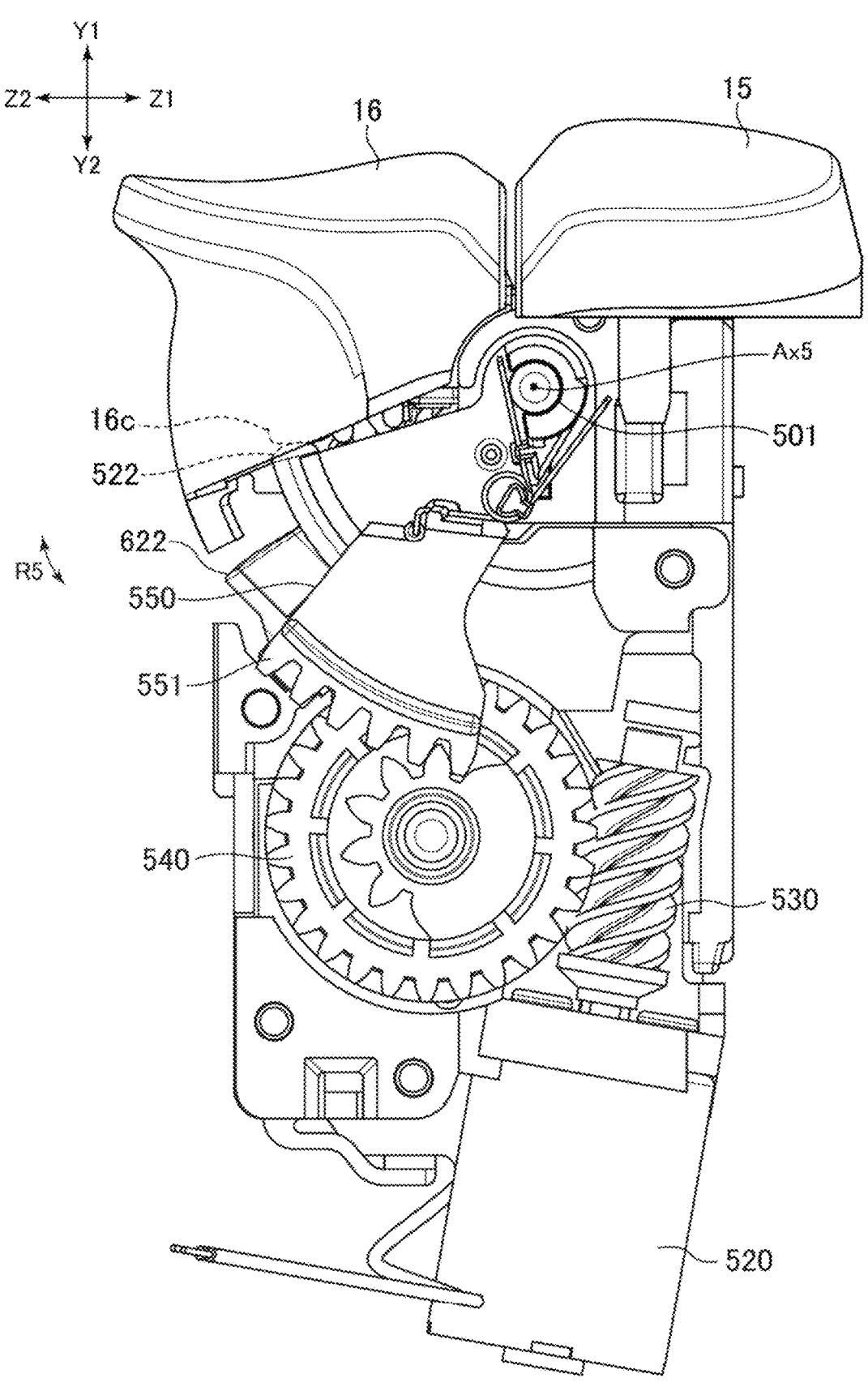
FIG. 23 is a view illustrating an internal structure of a core unit.

FIG. 23 is a diagram illustrating an internal structure of the core unit 500. FIG. 23 illustrates a state in which a cover attached to a side surface of the core unit 500 (side surface on an opposite side from the side surface to which the circuit board 510 is attached) is removed. As illustrated in FIG. 23, the rotating shaft of the motor 520 attached to the core unit 500 is inserted into a first gear 530, which is a worm gear, for example. In addition, a second gear 540 and an actuator 550 are arranged inside the core unit 500. The actuator 550 has a gear portion 551 constituting a part of a gear and a projecting portion 552 projecting in the direction of the trigger button 16. The second gear 540 meshes with the first gear 530 and the gear portion 551 of the actuator 550. The actuator 550 is attached to the shaft member 501. As with the trigger button 16, the actuator 550 can move in the rotational direction R5 about the axis Ax5 defined by the shaft member 501.

In the example illustrated in FIG. 23, the second gear 540 is a spur gear having two stages. The first gear 530 meshes with a large-diameter gear of the second gear 540. The gear portion 551 of the actuator 550 meshes with a small-diameter gear of the second gear 540. However, the internal structure of the core unit 500 is not limited to this. For example, the second gear 540 may not be a spur gear having two stages, and the first gear 530 may not be a worm gear. In addition, the core unit 500 may not have the second gear 540, and the gear portion 551 of the actuator 550 may directly mesh with the first gear 530.

The projecting portion 552 formed on the actuator 550 abuts against a rear edge 16c of the trigger button 16. The rear edge 16c is an edge on an opposite side from the stopper member 620 with the rear edge 16a interposed therebetween, the rear edge 16a projecting rearward as illustrated in FIG. 21A. When the user presses the trigger button 16, the projecting portion 552 abuts against the rear edge 16c of the trigger button 16, and thereby makes a force in an opposite direction from the direction in which the trigger button 16 is pressed act on the finger of the user. Here, the processor mounted on the circuit board 510 (or/and the processor mounted on the circuit board 60 attached to the main frame 50) and the motor 520 attached to the trigger unit 130 function as a control device that drives the actuator 550. In a case where the force in the opposite direction is made to act on the finger of the user when the trigger button 16 is pressed, the control device implemented by the processor, the motor 520, and the like moves the actuator 550 to a position at which the projecting portion 552 of the actuator 550 is in contact with the rear edge 16c of the trigger button 16, as illustrated in FIG. 23, for example. In addition, in a case where the force in the opposite direction is not made to act when the trigger button 16 is pressed, the control device moves the actuator 550 to a position at which the projecting portion 552 of the actuator 550 does not interfere with the rear edge 16c of the trigger button 16. Whether or not to make the force in the opposite direction act when the trigger button 16 is pressed (that is, a target position at which the projecting portion 552 of the actuator 550 is disposed) may be set according to the environment of the game executed by the information processing device and conditions of the game.

The second sensor 512 is one for detecting the position of the actuator 550. In the present embodiment, the second sensor 512 is an encoder that outputs a signal corresponding to the rotational position of the motor 520. An end portion of a shaft portion of the second gear 540 is fitted into the second sensor 512. The position of the actuator 550, which changes according to the rotational angle of the second gear 540, can be detected on the basis of the output of the second sensor 512. Then, the control device drives the actuator 550 on the basis of the output from the second sensor 512. In a case where the position of the projecting portion 552 indicated by the output from the second sensor 512 is different from the target position, for example, the control device drives the actuator 550 such that the position of the projecting portion 552 is disposed at the target position.

As illustrated in FIGS. 21A to 21C, the movable range of the trigger button 16 changes according to the position of the stopper member 620 and the position of the operation member 630. Therefore, the control device implemented by the processor, the motor 520, and the like drives the actuator 550 on the basis of the position of the stopper member 620 or the position of the operation member 630. In a case where the stopper member 620 and the operation member 630 are at the initial position illustrated in FIG. 21A, and the trigger button 16 can move in the range of the distance ΔR1, for example, the control device drives the actuator 550 such that the projecting portion 552 of the actuator 550 is disposed in the range of the distance ΔR1, for example. In addition, in a case where the stopper member 620 and the operation member 630 are at the intermediate position illustrated in FIG. 21B and the trigger button 16 can move in the range of the distance ΔR2, the control device drives the actuator 550 such that the projecting portion 552 is disposed in the range of the distance ΔR2. Similarly, in a case where the stopper member 620 and the operation member 630 are at the final position illustrated in FIG. 21C and the trigger button 16 can move in the range of the distance ΔR3, the actuator 550 is driven such that the projecting portion 552 is disposed in the range of the distance ΔR3.

In the present embodiment, the position of the stopper member 620 is detected by the first sensor 511, and the control device drives the actuator 550 on the basis of the output, from the first sensor 511, which indicates the position of the stopper member 620. Without being limited to this, the first sensor 511 may detect the position of the operation member 630, and the control device may drive the actuator 550 on the basis of the output, from the first sensor 511, which indicates the position of the operation member 630.

In addition, timing in which the force in the opposite direction by the actuator 550 acts on the finger of the user may be a time at which the user starts to press the trigger button 16, or may be a midpoint during the pressing of the trigger button 16 by the user. In a case where the trigger button 16 can move in the range of the distance ΔR1, for example, the force in the opposite direction can be made to act at a midpoint during the pressing of the trigger button 16 by the user by disposing the actuator 550 at an intermediate position in the range of the distance ΔR1. In addition, in a case where the trigger button 16 can move in the range of the distance ΔR2, the actuator 550 is disposed at an intermediate position in the range of the distance ΔR2, for example. In a case where the trigger button 16 can move in the range of the distance ΔR3, the actuator 550 is disposed at an intermediate position in the range of the distance ΔR3, for example. This enables the force in the opposite direction to act at a midpoint during the pressing of the trigger button 16 by the user even in cases where the movable range of the trigger button 16 is smaller than the range of the distance ΔR1 as a maximum range.

SUMMARY (1) As described above, the input device 1A has the function buttons 350 that project rearward from the central portion 10M of the input device 1A and that are disposed in the region A surrounded by the rear edge 10Ma of the central portion 10M, the right side surface 10La of the left grip, and the left side surface 10Ra of the right grip as viewed in plan as illustrated in FIG. 1. Thus, operations of the operation buttons 11, the direction key 12, the operation stick 400, and the like by the user are not hindered, and the user can operate the function buttons 350 promptly as necessary.

(2) In addition, as illustrated in FIG. 4 and the like, the input device 1A includes the main body 10 in which the housing recessed portions U10 that open upward and rearward are formed, and the stick units 30 including the operation sticks 400 can be attached to and detached from the housing recessed portions U10. This enables the user to replace the stick units 30 with other stick units (unused stick units or the like). At this time, the user can extract the stick units 30 rearward while holding the upper sides of the stick units 30. The user can therefore remove the stick units 30 easily. Thus, the user can easily replace the parts provided with the operation sticks 400.

(3) In addition, as illustrated in FIG. 7A and FIG. 7B and the like, the input device 1A includes the reinforcing frame 70 that houses the supporting members 210 supporting the rear buttons 17 and the sensors 240. The supporting members 210 include the shaft portion 212, and can move about the axis Ax1 defined by the shaft portion 212. The rear buttons 17 project from the lower case 80 and the lower cover 90 in a state in which the rear buttons 17 are attached to the supporting members 210 so as to move together with the supporting members 210, and the rear buttons 17 can be removed from the supporting members 210 by operation of the rear buttons 17 from the outside of the lower case 80 and the lower cover 90 by the user. This enables the presence or absence of the rear buttons 17 on the input device 1A to be selected at the discretion of the user according to the kind of the game to be executed by the information processing device.

(4) In addition, as illustrated in FIG. 8 and the like, the internal structure of the input device 1A includes the main frame 50 and the reinforcing frame 70. The reinforcing frame 70 is formed by a material having a higher rigidity than the main frame 50, and is attached to the main frame 50. Moreover, the upper case 40 covering the upper side of the internal structure of the input device 1A and the lower case 80 covering the lower side of the internal structure are attached to the internal structure. By thus attaching the upper case 40 and the lower case 80 to the internal structure including the reinforcing frame 70 formed by a material having a high rigidity, it is possible to ensure the rigidity of the upper case 40 and the rigidity of the lower case 80 and ensure the rigidity of the input device 1A as a whole.

(5) In addition, the input device 1A has a plurality of screws that fix the lower case 80 to at least one of the upper case 40, the main frame 50, and the reinforcing frame 70. Moreover, as illustrated in FIG. 2 and FIG. 9, the input device 1A includes the lower cover 90 that is attached to the lower surface 82 of the lower case 80 and that covers a plurality of attachment holes formed in the lower case 80. The lower cover 90 constitutes at least a part of each of the lower surface of the device front portion 10F, the left side surface 10Ra of the right grip 10BR, and the right side surface 10La of the left grip 10BL. By thus covering the plurality of screws inserted into the lower case 80 by the lower cover 90 and forming at least a part of the input device 1A by the lower cover 90, it is possible to increase the fixation strength of the cases 40 and 80, the frames 50 and 70, and the like and increase the rigidity of the input device 1A while an effect on the external appearance of the input device 1A is being suppressed.

(6) In addition, the input device 1A has an operation stick 400, as illustrated in FIG. 15. As illustrated in FIG. 17, the top member 410 including the upper surface 410a touched by a finger of the user in the operation stick 400 includes the tubular portion 412 that extends downward. The base member 420 to which the top member 410 is attached includes the column portion 422 that can be fitted into the inside of the tubular portion 412. Moreover, as illustrated in FIG. 18A, the elastic member 430 is attached to the peripheral surface of the column portion 422. The elastic member 430 is located on the inside of the tubular portion 412, and catches the inner surface of the tubular portion 412. The elastic member 430 thereby limits upward movement of the top member 410. The elastic member 430 bends when the user biases the top member 410 upward in a state of being attached to the base member 420. Thus, the user can extract the top member 410 from the base member 420. By replacing the top member 410 with another one, the user can easily change the height, size, shape, texture, and the like of the operation stick 400.

(7) In addition, as illustrated in FIG. 19A and FIG. 20, the trigger unit 130 of the input device 1A includes the stopper member 620 that abuts against the rear edge 16a or 16b of the trigger button and limits the movable range of the trigger button 16. As illustrated in FIG. 21A and FIG. 21C, the stopper member 620 can move between the initial position that allows movement of the trigger button in the range of the distance ΔR1 and the final position that limits the movement of the trigger button to the range of the distance ΔR3 smaller than the range of the distance ΔR1. The operation member 630 engages with the stopper member 620, can move in a direction different from that of the stopper member 620, and moves the stopper member 620 between the initial position and the final position. The user moves the stopper member 620 between the initial position and the final position by operating the operation member 630, and can thus adjust the movable range of the trigger button 16.

Modifications

The present invention is not limited to the input device 1A described above, but may be subjected to various changes. For example, the arrangement of operation members (operation buttons 11 and the like) in the input device 1A is not limited to the example of FIG. 1. The number of operation buttons 11 may be one, or may be plural other than four. In addition, the position of the plurality of operation buttons 11 and the position of the direction key 12 may be interchanged.

In addition, in the example of FIG. 1, the function buttons 350 project rearward from the central portion 10M. However, the function buttons 350 may project in the right direction from the left grip 10BL, or may project in the right direction from the right grip 10BR. Also in this case, operations of the operation buttons 11, the direction key 12, the operation sticks 400, and the like by the user are not hindered, and the user can operate the function buttons 350 promptly as necessary. It is to be noted that the arrangement of the operation sticks 400 and the function buttons 350 in the input device 1A is not limited to the example of FIG. 1. For example, the numbers of the operation sticks 400 and the function buttons 350 in the input device 1A may be one, or may be a plural number of three or more. In addition, the number of the operation sticks 400 and the number of the function buttons 350 may not coincide with each other.

In addition, in the example of FIG. 8, both the upper case 40 covering the upper side of the internal structure including the main frame 50 and the reinforcing frame 70 and the lower case 80 covering the lower side of the internal structure are attached to the internal structure by screws. However, the upper case 40 may be attached to only the lower case 80, or may be attached to both the internal structure and the lower case 80. By ensuring the rigidity of the lower case 80 by the internal structure including the reinforcing frame 70, it is possible to secure the rigidity of the upper case 40 even in a case where the upper case 40 is attached to only the lower case 80. In addition, in a case where the upper case 40 is attached to the internal structure, the lower case 80 may be attached to only the upper case 40. This also can ensure the rigidity of the upper case 40 and the lower case 80.

Figure 24:
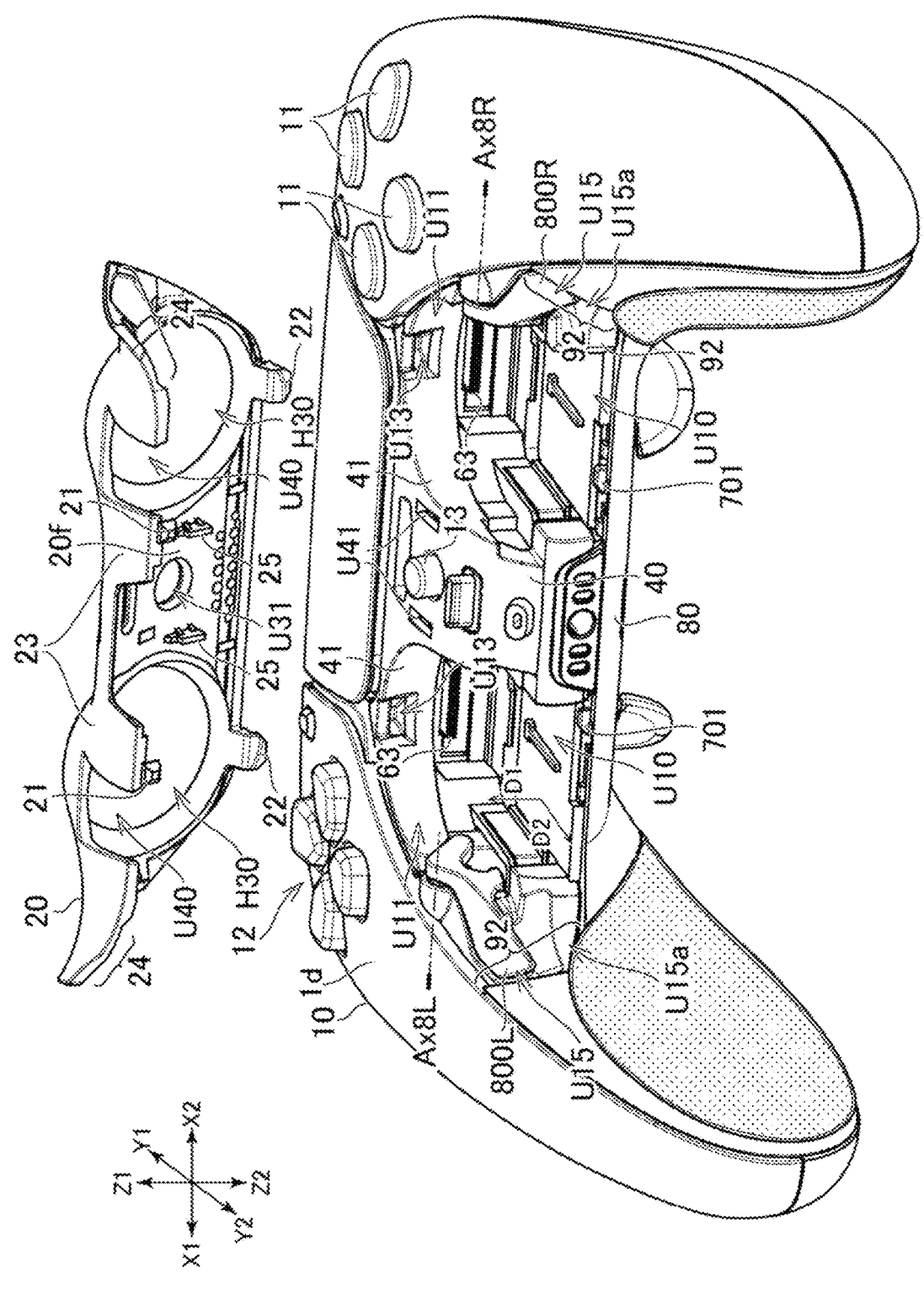
FIG. 24 is an exploded perspective view illustrating the lower surface of an upper cover and a main body of an input device.
Figure 26:
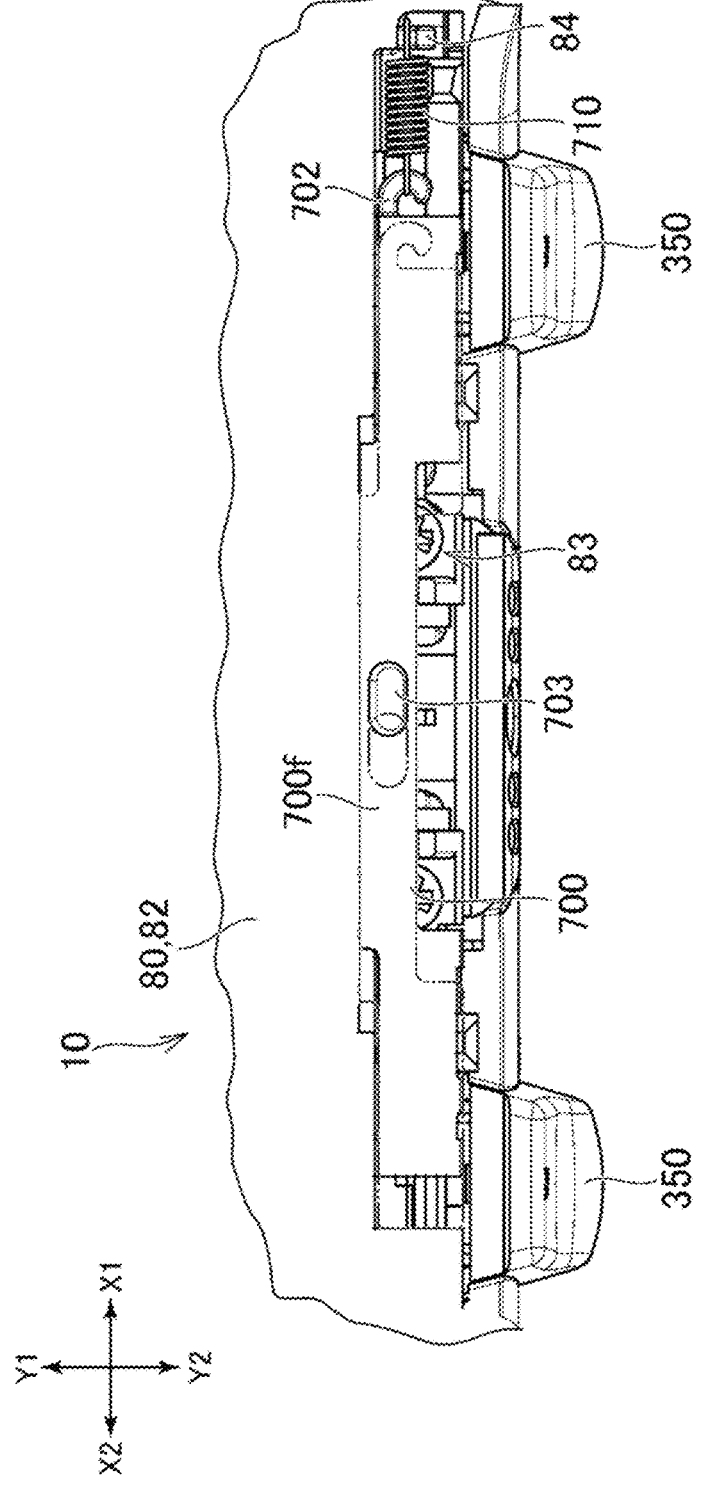
FIG. 26 is a view illustrating a part of the lower surface of the input device in a state in which a lower cover is removed.

In the following, an input device 1B according to a modification of the present disclosure (another example of the embodiment) will be described. FIG. 24 is an exploded perspective view illustrating the lower surface of an upper cover 90 and a main body 10 of the input device 1B. FIG. 25 is a bottom view illustrating the lower surface of the input device 1B. FIG. 26 is a diagram illustrating a part of the lower surface of the input device 1B in a state in which a lower cover 90 is removed from the input device 1B. The input device 1B is different from the input device 1A in that the input device 1B includes a cover lock member 700 to be described later and the upper cover 20 can be removed by an operation of the cover lock member 700. In addition, the input device 1B is different from the input device 1A in that the input device 1B includes operation levers 800 to be described later and stick units 30 can be attached and removed by operations of the operation levers 800.

[Structure for Attachment of Upper Cover]

As in the input device 1A, the upper cover 20 (first exterior cover) is attached to the main body 10 of the input device 1B. As illustrated in FIG. 24, housing recessed portions U10 formed in the main body 10 of the input device 1B open in the two directions of the upward direction (the Z1 direction or a direction indicated by an arrow D1 in FIG. 24) and the rearward direction (the Y2 direction or a direction indicated by an arrow D2 in FIG. 24). Moreover, the stick units 30 including operation sticks 400 and supporting mechanisms 330 of the operation sticks 400 can be attached to and detached from the housing recessed portions U10 in the front-rear direction. The upper cover 20 covers at least a part of the openings of the housing recessed portions U10 by being attached to the main body 10. The main body 10 of the input device 1B includes an upper case 40 and a lower case 80 combined with each other in the upward-downward direction. The operation sticks 400 as at least a part of the stick units 30 project upward from the upper case 40. The upper cover 20 covers the external surface of the upper case 40 by being attached to the main body 10. Thus, the upper cover 20 forms at least a part of an upper surface 1d of the input device 1B together with the upper case 40.

As illustrated in FIG. 24, the upper cover 20 has engaging portions 21 (first engaging portions) that catch the main body 10 of the input device 1B. The engaging portions 21 are formed at the rear edge (first edge) of the upper cover 20. More specifically, the upper cover 20 has a rear wall portion 23 forming the rear edge in a central portion of the upper cover 20. The engaging portions 21 are formed at a lower end of the rear wall portion 23. The upper cover 20 has two engaging portions 21 arranged side by side at an interval in the left-right direction. Two recessed portions U40 in which two function buttons 350 are respectively arranged are formed in the rear wall portion 23. In the left-right direction, the two engaging portions 21 are located between the two recessed portions U40. The two engaging portions 21 catch engaging portions 701 of the cover lock member 700 to be described later, which is attached to the main body 10 of the input device 1B.

As illustrated in FIG. 26, the main body 10 of the input device 1B includes the cover lock member 700. The cover lock member 700 extends along the left-right direction, and is attached to the lower case 80 constituting the main body 10 of the input device 1B. The cover lock member 700 is attached to the rear edge of the lower case 80.

Figure 27:
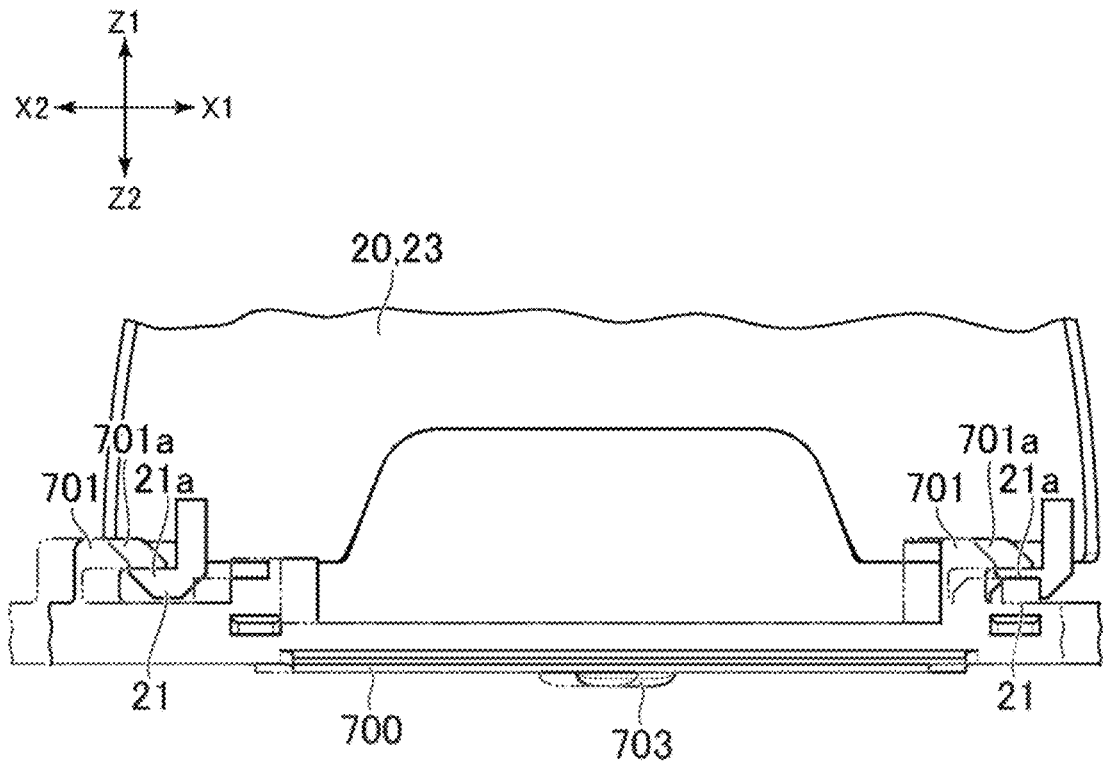
FIG. 27 is a view illustrating a part of the upper cover and a part of a slide member.

FIG. 27 is a diagram illustrating a part of the upper cover 20 and a part of the cover lock member 700. FIG. 27 illustrates the cover lock member 700 and the front side (inside) of the upper cover 20 attached to the cover lock member 700. As illustrated in FIG. 27, the cover lock member 700 has engaging portions 701 (second engaging portions) for catching the engaging portions 21 of the upper cover 20. The engaging portions 21 include a pawl portion 21a that project to one side in the left-right direction (to the right side (in the X2 direction) in the example of FIG. 27). The engaging portions 701 include a pawl portion 701a that projects to the other side in the left-right direction (to the left side (in the X1 direction) in the example of FIG. 27). The upper surface of the pawl portion 21a and the lower surface of the projecting portion 701 are in contact with each other. The pawl portion 701a of the engaging portion 701 thereby catches the pawl portion 21a of the engaging portion 21. The upper cover 20 has two engaging portions 21. The pawl portions 21a of the two engaging portions 21 each project in the same direction. In addition, the cover lock member 700 has two engaging portions 701. The pawl portions 701a of the two engaging portions 701 each project in the same direction.

As illustrated in FIG. 26 and FIG. 27, the cover lock member 700 can move relative to the main body 10 of the input device 1B. The cover lock member 700 can move along the left-right direction with respect to the lower case 80 constituting the main body 10. The cover lock member 700 can move between a locking position at which the engaging portions 701 of the cover lock member 700 engage with the engaging portions 21 of the upper cover 20, the locking position being indicated by solid lines in FIG. 26 and FIG. 27, and an unlocking position at which the engagement between the engaging portions 701 of the cover lock member 700 and the engaging portions 21 of the upper cover 20 is released, the unlocking position being indicated by chain double-dashed lines in FIG. 26 and FIG. 27. As illustrated in FIG. 27, the locking position of the cover lock member 700 is defined in a direction in which the pawl portions 701a of the engaging portions 701 project with respect to the unlocking position. In other words, the unlocking position of the cover lock member 700 is defined in a direction in which the pawl portions 21a of the engaging portions 21 project with respect to the locking position. When the cover lock member 700 is moved to the unlocking position, the lower surfaces of the projecting portions 701 of the engaging portions 701 are separated from the upper surfaces of the pawl portions 21a of the engaging portions 21, and the engagement (catching) of the engaging portions 701 with the engaging portions 21 is released. That is, the locking of the upper cover 20 to the main body 10 is released.

As illustrated in FIG. 26, the cover lock member 700 is biased to the locking position as an initial position by an elastic member 710. The elastic member 710 is a tension spring, for example. The elastic member 710 biases the cover lock member 700 to the locking position by pulling the cover lock member 700 in a state in which two ends of the elastic member 710 are attached to the cover lock member 700 and the lower case 80. The elastic member 710 is attached to the left side or the right side of the cover lock member 700 (to the left side in the example illustrated in FIG. 26). The cover lock member 700 has an attachment portion 702 to which one end of the elastic member 710 is attached. The lower case 80 has an attachment portion 84 to which the other end of the elastic member 710 is attached.

Figure 28:
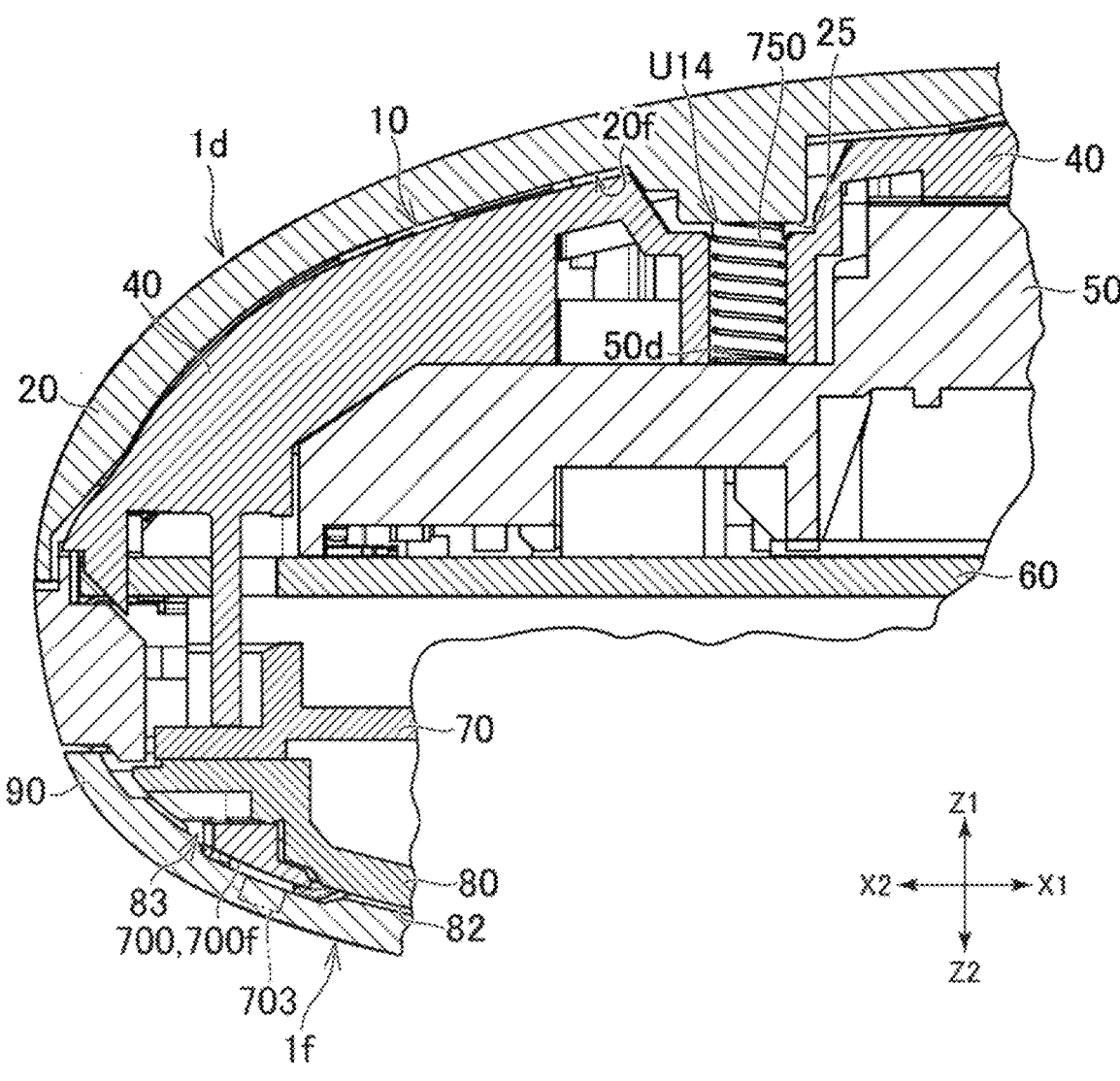
FIG. 28 is a sectional view taken along a line XXVIII-XXVIII in FIG. 25.

FIG. 28 is a sectional view taken along a line XXVIII-XXVIII in FIG. 25. As illustrated in FIG. 26 and FIG. 28, the cover lock member 700 has an operation portion 703 that projects downward from a lower surface 700f of the cover lock member 700 and that is operated by the user. The operation portion 703 of the cover lock member 700 is located on the lower side of the lower case 80. More specifically, the whole of the cover lock member 700 is located on the lower side of the lower case 80. The lower case 80 has a recessed portion 83 at a rear edge thereof. The recessed portion 83 opens downward and rearward. The cover lock member 700 is attached to the inside of the recessed portion 83. The lower surface 700f of the cover lock member 700 is flush with the lower surface 82 of the lower case 80.

As illustrated in FIG. 28, a distance between the upper surface 1d and the lower surface 1f of the input device 1B gradually decreases toward the rear. Here, as illustrated in FIG. 24, the upper cover 20 constituting at least a part of the upper surface 1d of the input device 1B has the engaging portions 21 at the rear edge of the upper cover 20. Thus, the engaging portions 21 are provided at a position at which the distance between the upper surface 1d and the lower surface 1f is reduced, and the engaging portions 21 engage with the engaging portions 701 of the cover lock member 700. The length of the engaging portions 21 and 701 in the upward-downward direction can be consequently reduced. It is thereby possible to ensure the strength of the engaging portions 21 and 701. In addition, as illustrated in FIG. 24, the engaging portions 701 of the cover lock member 700 are located at the rear edge of the lower case 80. This also makes it possible to reduce the length of the engaging portions 21 and 701 in the upward-downward direction and ensure the strength of the engaging portions 21 and 701.

As illustrated in FIG. 25, the operation portion 703 of the cover lock member 700 is exposed on the lower surface 1f of the input device 1B. In other words, the operation portion 703 of the cover lock member 700 is located on the lower side of the lower case 80, and is exposed on the external surface of the input device 1B. As illustrated in FIG. 28, the lower cover 90 (second exterior cover) attached to the lower side of the input device 1B covers at least a part of the lower surface 82 of the lower case 80 and at least a part of the lower surface 700f of the cover lock member 700, and exposes the operation portion 703 of the cover lock member 700. The lower cover 90 has a hole H21 that exposes the operation portion 703 of the cover lock member 700. The hole H21 is wider than the operation portion 703 in the left-right direction in which movement of the cover lock member 700 is allowed. Therefore, the user can move the operation portion 703 exposed from the hole H21 in the left-right direction. When the operation portion 703 is moved, the whole of the cover lock member 700 including the operation portion 703 moves in the left-right direction with respect to the lower case 80. The cover lock member 700 can thereby move between the locking position indicated by the solid lines in FIG. 26 and FIG. 27 and the unlocking position indicated by the chain double-dashed lines in the same figures.

As illustrated in FIG. 24, the upper cover 20 has engaging portions 22 (third engaging portions) at the front edge (second edge) of the upper cover 20, the engaging portions 22 engaging with the main body 10 of the input device 1B. Because the engaging portions 22 and the engaging portions 21 are respectively provided to the front edge and the rear edge of the upper cover 20, the user can perform work of, for example, engaging the engaging portions 21 at the rear edge of the upper cover 20 with the main body 10 after engaging the engaging portions 22 at the front edge of the upper cover 20 with the main body 10. That is, the work of attaching the upper cover 20 is facilitated. The upper cover 20 has two engaging portions 22 arranged side by side at an interval in the left-right direction at the front edge of the upper cover 20. The two engaging portions 22 respectively fit into two recessed portions U13 arranged side by side in the left-right direction at the same interval in the main body 10 of the input device 1B. Each of the engaging portions 22 has a shape that extends downward from a front end of the edge of the hole H30 penetrated by the operation stick 400, and projects frontward at a lower end portion thereof.

The recessed portions U13 that are fitted with the engaging portions 22 of the upper cover 20 are formed in the upper case 40. The upper case 40 has the two recessed portions U13 that open rearward and into which the two engaging portions 22 are respectively fitted. The upper case 40 has recessed portions U11 opening upward and rearward in the positions of the housing recessed portions U10 in which the stick units 30 are arranged. The recessed portions U13 that open rearward are formed at front ends of rear surfaces 41 that curve along the recessed portions U11.

As illustrated in FIG. 28, the main body 10 of the input device 1B has an elastic member 750 that biases the upper cover 20 in a direction of separating from the main body 10. In the example illustrated in FIG. 28, the elastic member 750 is a coil spring. However, the elastic member 750 may be, for example, a metallic leaf spring, a rubber, a resin, or the like as long as the elastic member 750 is elastically deformable. Thus biasing the upper cover 20 in the direction of separating from the main body 10 by the elastic member 750 can suppress rattling of the upper cover 20 against the main body 10 when the vibration motors 120 provided to the main body 10 vibrate, for example.

As illustrated in FIG. 24, the upper cover 20 has the holes H30 (openings). The stick units 30 that are attached to the main body 10 of the input device 1B include the operation sticks 400 that extend in a direction of passing through the holes H30 of the upper cover 20. Here, the elastic member 750 biases the upper cover 20 in the upward direction, which is the direction in which the operation sticks 400 extend. This makes it easy for the user to remove the upper cover 20 in the upward direction of the main body 10 when the user releases the catching of the engaging portions 701 of the cover lock member 700 on the engaging portions 21 of the upper cover 20 by moving the cover lock member 70 to the unlocking position.

As illustrated in FIG. 24 and FIG. 28, the main body 10 has recessed portions U14 that open upward. Elastic members 750 are housed inside the recessed portions U14. As illustrated in FIG. 28, the recessed portions U14 are formed by holes penetrating the upper case 40 in the upward-downward direction and an upper surface 50*d* of the main frame 50.

As illustrated in FIG. 24 and FIG. 28, the upper cover 20 has projecting portions 25 that fit into the recessed portions U14. The projecting portions 25 are formed on a lower surface (undersurface) 20*f* of the upper cover 20, and project downward from the lower surface 20*f* of the upper cover 20. The elastic members 750 push the projecting portions 25 of the upper cover 20 upward. It is thereby possible to suppress rattling of the upper cover 20 against the main body 10 of the input device 1B and facilitate removing the upper cover 20 from the main body 10.

As illustrated in FIG. 24, the main body 10 of the input device 1B has two housing recessed portions U10 that respectively house the two stick units 30. In addition, the two holes H30 formed in the upper cover 20 that is attached to the main body 10 expose at least a part of one of the two stick units 30 (the operation stick 400 and the like) and at least a part of the other of the two stick units 30 (the operation stick 400 and the like). Here, the projecting portions 25 of the upper cover 20 are located between the two holes H30. This can suppress the biasing of the upper cover 20 in an upward and rightward (or leftward) oblique direction and more effectively suppress rattling of the upper cover 20 against the main body 10. In addition, when the upper cover 20 is removed from the main body 10, the upper cover 20 separates in the projecting direction of the operation sticks 400. It is therefore possible to suppress the catching of the operation sticks 400 or the like on the edges of the holes H30.

In addition, as illustrated in FIG. 24, the projecting portions 25 are located rearward of the front edges of the holes H30, and are located frontward of the rear edges of the holes H30. This also can suppress the catching of the operation sticks 400 or the like on the edges of the holes H30 because the upper cover 20 separates from the main body 10 in the projecting direction of the operation sticks 400 when the upper cover 20 is removed from the main body 10.

As illustrated in FIG. 24, the upper cover 20 has two projecting portions 25. In addition, the main body 10 of the input device 1B has two recessed portions U14, and two elastic members 750 are respectively housed inside the two recessed portions U14. The two projecting portions 25 of the upper cover 20 respectively fit into the two recessed portions U14 of the main body 10. Therefore, a distance between the two projecting portions 25 is equal to a distance between the two recessed portions U14. By thus providing the two projecting portions 25 to the upper cover 20, and pushing the two projecting portions 25 by the two elastic members 750, it is possible to suppress rattling of the upper cover 20 against the vibration of the main body 10 more effectively and make it easier to remove the upper cover 20 from the main body 10. The two projecting portions 25 are arranged side by side in the left-right direction. The two projecting portions are each located between the two holes H30, and are located between front ends and rear ends of the edges of the holes H30 in the front-rear direction. A distance between one of the two projecting portions 25 and one of the two holes H30 is equal to a distance between the other of the two projecting portions 25 and the other of the two holes H30. In addition, the main body 10 has an operation button 13 projecting upward in the central portion 10M, and a hole H31 that exposes the operation button 13 upward is formed in a central portion of the upper cover 20. A distance between the hole H31 and one of the two projecting portions 25 is equal to a distance between the hole H31 and the other of the two projecting portions 25.

As in the example of the input device 1A, the upper cover 20 has edge portions 24 at parts of the peripheral edge thereof, and the lower cover 90 that covers the lower case 80 and the cover lock member 700 has edge portions 92 at parts of the peripheral edge thereof, the edge portions 92 being adjacent to the edge portions 24 of the upper cover 20. Because the upper cover 20 and the lower cover 90 thus have the edge portions 24 and 92 adjacent to each other, the external appearance of the input device 1B can be made excellent.

The upper cover 20 has the edge portions 24 respectively at a right portion and a left portion thereof located on opposite sides from each other with the rear wall portion 23 interposed therebetween, the rear wall portion 23 forming the rear edge of the upper cover 20. In addition, the lower cover 90 has the edge portions 92 respectively at a right portion and a left portion thereof. In addition, the two edge portions 92 of the lower cover 90 are respectively arranged at a left side surface 10Ra of a right grip 10BR and a right side surface 10La of a left grip 10BL. In addition, the two edge portions 24 of the upper cover 20 are respectively adjacent to the left side surface 10Ra of the right grip 10BR and the right side surface 10La of the left grip 10BL. The external surface of the upper cover 20 and the external surface of the lower cover 90 are flush with each other at the edge portions 24 and 92. This can further improve the external appearance of the input device 1B.

Parts of housing recessed portions U15 that house the operation levers 800 are formed in the left side surface 10Ra of the right grip 10BR and the right side surface 10La of the left grip 10BL, as will be described later. The edge portions 24 (projecting edges) of the upper cover 20 are located rearward of the rear edge of the upper cover 20 (external surface of the rear wall portion 23), and are located at the left side surface 10Ra of the right grip 10BR and the right side surface 10La of the left grip 10BL. This makes it possible to enlarge the housing recessed portions U15 and the operation levers 800 in the extending direction of the grips BL and BR and facilitate the operation of the user on the operation levers 800.

[Structures for Attachment of Stick Units by Using Operation Levers]

As illustrated in FIG. 24, the main body 10 of the input device 1B has operation levers (stopper members) 800L and 800R in the housing recessed portions U10. The main body 10 has the two housing recessed portions U10 separated from each other in the left-right direction in a device front portion 10F. The operation lever 800L is attached to the housing recessed portion U10 located in a left portion of the input device 1B (left portion 10L of the device front portion 10F). The operation lever 800R is attached to the housing recessed portion U10 located in a right portion of the input device 1B (right portion 10R of the device front portion 10F). The operation lever 800L is attached to the left side of the housing recessed portion U10. The operation lever 800R is attached to the right side of the housing recessed portion U10. In the following description, the two operation levers 800L and 800R may be referred to simply as operation levers 800.

Figure 29A:
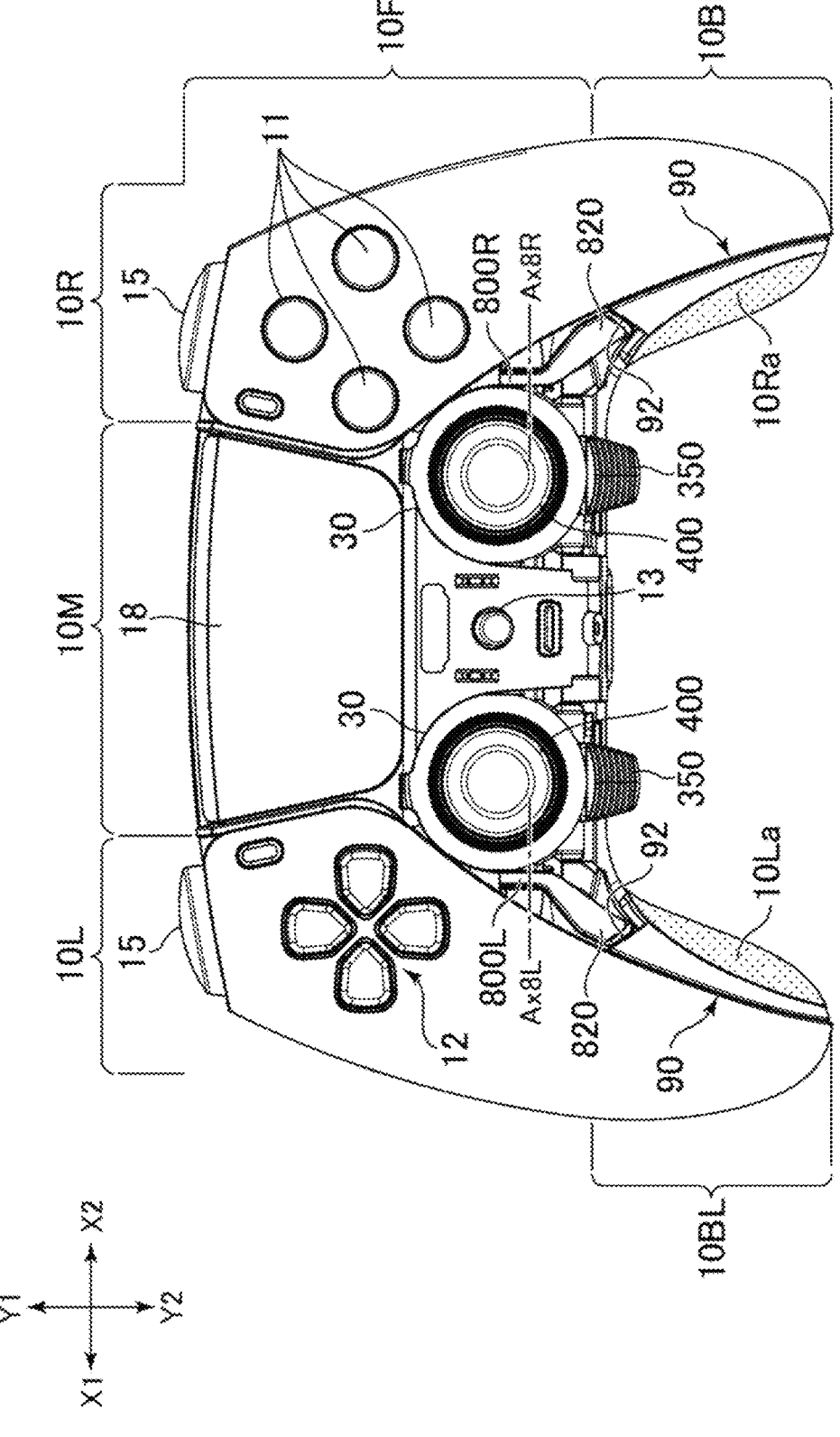
FIG. 29A is a plan view of the input device in a state in which the upper cover is removed.
Figure 30A:
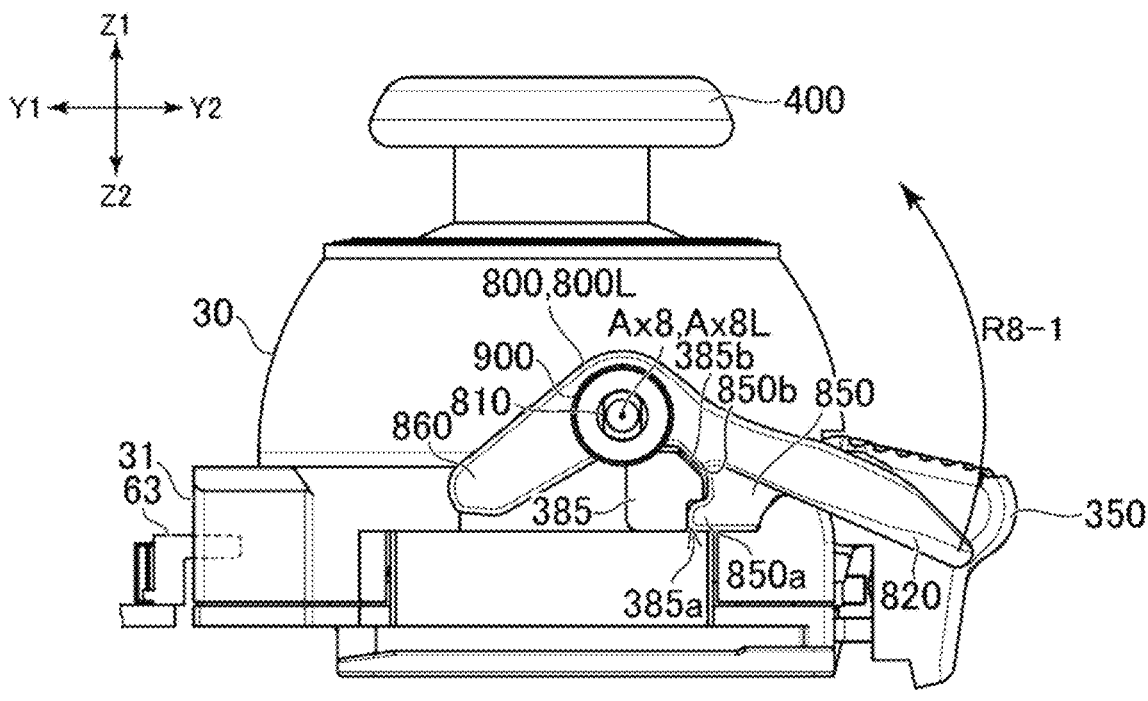
FIG. 30A is a view illustrating a stick unit and a stopper member.
Figure 30B:
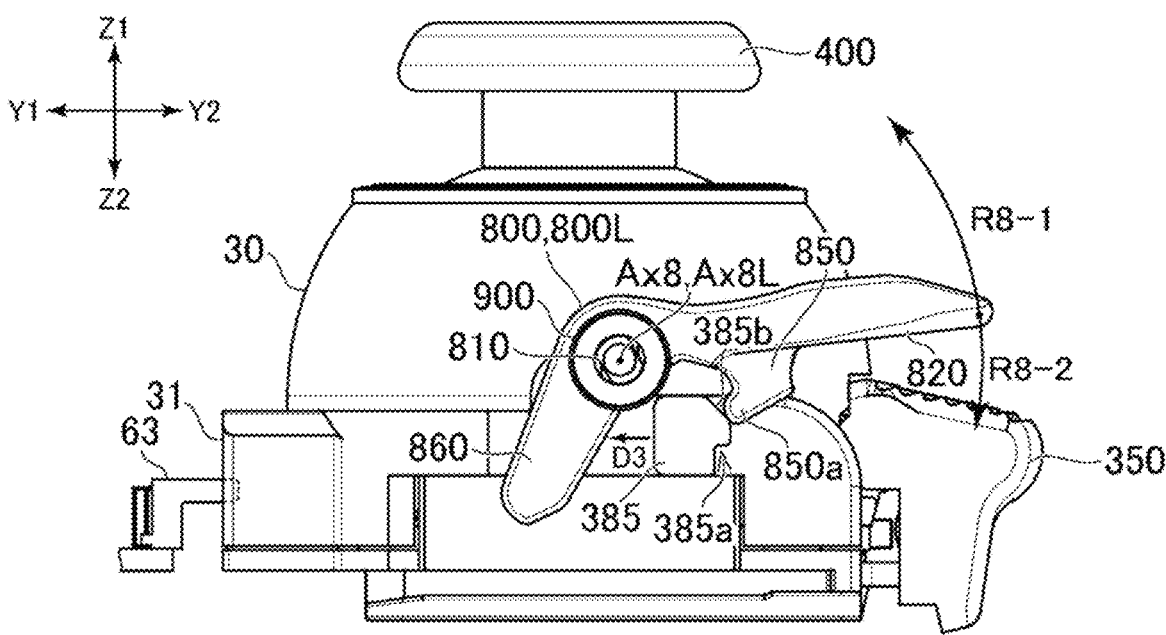
FIG. 30B is a view illustrating the stick unit and the stopper member.
Figure 30C:
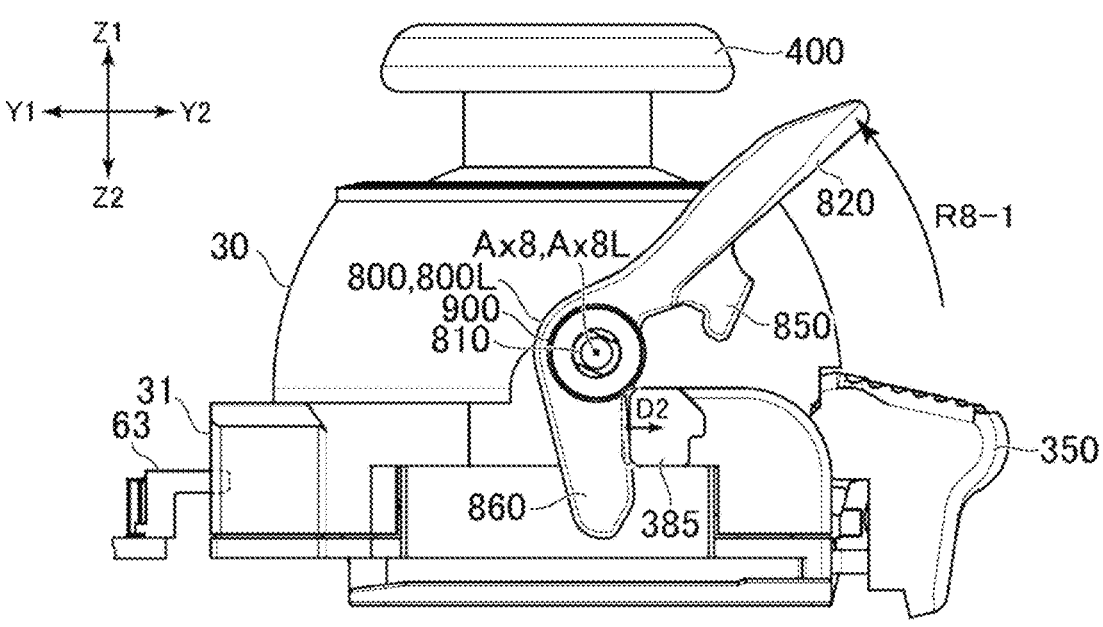
FIG. 30C is a view illustrating the stick unit and the stopper member.

FIG. 29A and FIG. 29B are plan views of the input device 1B in a state in which the upper cover 20 (see FIG. 24) is removed. FIGS. 30A to 30C are views illustrating the side surfaces of a stick unit 30 and an operation lever 800 (more specifically, the operation lever 800L). FIG. 29A and FIG. 30A illustrate a state in which the operation lever 800L is at a locking position (first position). FIG. 29B and FIG. 30C illustrate a state in which the operation lever 800L is at an unlocking position (second position). FIG. 30B illustrates a state in which the operation lever 800L is at an intermediate position between the locking position and the unlocking position.

The operation lever 800L can move between the locking position illustrated in FIG. 29A and FIG. 30A and the unlocking position illustrated in FIG. 29B and FIG. 30C. In the example of the input device 1B, the operation lever 800L includes a shaft portion 810 (see FIG. 30A) in which an axis Ax8L along a direction intersecting the front-rear direction (direction of attachment and detachment of the stick unit 30 to and from the main body 10 of the input device 1B) is defined, and the operation lever 800L is rotatable about the axis Ax8L. In addition, the operation lever 800R also includes a shaft portion 810 in which an axis Ax8R along a direction intersecting the front-rear direction is defined, and the operation lever 800R is rotatable about the axis Ax8R between the locking position and the unlocking position. In the example illustrated in FIG. 29A and FIG. 29B, the axis Ax8L and the axis Ax8R are located on a same straight line along the left-right direction (direction perpendicular to the direction of attachment and detachment of the stick unit 30). Without being limited to this, the axis Ax8L and the axis Ax8R may be along an oblique direction with respect to the left-right direction, or may not be on a same straight line. In the following description, the axis Ax8L and the axis Ax8R may be referred to simply as an axis Ax8.

As illustrated in FIG. 30A, the operation lever 800 includes an operation portion 820 that extends from the shaft portion 810. By operating the operation portion 820, the user can move the operation lever 800 in a rotational direction R8-1 (direction of moving from the locking position to the unlocking position of the operation lever 800), and move the operation lever 800 in a rotational direction R8-2 as an opposite direction from the rotational direction R8-1 (direction of moving from the unlocking position to the locking position).

As illustrated in FIG. 24, the housing recessed portions U10 formed in the main body 10 of the input device 1B open in two directions, that is, the upward direction (the Z1 direction or a direction indicated by an arrow D1 in FIG. 24) and the rearward direction (the Y2 direction or a direction indicated by an arrow D2 in FIG. 24). The stick units 30 can be attached to and detached from the main body 10 in the front-rear direction. Here, as will be described later, the operation levers 800 regulate movement in the front-rear direction of the stick units 30 when the operation levers 800 are at the locking position. In addition, the operation levers 800 allow movement in the front-rear direction of the stick units 30 when the operation levers 800 are at the unlocking position.

Figure 31:
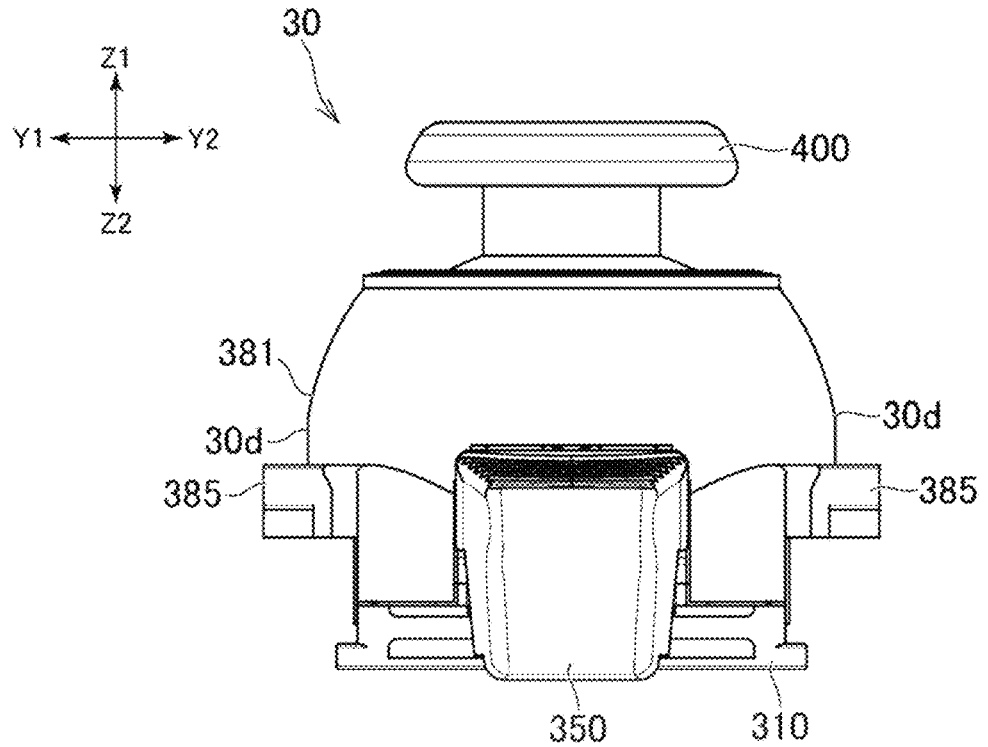
FIG. 31 is a rear view illustrating the rear surface of the stick unit.

FIG. 31 is a rear view illustrating the rear surface of a stick unit. As illustrated in FIG. 31, the stick unit 30 has projecting portions 385 that project in the left direction or the right direction from a side surface 30d of the stick unit 30. In the example illustrated in FIG. 30, the stick unit 30 has two projecting portions 385 respectively arranged on the left side and the right side of the stick unit 30. This makes it possible to use identical stick units 30 (stick units 30 that are identical in structure, shape, and the like) as the stick unit 30 to be housed in the housing recessed portion U10 located in the left portion of the input device 1B and the stick unit 30 to be housed in the housing recessed portion U10 located in the right portion of the input device 1B. The projecting portions 385 are located below a dome-shaped upper wall portion 381 that forms the external surface of the stick unit 30. The projecting portion 385 located on the left side of the stick unit 30 projects leftward of a left end of the upper wall portion 381. The projecting portion 385 located on the right side of the stick unit 30 projects rightward of a right end of the upper wall portion 381.

As illustrated in FIG. 30A, the operation lever 800 includes a stopper portion (first portion) 850 that is located rearward of the projecting portion 385 of the stick unit 30 and that abuts against the projecting portion 385 when the operation lever 800 is at the locking position. When the connector 31 of the stick unit 30 is fitted to the connector 63 of the main body 10, and the operation lever 800 is at the locking position, the stopper portion 850 of the operation lever 800 regulates rearward movement of the stick unit 30 by abutting against the rear side of the projecting portion 385. A recessed portion 385a is formed in the rear surface of the projecting portion 385 of the stick unit 30. A projecting portion 850a is formed on the front surface of the stopper portion 850. When the operation lever 800 is at the locking position, the projecting portion 850a of the stopper portion 850 is fitted to the inside of the recessed portion 385a of the stick unit 30. It is thereby possible to regulate movement of the operation lever 800 at the locking position in the rotational direction R8-1 about the axis Ax8 (direction of moving from the locking position to the unlocking position of the operation lever 800).

A spring mechanism 900 is attached to the shaft portion 810 of the operation lever 800. The spring mechanism 900 biases the shaft portion 810 of the operation lever 800 such that the operation lever 800 moves in the rotational direction R8-2. This also can regulate natural movement of the operation lever 800 at the locking position in the rotational direction R8-1. The user can move the operation lever 800 in the rotational direction R8-1 against the force of the spring mechanism 900 and the like. When the operation lever 800 is moved in the rotational direction R8-1 and moved to the unlocking position illustrated in FIG. 30C, the stopper portion 850 of the operation lever 800 moves to above the projecting portion 385, and thus ceases to interfere with the projecting portion 385 in the front-rear direction. Hence, in a case where the operation lever 800 is at the unlocking position, rearward movement of the stick unit 30 is allowed.

When the operation lever 800 is moved from the intermediate position illustrated in FIG. 30B to the locking position illustrated in FIG. 30A, the stopper portion 850 of the operation lever 800 moves the stick unit 30 in the direction of the main body 10. For example, in a state in which the stick unit 30 is located in the housing recessed portion U10 of the input device 1B, and the connector 31 of the stick unit 30 is not completely fitted (not electrically connected) to the connector 63 of the main body 10, as illustrated in FIG. 30B, the projecting portion 850*a* of the stopper portion 850 moves along the rotational direction R8-2 while abutting against the projecting portion 385 of the stick unit 30, and pushes the projecting portion 385 frontward (direction indicated by an arrow D3 in FIG. 30B). Thus, the whole of the stick unit 30 including the projecting portion 385 is pushed frontward, and the connector 31 of the stick unit 30 moves in a direction of being fitted to the connector 63 of the main body 10. By moving the operation lever 800 to the locking position via the operation portion 820, the user can move the stick unit 30 in the direction of the main body 10, and fit the connector 31 of the stick unit 30 to the connector 63 of the main body 10. By thus using the operation lever 800, it becomes easy to attach the stick unit 30 to the main body 10.

The length of the operation portion 820 (distance from the axis Ax8 to a rear end of the operation portion 820) is larger than a distance from the axis Ax8 to the projecting portion 850*a*. It is therefore possible to reduce a force necessary to push the stick unit 30 frontward. As a result, the stick unit 30 can be fitted into the housing recessed portion U10 with a small operating force even in a case where a tolerance between the projecting portions 310*b* (guided portions) formed on the stick unit 30 and the groove portions 76L and 76R (guide portions) formed in the reinforcing frame 70 as illustrated in FIG. 14 is reduced in order to suppress rattling of the stick unit 30 against the main body 10.

As illustrated in FIG. 30B, the rear surface of the projecting portion 385 of the stick unit 30 has an inclined surface 385*b* at an upper end thereof. When the operation lever 800 is moved in the rotational direction R8-2 from the intermediate position illustrated in FIG. 30B, the projecting portion 850*a* of the stopper portion 850 can move toward the recessed portion 385*a* while pressing the inclined surface 385*b* frontward. In addition, the operation lever 800 has an inclined surface 850*b* (see FIG. 30A) between the projecting portion 850*a* and the shaft portion 810 in which the axis Ax8 is defined. As illustrated in FIG. 30A, when the operation lever 800 is at the locking position, the inclined surface 850*b* of the stopper portion 850 is in contact with the inclined surface 385*b* of the projecting portion 385, and thereby regulates movement of the stick unit 30 in the front-rear direction.

The stick unit 30 includes an extending portion 860 that extends from the shaft portion 810 in a direction different from that of the operation portion 820. The extending portion 860 extends in a direction intersecting the direction in which the operation portion 820 extends. When the connector 31 of the stick unit 30 is fitted to the connector 63 of the main body 10, and the operation lever 800 is moved from the intermediate position illustrated in FIG. 30B to the unlocking position illustrated in FIG. 30C, the extending portion 860 of the operation lever 800 moves the stick unit 30 in a direction of separating from the main body 10. That is, the extending portion 860 moves the stick unit 30 in a direction in which the connector 31 of the stick unit 30 is removed from the connector 63 of the main body 10. When the operation lever 800 is moved in the rotational direction R8-1 and moved to the unlocking position, the extending portion 860 moves along the rotational direction R8-1 while abutting against the front surface of the projecting portion 385 of the stick unit 30, and pushes the projecting portion 385 rearward (direction indicated by an arrow D2 in FIG. 30C). Thus, the whole of the stick unit 30 including the projecting portion 385 is pushed rearward, and the connector 31 of the stick unit 30 moves in a direction of being removed from the connector 63 of the main body 10. The user can remove the connector 31 of the stick unit 30 from the connector 63 of the main body 10 by moving the operation lever 800 to the unlocking position via the operation portion 820. That is, the stick unit 30 can be easily removed from the main body 10 by using the operation lever 800.

As described above, the operation lever 800 includes the operation portion 820 that extends from the shaft portion 810. As illustrated in FIG. 29A and FIG. 29B, in the left-right direction (direction perpendicular to the direction of attachment and detachment of the stick unit 30 to and from the main body 10 of the input device 1B), the operation portion 820 extends in a direction of separating from the housing recessed portion U10 in which the stick unit 30 is disposed. The operation portion 820 extends along a direction which is not perpendicular to the axis Ax8 and intersects the axis Ax8. In a state in which the stick unit 30 is attached to the main body 10, an end portion of the operation lever 800 including the operation portion 820 is separated from the stick unit 30 in the left-right direction. As illustrated in FIG. 29A, the operation portion 820 of the operation lever 800L on the left side at the locking position extends in a rearward and leftward oblique direction with respect to the housing recessed portion U10. In addition, the operation portion 820 of the operation lever 800R on the right side at the locking position extends in a rearward and rightward oblique direction with respect to the housing recessed portion U10. This can suppress interference of a finger of the user with the stick unit 30 when the user is touching the operation portion 820 in order to operate the operation lever 800.

As illustrated in FIG. 24, the operation lever 800 is attached to the main body 10 of the input device 1B. More specifically, the operation lever 800 is attached to the upper case 40 constituting the main body 10. In addition, the main body 10 has a housing recessed portion U15 that opens upward and rearward on the left side or the right side of the housing recessed portion U10 in which the stick unit 30 is disposed. In a state in which the operation lever 800 is at the locking position, the whole of the operation lever 800 is housed inside the housing recessed portion U15. In other words, in a state in which the operation lever 800 is at the locking position, the whole of the operation lever 800 is disposed below the upper surface 1*d* of the input device 1B. It is thereby possible to suppress interference of the operation lever 800 with the upper cover 20 attached to the main body 10 of the input device 1B. In addition, a space U15*a* is provided below the housing recessed portion U15. The user can raise the operation portion 820 of the operation lever 800 easily by inserting a fingertip into the space U15*a*.

A part of the housing recessed portion U15 housing the operation lever 800L on the left side is formed in the right side surface 10La of the left grip 10BL. In addition, a part of the housing recessed portion U15 housing the operation lever 800R on the right side is formed in the left side surface 10Ra of the right grip 10BR. This makes it possible to enlarge the housing recessed portions U15 and the operation levers 800 in the extending direction of the left and right grips 10BL and 10BR and thus facilitate the operation of the user on the operation levers 800.

The invention claimed is:

1. An input device comprising:
a device front portion including a right portion on which a first operation member is disposed,
a left portion on which a second operation member is disposed, and a central portion as a part between the right portion and the left portion;
a right grip extending rearward of a rear edge of the central portion from the right portion of the device front portion;
a left grip extending rearward of the rear edge of the central portion from the left portion of the device front portion;
an upper case forming a part of each of the device front portion, the right grip, and the left grip;
a lower case forming a part of each of the device front portion, the right grip, and the left grip;
a frame housed in the upper case and the lower case;
a plurality of screws configured to fix the lower case to at least one of the frame and the upper case; and
a lower cover attached to a lower surface of the lower case and configured to cover the plurality of screws,
the lower cover constituting at least a part of each of a lower surface of the device front portion, a left side surface of the right grip, and a right side surface of the left grip.

2. The input device according to claim 1, wherein the lower cover exposes the lower case at a right side surface of the right grip and a left side surface of the left grip.

3. The input device according to claim 1, wherein
a surface of the lower cover has, on the left side surface of the right grip, a form of a surface different from a right side surface of the right grip, and
the surface of the lower cover has, on the right side surface of the left grip, a form of a surface different from a left side surface of the left grip.

4. The input device according to claim 3, wherein
the surface of the lower cover has, on the left side surface of the right grip and the right side surface of the left grip, an uneven pattern as the forms of the surfaces.

5. The input device according to claim 3, wherein
the left side surface of the right grip is a part touched by a finger of a user holding the right grip, and
the right side surface of the left grip is a part touched by a finger of the user holding the left grip.

6. The input device according to claim 1, further comprising:
a third operation member attached to the lower surface of the device front portion, wherein
the lower cover has a hole for attaching the third operation member thereto.

7. A cover attached to a lower case of an input device, the input device including
a device front portion including a right portion on which a first operation member is disposed,
a left portion on which a second operation member is disposed, and a central portion as a part between the right portion and the left portion,
a right grip extending rearward of a rear edge of the central portion from the right portion of the device front portion,
a left grip extending rearward of the rear edge of the central portion from the left portion of the device front portion,
an upper case forming a part of each of the device front portion, the right grip, and the left grip, and
the lower case forming a part of each of the device front portion, the right grip, and the left grip,
the cover constituting at least a part of each of a lower surface of the device front portion, a left side surface of the right grip, and a right side surface of the left grip.

* * * * *